(12) United States Patent
Zhang et al.

(10) Patent No.: US 10,291,460 B2
(45) Date of Patent: May 14, 2019

(54) METHOD, APPARATUS, AND SYSTEM FOR WIRELESS MOTION MONITORING

(71) Applicant: ORIGIN WIRELESS, INC., Greenbelt, MD (US)

(72) Inventors: Feng Zhang, Greenbelt, MD (US); Chen Chen, Burlingame, CA (US); Beibei Wang, Clarksville, MD (US); Hung-Quoc Duc Lai, Parkville, MD (US); Oscar Chi-Lim Au, San Jose, CA (US); K. J. Ray Liu, Potomac, MD (US)

(73) Assignee: ORIGIN WIRELESS, INC., Greenbelt, MD (US)

( * ) Notice: Subject to any disclaimer, the term of this patent is extended or adjusted under 35 U.S.C. 154(b) by 0 days.

(21) Appl. No.: 16/101,444

(22) Filed: Aug. 11, 2018

(65) Prior Publication Data
US 2018/0351775 A1  Dec. 6, 2018

Related U.S. Application Data

(63) Continuation-in-part of application No. 15/326,112, filed as application No. PCT/US2015/041037 on Jul.
(Continued)

(51) Int. Cl.
  *H04L 27/36*  (2006.01)
  *H04W 72/04* (2009.01)
  *H04B 1/38*  (2015.01)

(52) U.S. Cl.
  CPC ............ *H04L 27/362* (2013.01); *H04B 1/38* (2013.01); *H04W 72/0413* (2013.01)

(58) Field of Classification Search
  CPC .... H04L 27/362; H04B 1/38; H04W 72/0413; H04W 64/00; G01S 1/02; G01S 5/02; G01S 5/021; G01S 5/14
(Continued)

(56) References Cited

U.S. PATENT DOCUMENTS

| | | | |
|---|---|---|---|
| 2,933,702 A | 4/1960 | Bogert | |
| 3,767,855 A | 10/1973 | Ueno et al. | |

(Continued)

FOREIGN PATENT DOCUMENTS

| | | | |
|---|---|---|---|
| EP | 2571214 B1 | 4/2018 | |
| EP | 3387849 A1 | 10/2018 | |

(Continued)

OTHER PUBLICATIONS

U.S. Appl. No. 15/434,813, Wu et al., filed Feb. 16, 2017.
(Continued)

*Primary Examiner* — Harry K Liu
(74) *Attorney, Agent, or Firm* — Yingxin Xiao

(57) ABSTRACT

Methods, apparatus and systems for object motion detection are disclosed. In one example, a system having at least a processor and a memory with a set of instructions stored therein for detecting object motion in a venue is disclosed. The system comprises: a first wireless device configured for transmitting a wireless signal through a wireless multipath channel impacted by a motion of an object in the venue; and a second wireless device that has a different type from that of the first wireless device and is configured for: receiving the wireless signal through the wireless multipath channel impacted by the motion of the object in the venue, and obtaining a time series of channel information (CI) of the wireless multipath channel based on the wireless signal; and a motion detector configured for detecting the motion of the object in the venue based on motion information related to the motion of the object, wherein the motion information associated with the first and second wireless devices is computed based on the time series of CI by at least one of: the motion detector and the second wireless device.

28 Claims, 10 Drawing Sheets

Related U.S. Application Data 17, 2015, which is a continuation-in-part of application No. 14/605,611, filed on Jan. 26, 2015, now Pat. No. 10,168,414, application No. 16/101,444, which is a continuation-in-part of application No. 15/584,052, filed on May 2, 2017, and a continuation-in-part of application No. 15/434,813, filed on Feb. 16, 2017, now Pat. No. 10,129,862, and a continuation-in-part of application No. PCT/US2017/021963, filed on Mar. 10, 2017, and a continuation-in-part of application No. PCT/US2017/021957, filed on Mar. 10, 2017, and a continuation-in-part of application No. PCT/US2017/027131, filed on Apr. 12, 2017, and a continuation-in-part of application No. 15/384,217, filed on Dec. 19, 2016, which is a continuation-in-part of application No. 13/706,342, filed on Dec. 5, 2012, now Pat. No. 9,883,511, and a continuation-in-part of application No. 13/969,271, filed on Aug. 16, 2013, now Pat. No. 9,882,675, and a continuation-in-part of application No. 13/969,320, filed on Aug. 16, 2013, now Pat. No. 9,559,874, and a continuation-in-part of application No. 15/041,677, filed on Feb. 11, 2016, now Pat. No. 9,794,156, and a continuation-in-part of application No. 15/200,430, filed on Jul. 1, 2016, now Pat. No. 9,736,002, which is a continuation of application No. 14/262,153, filed on Apr. 25, 2014, now Pat. No. 9,407,306, said application No. 15/384,217 is a continuation-in-part of application No. 15/200,429, filed on Jul. 1, 2016, now Pat. No. 9,781,700, which is a continuation of application No. 14/943,648, filed on Nov. 17, 2015, now Pat. No. 9,402,245, which is a continuation of application No. 14/202,651, filed on Mar. 10, 2014, now Pat. No. 9,226,304, said application No. 15/384,217 is a continuation-in-part of application No. 14/605,611, filed on Jan. 26, 2015, now Pat. No. 10,168,414, and a continuation-in-part of application No. 14/615,984, filed on Feb. 6, 2015, now Pat. No. 9,686,054, and a continuation-in-part of application No. 15/004,314, filed on Jan. 22, 2016, now Pat. No. 10,014,982, and a continuation-in-part of application No. 15/061,059, filed on Mar. 4, 2016, and a continuation-in-part of application No. PCT/US2015/041037, filed on Jul. 17, 2015, which is a continuation-in-part of application No. 14/605,611, filed on Jan. 26, 2015, now Pat. No. 10,168,414, said application No. 15/384,217 is a continuation-in-part of application No. 15/268,477, filed on Sep. 16, 2016, now Pat. No. 9,887,864, which is a continuation-in-part of application No. 15/200,429, filed on Jul. 1, 2016, now Pat. No. 9,781,700, which is a continuation of application No. 14/943,648, filed on Nov. 17, 2015, now Pat. No. 9,402,245, which is a continuation of application No. 14/202,651, filed on Mar. 10, 2014, now Pat. No. 9,226,304, said application No. 15/384,217 is a continuation-in-part of application No. 15/284,496, filed on Oct. 3, 2016, and a continuation-in-part of application No. PCT/US2016/066015, filed on Dec. 9, 2016, application No. 16/101,444, which is a continuation-in-part of application No. PCT/US2017/015909, filed on Jan. 31, 2017, which is a continuation-in-part of application No. PCT/US2016/066015, filed on Dec. 9, 2016, application No. 16/101,444, which is a continuation-in-part of application No. 15/861,422, filed on Jan. 3, 2018, which is a continuation of application No. 14/912,324, filed as application No. PCT/US2014/051148 on Aug. 14, 2014, now Pat. No. 9,900,794, said application No. 15/861,422 is a continuation-in-part of application No. 15/004,335, filed on Jan. 22, 2016, now Pat. No. 10,009,148, and a continuation-in-part of application No. 15/326,112, filed as application No. PCT/US2015/041037 on Jul. 17, 2015, which is a continuation-in-part of application No. 14/605,611, filed on Jan. 26, 2015, now Pat. No. 10,168,414, said application No. 15/861,422 is a continuation-in-part of application No. 15/584,052, and a continuation-in-part of application No. 15/434,813, filed on Feb. 16, 2017, now Pat. No. 10,129,862, and a continuation-in-part of application No. PCT/US2017/021963, filed on Mar. 10, 2017, and a continuation-in-part of application No. PCT/US2017/021957, filed on Mar. 10, 2017, and a continuation-in-part of application No. PCT/US2017/027131, filed on Apr. 12, 2017, and a continuation-in-part of application No. 15/384,217, filed on Dec. 19, 2016, which is a continuation-in-part of application No. 13/706,342, filed on Dec. 5, 2012, now Pat. No. 9,883,511, and a continuation-in-part of application No. 13/969,271, filed on Aug. 16, 2013, now Pat. No. 9,882,675, and a continuation-in-part of application No. 13/969,320, filed on Aug. 16, 2013, now Pat. No. 9,559,874, and a continuation-in-part of application No. 15/041,677, filed on Feb. 11, 2016, now Pat. No. 9,794,156, and a continuation-in-part of application No. 15/200,430, filed on Jul. 1, 2016, now Pat. No. 9,736,002, which is a continuation of application No. 14/262,153, filed on Apr. 25, 2014, now Pat. No. 9,407,306, said application No. 15/384,217 is a continuation-in-part of application No. 15/200,429, filed on Jul. 1, 2016, now Pat. No. 9,781,700, which is a continuation of application No. 14/943,648, filed on Nov. 17, 2015, now Pat. No. 9,402,245, which is a continuation of application No. 14/202,651, filed on Mar. 10, 2014, now Pat. No. 9,226,304, said application No. 15/384,217 is a continuation-in-part of application No. 14/605,611, filed on Jan. 26, 2015, now Pat. No. 10,168,414, and a continuation-in-part of application No. 14/615,984, filed on Feb. 6, 2015, now Pat. No. 9,686,054, and a continuation-in-part of application No. 15/004,314, filed on Jan. 22, 2016, now Pat. No. 10,014,982, and a continuation-in-part of application No. 15/061,059, filed on Mar. 4, 2016, and a continuation-in-part of application No. PCT/US2015/041037, filed on Jul. 17, 2015, which is a continuation-in-part of application No. 14/605,611, filed on Jan. 26, 2015, now Pat. No. 10,168,414, said application No. 15/268,477 is a continuation-in-part of application No. 15/268,477, filed on Sep. 16, 2016, now Pat. No. 9,887,864, which is a continuation-in-part of application No. 15/200,429, filed on Jul. 1, 2016, now Pat. No. 9,781,700, which is a continuation of application No. 14/943,648, filed on Nov. 17, 2015, now Pat. No. 9,402,245, which is a continuation of application No. 14/202,651, filed on Mar. 10, 2014, now Pat. No. 9,226,304, said application No. 15/384,217 is a continuation-in-part of application No. 15/284,496, filed on Oct. 3, 2016, and a continuation-in-part of application No. PCT/US2016/066015, filed on Dec. 9, 2016, said application No. 15/861,422 is a continuation-in-part of application No. PCT/US2017/015909, filed on Jan. 31, 2017, which is a continuation-in-part of application No. PCT/US2016/066015, filed on Dec. 9, 2016, application No. 16/101,444, which is a continuation-in-part of application No. 15/861,422, filed on Jan. 3, 2018, which is a continuation-in-part of application No. 14/912,324, filed as application No. PCT/US2014/051148 on Aug. 14, 2014, now Pat. No. 9,900,794, said application No. 15/861,422 is a continuation-in-part of application No. 15/004,335, filed on Jan. 22, 2016, now Pat. No. 10,009,148, and a continuation-in-part of application No. 15/326,112, filed as application No. PCT/US2015/041037 on Jul. 17, 2015, which is a continuation-in-part of application No. 14/605,611, filed on Jan. 26, 2015, now Pat. No. 10,168,414, said application No. 15/861,422 is a continuation-in-part of application No. 15/584,052, filed on May 2, 2017, and a continuation-in-part of application No. 15/434,813, filed on Feb. 16, 2017, now Pat. No. 10,129,862, and a continuation-in-part of application No. PCT/US2017/021963, filed on Mar. 10, 2017, and a continuation-in-part of application No. PCT/US2017/021957, filed on Mar. 10, 2017, and a continuation-in-part of application No. PCT/US2017/027131, filed on Apr. 12, 2017, and a continuation-in-part of application No. 15/384,217, filed on Dec. 19, 2016, which is a continuation-in-part of application No. 13/706,342, filed on Dec. 5, 2012, now Pat. No. 9,883,511, and a continuation-in-part of application No. 13/969,271, filed on Aug. 16, 2013, now Pat. No. 9,882,675, and a continuation-in-part of application No. 13/969,320, filed on Aug. 16, 2013, now Pat. No. 9,559,874, and a continuation-in-part of application No. 15/041,677, filed on Feb. 11, 2016, now Pat. No. 9,794,156, and a continuation-in-part of application No. 15/200,430, filed on Jul. 1, 2016, now Pat. No. 9,736,002, which is a continuation of application No. 14/262,153, filed on Apr. 25, 2014, now Pat. No. 9,407,306, said application No. 15/384,217 is a continuation-in-part of application No. 15/200,429, filed on Jul. 1, 2016, now Pat. No. 9,781,700, which is a continuation of application No. 14/943,648, filed on Nov. 17, 2015, now Pat. No. 9,402,245, which is a continuation of application No. 14/202,651, filed on Mar. 10, 2014, now Pat. No. 9,226,304, said application No. 15/384,217 is a continuation-in-part of application No. 14/605,611, filed on Jan. 26, 2015, now Pat. No. 10,168,414, and a continuation-in-part of application No. 14/615,984, filed on Feb. 6, 2015, now Pat. No. 9,686,054, and a continuation-in-part of application No. 15/004,314, filed on Jan. 22, 2016, now Pat. No. 10,014,982, and a continuation-in-part of application No. 15/061,059, filed on Mar. 4, 2016, and a continuation-in-part of application No. PCT/US2015/041037, filed on Jul. 17, 2015, which is a continuation-in-part of application No. 14/605,611, filed on Jan. 26, 2015, now Pat. No. 10,168,414, said application No. 15/384,217 is a continuation-in-part of application No. 15/268,477, filed on Sep. 16, 2016, now Pat. No. 9,887,864, which is a continuation-in-part of application No. 15/200,429, filed on Jul. 1, 2016, now Pat. No. 9,781,700, which is a continuation of application No. 14/943,648, filed on Nov. 17, 2015, now Pat. No. 9,402,245, which is a continuation of application No. 14/202,651, filed on Mar. 10, 2014, now Pat. No. 9,226,304, said application No. 15/384,217 is a continuation-in-part of application No. 15/284,496, filed on Oct. 3, 2016, and a continuation-in-part of application No. PCT/US2016/066015, filed on Dec. 9, 2016, said application No. 15/861,422 is a continuation-in-part of application No. PCT/US2017/015909, filed on Jan. 31, 2017, which is a continuation-in-part of application No. PCT/US2016/066015, filed on Dec. 9, 2016, application No. 16/101,444, which is a continuation-in-part of application No. 15/861,422, filed on Jan. 3, 2018, and a continuation-in-part of application No. 15/873,806, filed on Jan. 17, 2018.

(60) Provisional application No. 62/148,019, filed on Apr. 15, 2015, provisional application No. 62/025,795, filed on Jul. 17, 2014, provisional application No. 62/069,090, filed on Oct. 27, 2014, provisional application No. 62/331,278, filed on May 3, 2016, provisional application No. 62/295,970, filed on Feb. 16, 2016, provisional application No. 62/320,965, filed on Apr. 11, 2016, provisional application No. 62/307,081, filed on Mar. 11, 2016, provisional application No. 62/316,850, filed on Apr. 1, 2016, provisional application No. 62/307,172, filed on Mar. 11, 2016, provisional application No. 62/334,110, filed on May 10, 2016, provisional application No. 62/322,575, filed on Apr. 14, 2016, provisional application No. 62/409,796, filed on Oct. 18, 2016, provisional application No. 62/557,117, filed on Sep. 11, 2017, provisional application No. 62/593,826, filed on Dec. 1, 2017, provisional application No. 62/106,395, filed on Jan. 22, 2015, provisional application No. 62/128,574, filed on Mar. 5, 2015, provisional application No. 62/219,315, filed on Sep. 16, 2015, provisional application No. 62/235,958, filed on Oct. 1, 2015, provisional application No. 62/265,155, filed on Dec. 9, 2015, provisional application No. 62/411,504, filed on Oct. 21, 2016, provisional application No. 62/383,235, filed on Sep. 2, 2016, provisional application No. 62/384,060, filed on Sep. 6, 2016, provisional application No. 62/678,207, filed on May 30, 2018, provisional application No. 62/511,309, filed on May 25, 2017.

(58) Field of Classification Search
USPC .......................................................... 342/451
See application file for complete search history.

(56) References Cited

U.S. PATENT DOCUMENTS

| | | |
|---|---|---|
| 5,092,336 A | 3/1992 | Fink |
| 5,155,742 A | 10/1992 | Ariyavisitakul et al. |
| 5,428,999 A | 7/1995 | Fink |
| 5,926,768 A | 7/1999 | Lewiner et al. |
| 6,301,291 B1 | 10/2001 | Rouphael et al. |
| 6,490,469 B2 | 12/2002 | Candy |
| 6,862,326 B1 | 3/2005 | Eran et al. |
| 7,362,815 B2 | 4/2008 | Lindskog et al. |
| 7,440,766 B1 | 10/2008 | Tuovinen et al. |
| 7,460,605 B2 | 12/2008 | Candy et al. |
| 7,463,690 B2 | 12/2008 | Candy et al. |
| 7,587,291 B1 | 9/2009 | Sarvazyan et al. |
| 7,768,876 B2 | 8/2010 | Dahl et al. |
| 8,195,112 B1 | 6/2012 | Zhang et al. |
| 8,346,197 B2 | 1/2013 | Huy et al. |
| 8,411,765 B2 | 4/2013 | Smith et al. |
| 8,451,181 B2 | 5/2013 | Huy et al. |

(56) References Cited

U.S. PATENT DOCUMENTS

| | | |
|---|---|---|
| 8,457,217 B2 | 6/2013 | Huy et al. |
| 8,498,658 B2 | 7/2013 | Smith et al. |
| 8,593,998 B2 | 11/2013 | Huy et al. |
| 8,743,976 B2 | 6/2014 | Smith et al. |
| 8,792,396 B2 | 7/2014 | Huy et al. |
| 8,831,164 B2 | 9/2014 | Lu |
| 9,226,304 B2 | 12/2015 | Chen et al. |
| 9,402,245 B2 | 7/2016 | Chen et al. |
| 9,407,306 B2 | 8/2016 | Yang et al. |
| 9,686,054 B2 | 6/2017 | Yang et al. |
| 9,736,002 B2 | 8/2017 | Yang et al. |
| 9,781,700 B2 | 10/2017 | Chen et al. |
| 9,794,156 B2 | 10/2017 | Ma et al. |
| 9,882,675 B2 | 1/2018 | Han et al. |
| 9,883,511 B1 | 1/2018 | Yang et al. |
| 9,887,864 B1 | 2/2018 | Han et al. |
| 9,900,794 B2 | 2/2018 | Han et al. |
| 10,009,148 B1 | 6/2018 | Chen et al. |
| 10,014,982 B1 | 7/2018 | Chen et al. |
| 10,129,862 B1 | 11/2018 | Wu et al. |
| 2003/0138053 A1 | 7/2003 | Candy et al. |
| 2004/0156443 A1 | 8/2004 | Dent |
| 2006/0025229 A1 | 2/2006 | Mahajan et al. |
| 2006/0098746 A1 | 5/2006 | Candy et al. |
| 2006/0115031 A1 | 6/2006 | Lindskog et al. |
| 2006/0142017 A1* | 6/2006 | Suzuki ............... H04W 48/16 455/450 |
| 2006/0233221 A1 | 10/2006 | Xu |
| 2010/0302977 A1 | 12/2010 | Huy et al. |
| 2010/0309829 A1 | 12/2010 | Huy et al. |
| 2012/0089834 A1* | 4/2012 | Li ........................ H04W 12/04 713/168 |
| 2012/0155515 A1 | 6/2012 | Smith et al. |
| 2012/0183037 A1 | 7/2012 | Allpress et al. |
| 2012/0207234 A1 | 8/2012 | De Rosny et al. |
| 2012/0257660 A1 | 10/2012 | Smith et al. |
| 2012/0263056 A1 | 10/2012 | Smith et al. |
| 2012/0315938 A1* | 12/2012 | Van Nee ............. H04B 7/0434 455/507 |
| 2012/0328037 A1 | 12/2012 | Hsu et al. |
| 2013/0201958 A1 | 8/2013 | Huy et al. |
| 2013/0223503 A1 | 8/2013 | Smith et al. |
| 2014/0022128 A1 | 1/2014 | Smith |
| 2014/0126567 A1 | 5/2014 | Husain et al. |
| 2015/0049792 A1 | 2/2015 | Han et al. |
| 2015/0257167 A1 | 9/2015 | Chen et al. |
| 2016/0018508 A1 | 1/2016 | Chen et al. |
| 2016/0205569 A1 | 7/2016 | Han et al. |
| 2017/0188359 A1 | 6/2017 | Liu et al. |
| 2017/0212210 A1 | 7/2017 | Chen et al. |
| 2018/0026481 A1 | 1/2018 | Ku et al. |
| 2018/0131554 A1 | 5/2018 | Liu et al. |
| 2018/0183650 A1 | 6/2018 | Zhang et al. |

FOREIGN PATENT DOCUMENTS

| | | |
|---|---|---|
| WO | 2007/031088 A1 | 3/2007 |
| WO | 2011/029072 A2 | 3/2011 |
| WO | 2011/029075 A2 | 3/2011 |
| WO | 2012/151316 A1 | 11/2012 |
| WO | 2013/126054 A1 | 8/2013 |
| WO | 2016/011433 A2 | 1/2016 |
| WO | 2017/100706 A1 | 6/2017 |
| WO | 2017/155634 A1 | 9/2017 |
| WO | 2017/156487 A1 | 9/2017 |
| WO | 2017/156492 A1 | 9/2017 |
| WO | 2017/180698 A1 | 10/2017 |

OTHER PUBLICATIONS

U.S. Appl. No. 15/061,059, Ma et al., filed Mar. 4, 2016.
U.S. Appl. No. 15/284,496, Han et al., filed Oct. 3, 2016.
Gurbuz et al., "Micro-Doppler-based in-home aided and unaided walking recognition with multiple radar and sonar systems", IET Radar, Sonar & Navigation, Apr. 2017, pp. 107-115, vol. 11, No. 1.
Qian et al., "Inferring motion direction using commodity wi-fi for interactive exergames", in CHI Conference on Human Factors in Computing Systems, ACM, 2017. pp. 1961-1972.
Sun et al., "WiDraw: Enabling hands-free drawing in the air on commodity WiFi devices", in the 21st Annual International Conference on Mobile Computing & Networking, ACM, 2015, pp. 77-89.
Adib et al., "See through walls with WiFi!", ACM SIGCOMM Computer Communication Review, Aug. 2013, pp. 75-86, vol. 43.
Adib et al., "3D tracking via body radio reflections", in the 11th USENIX Symposium on Networked Systems Design and Implementation, USENIX Association, 2014, pp. 317-329.
Hsu et al., "Extracting gait velocity and stride length from surrounding radio signals", in CHI Conference on Human Factors in Computing Systems, 2017, pp. 2116-2126.
Qian et al., "Widar: Decimeter-level passive tracking via velocity monitoring with commodity Wi-Fi", in the 18th ACM International Symposium on Mobile Ad Hoc Networking and Computing, 2017, pp. 1-10, Article 6.
Wang et al., "Understanding and modeling of WiFi signal based human activity recognition", in the 21st Annual International Conference on Mobile Computing & Networking, 2015, pp. 65-76, Paris, France.
Kosba et al., "RASID demo: a robust WLAN device-free passive motion detection system". PerCom Demos 2012, Mar. 2012. pp. 531-533, Lugano.
Lv et al., "Robust wlan-based indoor fine-grained intrusion detection", in IEEE Global Communications Conference (GLOBECOM), IEEE, 2016, pp. 1-6.
Wu et al., "Non-invasive detection of moving and stationary human with wifi", IEEE Journal on Selected Areas in Communications, 2015, pp. 2329-2342, vol. 33, No. 11.
Qian et al., "Pads: Passive detection of moving targets with dynamic speed using phy layer information", IEEE International Conference on Parallel and Distributed Systems (ICPADS), Dec. 2014. pp. 1-8.
Xin et al., "Freesense: A robust approach for indoor human detection using wi-fi signals", ACM on Interactive, Mobile, Wearable and Ubiquitous Technologies, Sep. 2018, vol. 2, No. 3, Article 143.
Zhang et al., "Wispeed: A statistical electromagnetic approach for device-free indoor speed estimation", IEEE Internet of Things Journal, 2018, pp. 2163-2177, vol. 5, No. 3.
Zhu et al., "R-TTWD: Robust Device-Free Through—The-Wall Detection of Moving Human With Wifi", IEEE Journal on Selected Areas in Communications, May 2017, pp. 1090-1103, vol. 35, No. 5.
Gu et al., "MoSense: An RF-Based Motion Detection System via Off-the-Shelf WiFi Devices", in IEEE Internet of Things Journal, Dec. 2017, pp. 2326-2341, vol. 4, No. 6.
Zhu et al., "Robust and passive motion detection with COTS WiFi devices", in Tsinghua Science and Technology, Aug. 2017, pp. 345-359, vol. 22, No. 4.
Falcone et al., "WiFi-based passive ISAR for high resolution cross-range profiling of moving targets", in Synthetic Aperture Radar, 2012. EUSAR. 9th European Conference, Apr. 2012, pp. 279-282.
Gu et al., ""Silence is Golden": Exploring Ambient Signals for Detecting Motions in a Real-Time Manner", 2017 IEEE 86th Vehicular Technology Conference (VTC-Fall), 2017, pp. 1-5, Toronto, ON.
Sun et al., "Towards Motion-Aware Wireless LANs Using PHY Layer Information", 2015 IEEE 23rd International Conference on Network Protocols (ICNP), 2015, pp. 467-469, San Francisco, CA.
Siebert et al., "Human Motion Detection and Classification Using Ambient WiFi Signals", 2017 Sensor Signal Processing for Defence Conference (SSPD), Dec. 2017, pp. 1-5, IEEE, London.
Zhao et al., "RF-based 3D skeletons", in Proceedings of the 2018 Conference of the ACM Special Interest Group on Data Communication, ACM, Aug. 2018, pp. 267-281.
Tang et al., "An indoor human motion detection algorithm based on channel state information", 2017 International Smart Cities Conference (ISC2), 2017, pp. 1-6, Wuxi.

(56) References Cited

OTHER PUBLICATIONS

Qian et al., "Enabling contactless detection of moving humans with dynamic speeds using csi", ACM Transactions on Embedded Computing Systems (TECS), Jan. 2018, pp. 1-18, vol. 17, No. 2, Article 52.

\* cited by examiner

Algorithm: Motion Detection

Initialization: The most recent $T$ amplitudes for each subcarrier $f$: $[G(f;1), ..., G(f;T)]$;

Output: The human motion status inside a venue;

1: for $f = 1:F$ do

2:     Motion statistic computation for each subcarrier $f$:

3:     $\bar{G}_{(1)}(f) \leftarrow \frac{1}{T-1}\sum_{t=1}^{T-1} G(f;t); \quad \bar{G}_{(2)}(f) \leftarrow \frac{1}{T-1}\sum_{t=2}^{T} G(f;t);$ 4:     $\psi(f) \leftarrow \dfrac{\sum_{t=2}^{T}(G(f;t)-\bar{G}_{(1)}(f))(G(f;t-1)-\bar{G}_{(2)}(f))}{\left(\sum_{t=2}^{T}(G(f;t)-\bar{G}_{(1)}(f))^2\right)^{\frac{1}{2}}\left(\sum_{t=2}^{T}(G(f;t-1)-\bar{G}_{(2)}(f))^2\right)^{\frac{1}{2}}};$ 5:     Motion detection for each subcarrier f:

6:     if $\psi(f) > \dfrac{-1+\gamma\sqrt{T-2}}{T-1}$ then

7:         $D(f) \leftarrow 1;$

8:     else

9:         $D(f) \leftarrow 0;$

10:     end if

11: end for

12: Final motion detection:

13: if $\frac{1}{F}\sum_{f=1}^{F} D(f) > 0.5$ then

14:     Motion is detected!

15: else

16:     No Motion is detected.

17: end if

FIG. 8

METHOD, APPARATUS, AND SYSTEM FOR WIRELESS MOTION MONITORING

CROSS-REFERENCE TO RELATED APPLICATIONS

The present application hereby claims priority to, and incorporates by reference the entirety of the disclosures of, each of the following applications:

(a) U.S. patent application Ser. No. 15/326,112, entitled "WIRELESS POSITIONING SYSTEMS", filed on Jan. 13, 2017,
  (1) which is a national stage entry of PCT patent application PCT/US2015/041037, entitled "WIRELESS POSITIONING SYSTEMS", filed on Jul. 17, 2015, published as WO 2016/011433A2 on Jan. 21, 2016,
    a. which claims priority to U.S. Provisional patent application 62/148,019, entitled "WIRELESS POSITIONING SYSTEMS", filed on Apr. 15, 2015,
    b. which is a continuation-in-part of U.S. patent application Ser. No. 14/605,611, entitled "WIRELESS POSITIONING SYSTEMS", filed on Jan. 26, 2015, published as US2016/0018508A1 on Jan. 21, 2016,
      1. which claims priority to U.S. Provisional patent application 62/025,795, entitled "TIME-REVERSAL POSITIONING SYSTEMS", filed on Jul. 17, 2014, and
      2. which claims priority to U.S. Provisional patent application 62/069,090, entitled "TIME-REVERSAL POSITIONING SYSTEMS", filed on Oct. 27, 2014,
(b) U.S. patent application Ser. No. 15/584,052, entitled "METHOD, SYSTEM, AND APPARATUS FOR WIRELESS POWER TRANSMISSION BASED ON POWER WAVEFORMING", filed on May 2, 2017,
  (1) which claims priority to U.S. Provisional patent application 62/331,278, entitled "USING VIRTUAL ANTENNAS FOR POWER WAVEFORMING IN WIRELESS POWER TRANSMISSION SYSTEMS", filed on May 3, 2016,
(c) U.S. patent application Ser. No. 15/434,813, entitled "METHODS, DEVICES, APPARATUS, AND SYSTEMS FOR MEDIUM ACCESS CONTROL IN WIRELESS COMMUNICATION SYSTEMS UTILIZING SPATIAL FOCUSING EFFECT", filed on Feb. 16, 2017,
  (1) which claims priority to U.S. Provisional patent application 62/295,970, entitled "THE IMPACT OF SPATIAL FOCUSING EFFECTS ON MEDIUM ACCESS CONTROL DESIGN FOR 5G", filed on Feb. 16, 2016,
  (2) which claims priority to U.S. Provisional patent application 62/320,965, entitled "OPTIMAL RATE ADAPTATION FOR THROUGHPUT MAXIMIZATION IN TIME REVERSAL DIVISION MULTIPLE ACCESS", filed on Apr. 11, 2016,
(d) PCT patent application PCT/US2017/021963, entitled "METHODS, APPARATUS, SERVERS, AND SYSTEMS FOR VITAL SIGNS DETECTION AND MONITORING", filed on Mar. 10, 2017, published as WO2017/156492A1 on Sep. 14, 2017,
  (1) which claims priority to U.S. Provisional patent application 62/307,081, entitled "TR-BREATH: TIME-REVERSAL BREATHING RATE ESTIMATION AND DETECTION", filed on Mar. 11, 2016,
  (2) which claims priority to U.S. Provisional patent application 62/316,850, entitled "TR-BREATH: TIME-REVERSAL BREATHING RATE ESTIMATION AND DETECTION", filed on Apr. 1, 2016,
(e) PCT patent application PCT/US2017/021957, entitled "METHODS, APPARATUS, SERVERS, AND SYSTEMS FOR HUMAN IDENTIFICATION BASED ON HUMAN RADIO BIOMETRIC INFORMATION", filed on Mar. 10, 2017, published as WO2017/156487A1 on Sep. 14, 2017,
  (1) which claims priority to U.S. Provisional patent application 62/307,172, entitled "RADIO SHOT: THROUGH-THE-WALL HUMAN IDENTIFICATION", filed on Mar. 11, 2016,
  (2) which claims priority to U.S. Provisional patent application 62/334,110, entitled "TIME-REVERSAL TRACKING WITHOUT MAPPING", filed on May 10, 2016,
(f) PCT patent application PCT/US2017/027131, entitled "METHODS, APPARATUS, SERVERS, AND SYSTEMS FOR OBJECT TRACKING", filed on Apr. 12, 2017, published as WO2017/180698A1 on Oct. 19, 2017,
  (1) which claims priority to U.S. Provisional patent application 62/322,575, entitled "TIME-REVERSAL RESONATING EFFECT AND ITS APPLICATION IN WALKING SPEED ESTIMATION", filed on Apr. 14, 2016,
  (2) which claims priority to U.S. Provisional patent application 62/334,110, entitled "TIME-REVERSAL TRACKING WITHOUT MAPPING", filed on May 10, 2016, and
  (3) which claims priority to U.S. Provisional patent application 62/409,796, entitled "METHODS, DEVICES, SERVERS, AND SYSTEMS OF TIME REVERSAL BASED TRACKING", filed on Oct. 18, 2016,
(g) U.S. Provisional patent application 62/557,117, entitled "METHODS, DEVICES, SERVERS, APPARATUS, AND SYSTEMS FOR WIRELESS INTERNET OF THINGS APPLICATIONS", filed on Sep. 11, 2017,
(h) U.S. Provisional patent application 62/593,826, entitled "METHOD, APPARATUS, AND SYSTEM FOR OBJECT TRACKING AND NAVIGATION", filed on Dec. 1, 2017,
(i) U.S. patent application Ser. No. 15/384,217, entitled "METHOD, APPARATUS, SERVER, AND SYSTEMS OF TIME-REVERSAL TECHNOLOGY", filed on Dec. 19, 2016, published as US2017/0188359A1 on Jun. 29, 2017,
  (1) which is a Continuation-in-Part of U.S. patent application Ser. No. 13/706,342, entitled "WAVEFORM DESIGN FOR TIME-REVERSAL SYSTEMS," filed on Dec. 5, 2012, issued as U.S. Pat. No. 9,883,511 on Jan. 30, 2018,
  (2) which is a Continuation-in-Part of U.S. patent application Ser. No. 13/969,271, entitled "TIME-REVERSAL WIRELESS SYSTEMS HAVING ASYMMETRIC ARCHITECTURE", filed on Aug. 16, 2013, published as US2015/0049745A1 on Feb. 19, 2015, issued as U.S. Pat. No. 9,882,675 on Jan. 30, 2018,
  (3) which is a Continuation-in-Part of U.S. patent application Ser. No. 13/969,320, entitled "MULTIUSER TIME-REVERSAL DIVISION MULTIPLE ACCESS UPLINK SYSTEM WITH PARALLEL INTERFERENCE CANCELLATION", filed on Aug. 16, 2013, issued as U.S. Pat. No. 9,559,874 on Jan. 31, 2017,
  (4) which is a Continuation-in-Part of U.S. patent application Ser. No. 15/041,677, entitled "HANDSHAKING PROTOCOL FOR TIME-REVERSAL SYSTEM", filed on Feb. 11, 2016, published as US2016/0164669A1 on Jun. 9, 2016, issued as U.S. Pat. No. 9,794,156 on Oct. 17, 2017, (5) which is a Continuation-in-Part of U.S. patent application Ser. No. 15/200,430, entitled "QUADRATURE AMPLITUDE MODULATION FOR TIME-REVERSAL SYSTEMS", filed on Jul. 1, 2016, published as US2016/0315797A1 on Oct. 27, 2016, issued as U.S. Pat. No. 9,736,002 on Aug. 15, 2017,
  a. which is a Continuation of U.S. patent application Ser. No. 14/262,153, entitled "QUADRATURE AMPLITUDE MODULATION FOR TIME-REVERSAL SYSTEMS", filed on Apr. 25, 2014, issued as U.S. Pat. No. 9,407,306 on Aug. 2, 2016,
(6) which is a Continuation-in-Part of U.S. patent application Ser. No. 15/200,429, entitled "TIME-REVERSAL WIRELESS PARADIGM FOR INTERNET OF THINGS", filed on Jul. 1, 2016, issued as U.S. Pat. No. 9,781,700 on Oct. 3, 2017,
  a. which is a Continuation of U.S. patent application Ser. No. 14/943,648, entitled "TIME-REVERSAL WIRELESS PARADIGM FOR INTERNET OF THINGS", filed on Nov. 17, 2015, issued as U.S. Pat. No. 9,402,245 on Jul. 26, 2016,
    1. which is a Continuation of U.S. patent application Ser. No. 14/202,651, entitled "TIME-REVERSAL WIRELESS PARADIGM FOR INTERNET OF THINGS", filed on Mar. 10, 2014, issued as U.S. Pat. No. 9,226,304 on Dec. 29, 2015,
(7) which is a Continuation-in-Part of U.S. patent application Ser. No. 14/605,611, entitled "WIRELESS POSITIONING SYSTEM", filed on Jan. 26, 2015, published as US2016/0018508A1 on Jan. 21, 2016,
  a. which claims priority to U.S. Provisional patent application 62/069,090, entitled "TIME-REVERSAL POSITIONING SYSTEMS", filed on Oct. 27, 2014,
  b. which claims priority to U.S. Provisional patent application 62/025,795, entitled "TIME-REVERSAL POSITIONING SYSTEMS", filed on Jul. 17, 2014,
(8) which is a Continuation-in-Part of U.S. patent application Ser. No. 14/615,984, entitled "JOINT WAVEFORM DESIGN AND INTERFERENCE PRE-CANCELLATION FOR TIME-REVERSAL SYSTEMS", filed on Feb. 6, 2015, issued as U.S. Pat. No. 9,686,054 on Jun. 20, 2017,
  a. which claims priority to U.S. Provisional patent application 62/025,795, entitled "TIME-REVERSAL POSITIONING SYSTEMS", filed on Jul. 17, 2014,
(9) which is a Continuation-in-Part of U.S. patent application Ser. No. 15/004,314, entitled "TIME-REVERSAL TECHNOLOGIES FOR HYBRID WIRELESS NETWORKS", filed on Jan. 22, 2016, issued as U.S. Pat. No. 10,014,982 on Jul. 3, 2018,
  a. which claims priority to U.S. Provisional patent application 62/106,395, entitled "TIME-REVERSAL TECHNOLOGIES FOR HYBRID WIRELESS NETWORKS", filed on Jan. 22, 2015,
(10) which is a Continuation-in-Part of U.S. patent application Ser. No. 15/061,059, entitled "TIME-REVERSAL SCALABILITY FOR HIGH NETWORK DENSIFICATION", filed on Mar. 4, 2016,
  a. which claims priority to U.S. Provisional patent application 62/128,574, entitled "TIME-REVERSAL SCALABILITY FOR HIGH NETWORK DENSIFICATION", filed on Mar. 5, 2015,
(11) which is a Continuation-in-Part of PCT patent application PCT/US2015/041037, entitled "WIRELESS POSITIONING SYSTEMS", filed on Jul. 17, 2015, published as WO2016/011433A2 on Jan. 21, 2016,
  a. which claims priority to U.S. Provisional patent application 62/148,019, entitled "WIRELESS POSITIONING SYSTEMS", filed on Apr. 15, 2015,
  b. which is a continuation-in-part of U.S. patent application Ser. No. 14/605,611, entitled "WIRELESS POSITIONING SYSTEMS", filed on Jan. 26, 2015, published as US2016/0018508A1 on Jan. 21, 2016,
    1. which claims priority to U.S. Provisional patent application 62/025,795 entitled "TIME-REVERSAL POSITIONING SYSTEMS", filed on Jul. 17, 2014, and
    2. which claims priority to U.S. Provisional patent application 62/069,090 entitled "TIME-REVERSAL POSITIONING SYSTEMS", filed on Oct. 27, 2014,
(12) which is a Continuation-in-Part of U.S. patent application Ser. No. 15/268,477, entitled "METHODS, DEVICES AND SYSTEMS OF HETEROGENEOUS TIME-REVERSAL PARADIGM ENABLING DIRECT CONNECTIVITY IN INTERNET OF THINGS", filed on Sep. 16, 2016, issued as U.S. Pat. No. 9,887,864 on Feb. 6, 2018,
  a. which claims priority to U.S. Provisional patent application 62/219,315, entitled "ENABLING DIRECT CONNECTIVITY IN INTERNET OF THINGS: A HETEROGENEOUS TIME-REVERSAL PARADIGM", filed on Sep. 16, 2015,
  b. which is a Continuation-in-part of U.S. patent application Ser. No. 15/200,429, entitled "TIME-REVERSAL WIRELESS PARADIGM FOR INTERNET OF THINGS", filed on Jul. 1, 2016, issued as U.S. Pat. No. 9,781,700 on Oct. 3, 2017,
    1. which is a Continuation of U.S. patent application Ser. No. 14/943,648, entitled "TIME-REVERSAL WIRELESS PARADIGM FOR INTERNET OF THINGS", filed on Nov. 17, 2015, issued as U.S. Pat. No. 9,402,245 on Jul. 26, 2016,
      i. which is a Continuation of U.S. patent application Ser. No. 14/202,651, entitled "TIME-REVERSAL WIRELESS PARADIGM FOR INTERNET OF THINGS", filed on Mar. 10, 2014, issued as U.S. Pat. No. 9,226,304 on Dec. 29, 2015,
(13) which is a Continuation-in-Part of U.S. patent application Ser. No. 15/284,496, entitled "TIME-REVERSAL COMMUNICATION SYSTEMS", filed on Oct. 3, 2016,
  a. which claims priority to U.S. Provisional patent application 62/235,958, entitled "SYMBOL TIMING FOR TIME-REVERSAL SYSTEMS WITH SIGNATURE DESIGN", filed on Oct. 1, 2015,
(14) which is a Continuation-in-Part of
  PCT patent application PCT/US2016/066015, entitled "METHOD, APPARATUS, AND SYSTEMS FOR WIRELESS EVENT DETECTION AND MONITORING", filed on Dec. 9, 2016, published as WO2017/100706A1 on Jun. 15, 2017, whose US national stage entry is Ser. No. 16/060,710, filed on Jun. 8, 2018,
  a. which claims priority to U.S. Provisional patent application 62/265,155, entitled "INDOOR EVENTS DETECTION SYSTEM", filed on Dec. 9, 2015,
  b. which claims priority to U.S. Provisional patent application 62/411,504, entitled "METHOD, APPA- RATUS, AND SYSTEM FOR WIRELESS INTERNET OF THINGS APPLICATIONS", filed on Oct. 21, 2016,
  c. which claims priority to U.S. Provisional patent application 62/383,235, entitled "TIME REVERSAL MONITORING SYSTEM", filed on Sep. 2, 2016,
  d. which claims priority to U.S. Provisional patent application 62/307,081, entitled "TR-BREATH: TIME-REVERSAL BREATHING RATE ESTIMATION AND DETECTION", filed on Mar. 11, 2016,
  e. which claims priority to U.S. Provisional patent application 62/316,850, entitled "TR-BREATH: TIME-REVERSAL BREATHING RATE ESTIMATION AND DETECTION", filed on Apr. 1, 2016,
(15) which claims priority to U.S. Provisional patent application 62/331,278, entitled "USING VIRTUAL ANTENNAS FOR POWER WAVEFORMING IN WIRELESS POWER TRANSMISSION SYSTEMS", filed on May 3, 2016,
(16) which claims priority to U.S. Provisional patent application 62/295,970, entitled "THE IMPACT OF SPATIAL FOCUSING EFFECTS ON THE MEDIUM ACCESS CONTROL DESIGN FOR 5G", filed on Feb. 16, 2016,
(17) which claims priority to U.S. Provisional patent application 62/320,965, entitled "OPTIMAL RATE ADAPTATION FOR THROUGHPUT MAXIMIZATION IN TIME REVERSAL DIVISION MULTIPLE ACCESS", filed on Apr. 11, 2016,
(18) which claims priority to U.S. Provisional patent application 62/307,081, entitled "TR-BREATH: TIME-REVERSAL BREATHING RATE ESTIMATION AND DETECTION", filed on Mar. 11, 2016,
(19) which claims priority to U.S. Provisional patent application 62/316,850, entitled "TR-BREATH: TIME-REVERSAL BREATHING RATE ESTIMATION AND DETECTION", filed on Apr. 1, 2016,
(20) which claims priority to U.S. Provisional patent application 62/307,172, entitled "RADIO SHOT: THROUGH-THE-WALL HUMAN IDENTIFICATION", filed on Mar. 11, 2016,
(21) which claims priority to U.S. Provisional patent application 62/322,575, entitled "TIME-REVERSAL RESONATING EFFECT AND ITS APPLICATION IN WALKING SPEED ESTIMATION", filed on Apr. 14, 2016,
(22) which claims priority to U.S. Provisional patent application 62/334,110, entitled "TIME-REVERSAL TRACKING WITHOUT MAPPING", filed on May 10, 2016,
(23) which claims priority to U.S. Provisional patent application 62/409,796, entitled "METHODS, DEVICES, SERVERS, AND SYSTEMS OF TIME REVERSAL BASED TRACKING", filed on Oct. 18, 2016,
(24) which claims priority to U.S. Provisional patent application 62/383,235, entitled "TIME REVERSAL MONITORING SYSTEM", filed on Sep. 2, 2016,
(25) which claims priority to U.S. Provisional patent application 62/384,060, entitled "METHODS, DEVICES, SERVERS, SYSTEMS OF TIME REVERSAL MACHINE PLATFORM FOR BROADBAND WIRELESS APPLICATIONS", filed on Sep. 6, 2016,
(26) which claims priority to U.S. Provisional patent application 62/411,504, entitled "METHOD, APPARATUS, AND SYSTEM FOR WIRELESS INTERNET OF THINGS APPLICATIONS", filed on Oct. 21, 2016,
(j) PCT patent application PCT/US2017/015909, entitled "METHODS, DEVICES, SERVERS, APPARATUS, AND SYSTEMS FOR WIRELESS INTERNET OF THINGS APPLICATIONS", filed on Jan. 31, 2017, published as WO2017/155634A1 on Sep. 14, 2017,
  (1) which claims priority to U.S. Provisional patent application 62/384,060, entitled "METHODS, DEVICES, SERVERS, SYSTEMS OF TIME REVERSAL MACHINE PLATFORM FOR BROADBAND WIRELESS APPLICATIONS", filed on Sep. 6, 2016,
  (2) which claims priority to U.S. Provisional patent application 62/331,278, entitled "USING VIRTUAL ANTENNAS FOR POWER WAVEFORMING IN WIRELESS POWER TRANSMISSION SYSTEMS", filed on May 3, 2016,
  (3) which claims priority to U.S. Provisional patent application 62/307,081, entitled "TR-BREATH: TIME-REVERSAL BREATHING RATE ESTIMATION AND DETECTION", filed on Mar. 11, 2016,
  (4) which claims priority to U.S. Provisional patent application 62/316,850, entitled "TR-BREATH: TIME-REVERSAL BREATHING RATE ESTIMATION AND DETECTION", filed on Apr. 1, 2016,
  (5) which claims priority to U.S. Provisional patent application 62/322,575, entitled "TIME-REVERSAL RESONATING EFFECT AND ITS APPLICATION IN WALKING SPEED ESTIMATION", filed on Apr. 14, 2016,
  (6) which claims priority to U.S. Provisional patent application 62/334,110, entitled "TIME-REVERSAL TRACKING WITHOUT MAPPING", filed on May 10, 2016,
  (7) which claims priority to U.S. Provisional patent application 62/409,796, entitled "METHODS, DEVICES, SERVERS, AND SYSTEMS OF TIME REVERSAL BASED TRACKING", filed on Oct. 18, 2016,
  (8) which claims priority to U.S. Provisional patent application 62/383,235, entitled "TIME REVERSAL MONITORING SYSTEM", filed on Sep. 2, 2016,
  (9) which claims priority to U.S. Provisional patent application 62/411,504, entitled "METHOD, APPARATUS, AND SYSTEM FOR WIRELESS INTERNET OF THINGS APPLICATIONS", filed on Oct. 21, 2016,
  (10) which claims priority to U.S. Provisional patent application 62/307,172, entitled "RADIO SHOT: THROUGH-THE-WALL HUMAN IDENTIFICATION", filed on Mar. 11, 2016,
  (11) which claims priority to PCT patent application PCT/US2016/066015, entitled "METHOD, APPARATUS, AND SYSTEMS FOR WIRELESS EVENT DETECTION AND MONITORING", filed on Dec. 9, 2016, published as WO2017/100706A1 on Jun. 15, 2017, whose US national stage entry is U.S. patent application Ser. No. 16/060,710, entitled "METHOD, APPARATUS, AND SYSTEMS FOR WIRELESS EVENT DETECTION AND MONITORING", filed on Jun. 8, 2018,
(k) U.S. Provisional patent application 62/678,207, entitled "METHOD, APPARATUS, AND SYSTEM FOR OBJECT TRACKING AND MOTION MONITORING", filed on May 30, 2018, (l) U.S. patent application Ser. No. 15/861,422, entitled "METHOD, APPARATUS, SERVER, AND SYSTEMS OF TIME-REVERSAL TECHNOLOGY", filed on Jan. 3, 2018, (m) U.S. patent application Ser. No. 15/873,806, entitled "METHOD, APPARATUS, AND SYSTEM FOR OBJECT TRACKING AND NAVIGATION", filed on Jan. 17, 2018.

TECHNICAL FIELD

The present teaching generally relates to object motion detection. More specifically, the present teaching relates to detecting and monitoring motions of an object based on wireless channel information in a rich-scattering environment.

BACKGROUND

Object motion detection becomes more and more important nowadays. For example, for security and/or management purposes, a user may want to detect any object motion in the user's house; a manager of a supermarket may want to detect any object motion in the supermarket; and a nurse in a hospital may want to detect any motion of a patient in the hospital.

Existing systems and methods for detecting object motions cannot provide enough accuracy and often lead to false alarms. Existing approaches include those based on passive infrared (PIR), active infrared (AIR) and Ultrasonic. PIR sensors are the most widely used motion sensor in home security systems, which detect human motions by sensing the difference between background heat and the heat emitted by moving people. However, solutions based on PIR sensors are prone to false alarms due to its sensitivity to environmental changes, like hot/cold air flow and sunlight. They are easily defeated by blocking the body heat emission (wearing a heat-insulating full-body suit). Also, their range is limited and need line-of-sight (LOS), and thus multiple devices are needed. In AIR based approaches, an IR emitter sends a beam of IR which will be received by an IR receiver. When the beam is interrupted, a motion is detected. However, this kind of approaches can be easily seen using a regular camera or any IR detection mechanism and also has limited range and thus need LOS. Ultrasonic sensors detect human motion by sending out ultrasonic sound waves into a space and measuring the speed at which they return, and motion can be detected if there exist frequency changes. However, this kind of approaches can be defeated by wearing an anechoic suit. Also, ultrasound cannot penetrate solid objects such as furniture or boxes and cause gaps in detection field. Slow movements by a burglar may not trigger an alarm, too.

Thus, existing systems and methods for detecting object motions are not entirely satisfactory.

SUMMARY

The present teaching generally relates to object motion detection and monitoring. More specifically, the present teaching relates to detecting and monitoring motions of an object based on wireless channel information in a rich-scattering environment, e.g. an indoor environment or urban metropolitan area, enclosed environment, underground environment, open-air venue with barriers such as parking lot, storage, yard, square, forest, cavern, valley, etc.

In one embodiment, a system having at least a processor and a memory with a set of instructions stored therein for detecting object motion in a venue is disclosed. The system comprises: a first wireless device configured for transmitting a wireless signal through a wireless multipath channel impacted by a motion of an object in the venue; and a second wireless device that has a different type from that of the first wireless device and is configured for: receiving the wireless signal through the wireless multipath channel impacted by the motion of the object in the venue, and obtaining a time series of channel information (CI) of the wireless multipath channel based on the wireless signal; and a motion detector configured for detecting the motion of the object in the venue based on motion information related to the motion of the object, wherein the motion information associated with the first and second wireless devices is computed based on the time series of CI by at least one of: the motion detector and the second wireless device.

In another embodiment, a method of a wireless monitoring system is disclosed. The wireless monitoring system comprises at least one asynchronous heterogeneous Type 1 wireless device and at least one asynchronous heterogeneous Type 2 wireless device. The wireless monitoring system comprises at least one pair of Type 1 and Type 2 devices. Each pair comprises: one of the at least one asynchronous heterogeneous Type 1 wireless device, and one of the at least one asynchronous heterogeneous Type 2 wireless device. Each of the at least one Type 2 wireless device is in at least one respective particular pair of Type 1 and Type 2 devices. Each Type 2 wireless device is associated with at least one respective particular Type 1 wireless device through the at least one respective particular pair of Type 1 and Type 2 devices. For each Type 2 wireless device, and for each of the at least one respective particular pair of Type 1 and Type 2 devices comprising the Type 2 wireless device, the method comprises obtaining asynchronously at least one respective time series of channel information (CI) of a wireless multipath channel impacted by a motion of an object in a venue, wherein the at least one respective time series of CI (CI time series) associated with the particular pair of Type 1 and Type 2 wireless devices is extracted asynchronously from a respective asynchronous heterogeneous wireless signal, wherein the respective asynchronous heterogeneous wireless signal is transmitted asynchronously from a respective one of the at least one respective particular Type 1 wireless device using a respective first heterogeneous processor, a respective first heterogeneous memory and a respective first heterogeneous set of instructions of the Type 1 wireless device to at least one asynchronous heterogeneous Type 2 wireless device through the wireless multipath channel. The method further comprises at least one of: monitoring the motion of the object in the venue individually and asynchronously, using a third processor, a third memory and a third set of instructions of a Type 3 device, based on CI time series associated with a pair of Type 1 and Type 2 devices comprising a particular Type 2 device, monitoring the motion of the object jointly and asynchronously based on CI time series associated with any of the at least one pair of Type 1 and Type 2 devices associated with the particular Type 2 wireless device, monitoring the motion of the object jointly and asynchronously based on CI time series associated with any of the at least one pair of Type 1 and Type 2 devices associated with one of the at least one respective particular Type 1 wireless device, and monitoring the motion of the object globally and asynchronously based on CI time series associated with any of the at least one pair of Type 1 and Type 2 devices.

In yet another embodiment, a particular asynchronous heterogeneous Type 2 device of a radio monitoring system is disclosed. The radio monitoring system comprises at least one asynchronous heterogeneous Type 1 device and at least one asynchronous heterogeneous Type 2 device. The radio monitoring system comprises at least one pairing of Type 1 and Type 2 devices, each pairing comprising one of the at least one Type 1 device, and one of the at least one Type 2 device. The particular asynchronous heterogeneous Type 2 device is in at least one particular pairing of Type 1 and Type 2 devices of the radio monitoring system. The particular Type 2 device is grouped with at least one particular Type 1 device through the at least one particular pairing of Type 1 and Type 2 devices. The particular asynchronous heterogeneous Type 2 device comprises: a wireless circuitry to receive asynchronously at least one asynchronous heterogeneous radio signal, wherein each asynchronous heterogeneous radio signal is transmitted asynchronously by one of the at least one particular Type 1 device using a respective first heterogeneous processor, a respective first heterogeneous memory and a respective first heterogeneous set of instructions of the Type 1 device to at least one asynchronous heterogeneous Type 2 device through a wireless multipath channel influenced by a movement of a mass in a site; a second heterogeneous processor communicatively coupled with the wireless circuitry; a second heterogeneous memory communicative coupled with the second heterogeneous processor; a second heterogeneous set of instructions stored in the second heterogeneous memory which, when executed, cause the second heterogeneous processor to, for each of the at least one particular pairing of Type 1 and Type 2 devices, secure asynchronously at least one respective series of channel information (time series of CI) of the wireless multipath channel, wherein the at least one respective time series of CI associated with the particular pairing of Type 1 and Type 2 devices is being derived asynchronously from the respective asynchronous heterogeneous radio signal received asynchronously by the wireless circuitry; wherein at least one of the following is included: the movement of the mass in the site is monitored individually and asynchronously, using a third processor, a third memory and a third set of instructions of a Type 3 device, based on time series of CI associated with a pairing of Type 1 and Type 2 devices comprising the particular Type 2 device, the movement of the mass is monitored jointly and asynchronously based on time series of CI associated with any pairings of Type 1 and Type 2 devices comprising the particular Type 2 device, the movement of the mass is monitored jointly and asynchronously based on time series of CI associated with any pairings of Type 1 and Type 2 devices comprising one of the at least one particular Type 1 device, and the movement of the mass is monitored globally and asynchronously based on time series of CI associated with any pairings of Type 1 and Type 2 devices.

In yet another embodiment, a particular asynchronous heterogeneous Type 1 device of a radio monitoring system is disclosed. The radio monitoring system comprises at least one asynchronous heterogeneous Type 1 device and at least one asynchronous heterogeneous Type 2 device. The radio monitoring system comprises at least one combination of Type 1 and Type 2 devices, each combination comprising one of the at least one Type 1 device, and one of the at least one Type 2 device. The particular asynchronous heterogeneous Type 1 device is in at least one particular combination of Type 1 and Type 2 devices of the radio monitoring system. The particular Type 1 device is paired with at least one particular Type 2 device through the at least one particular combination of Type 1 and Type 2 devices. The particular asynchronous heterogeneous Type 1 device comprises: a wireless circuitry; a first processor communicatively coupled with the wireless circuitry; a first memory communicative coupled with the first processor; and a first set of instructions stored in the first memory. The first set of instructions, when executed, cause the first processor to: transmit asynchronously using the wireless circuitry an asynchronous heterogeneous wireless signal from the particular Type 1 device to the at least one particular Type 2 device through a wireless multipath channel impacted by a dynamics of a substance in a site, wherein, for each of the at least one particular Type 2 device, at least one series of channel information (time series of CI) of the wireless multipath channel gleaned from the asynchronous heterogeneous wireless signal transmitted by the wireless circuitry is fetched by the Type 2 device using a second processor, a second memory and a second set of instructions of the Type 2 device. At least one of the following is included: the dynamics of the substance in the site is tracked individually and asynchronously, using a third processor, a third memory and a third set of instructions of a Type 3 device, based on time series of CI associated with a combination of Type 1 and Type 2 devices comprising the particular Type 1 device; the dynamics of the substance is tracked jointly and asynchronously based on time series of CI associated with any combinations of Type 1 and Type 2 devices comprising the particular Type 1 device; the dynamics of the substance is tracked jointly and asynchronously based on time series of CI associated with any combinations of Type 1 and Type 2 devices comprising one of the at least one particular Type 2 device; and the dynamics of the substance is tracked globally and asynchronously based on time series of CI associated with any combinations of Type 1 and Type 2 devices.

In still another embodiment, a particular asynchronous heterogeneous Type 3 device of a radio monitoring system is disclosed. The radio monitoring system comprises at least one asynchronous heterogeneous Type 1 device and at least one asynchronous heterogeneous Type 2 device. The radio monitoring system comprises at least one doublet of Type 1 and Type 2 devices, each doublet comprising one of the at least one asynchronous heterogeneous Type 1 device, and one of the at least one asynchronous heterogeneous Type 2 device. The particular asynchronous heterogeneous Type 3 comprises: a third processor communicatively coupled with at least one of: at least one asynchronous heterogeneous Type 1 device, and at least one asynchronous heterogeneous Type 2 device; a third memory communicative coupled with the third processor; and a third set of instructions stored in the third memory. The third set of instructions, when executed, causes the third processor to: for each Type 2 device, and for each of the at least one doublet of Type 1 and Type 2 devices comprising the Type 2 device: receive asynchronously at least one respective time series of channel information (time series of CI) of a wireless multipath channel influenced by a motion of an item in a place received asynchronously by the Type 2 device using a respective second processor, a respective second memory and a respective second set of instructions of the Type 2 device, wherein the at least one respective time series of CI associated with the respective doublet of Type 1 and Type 2 devices is obtained asynchronously from a respective asynchronous heterogeneous radio signal transmitted from a respective Type 1 device of the respective doublet using a respective first processor, a respective first memory and a respective first set of instructions of the respective Type 1 device to at least one asynchronous heterogeneous Type 2 device through the wireless multipath channel; and at least one of: track the motion of the item in the place individually and asynchronously, based on time series of CI associated with a particular doublet of Type 1 and Type 2 devices comprising a particular Type 2 device and a particular Type 1 device, track the motion of the item jointly and asynchronously based on time series of CI associated with any of the at least one doublet of Type 1 and Type 2 devices associated with the particular Type 2 device, track the motion of the item jointly and asynchronously based on time series of CI associated with any of the at least one doublet of Type 1 and Type 2 devices associated with the particular Type 1 device, track the motion of the item globally and asynchronously based on time series of CI associated with any of the at least one doublet of Type 1 and Type 2 devices.

Other concepts relate to software for implementing the present teaching on object motion detection and monitoring based on wireless channel information in a rich-scattering environment.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings.

FIG. 8 illustrates an exemplary algorithm of motion detection, according to one embodiment of the present teaching.

DETAILED DESCRIPTION

Figure 1:
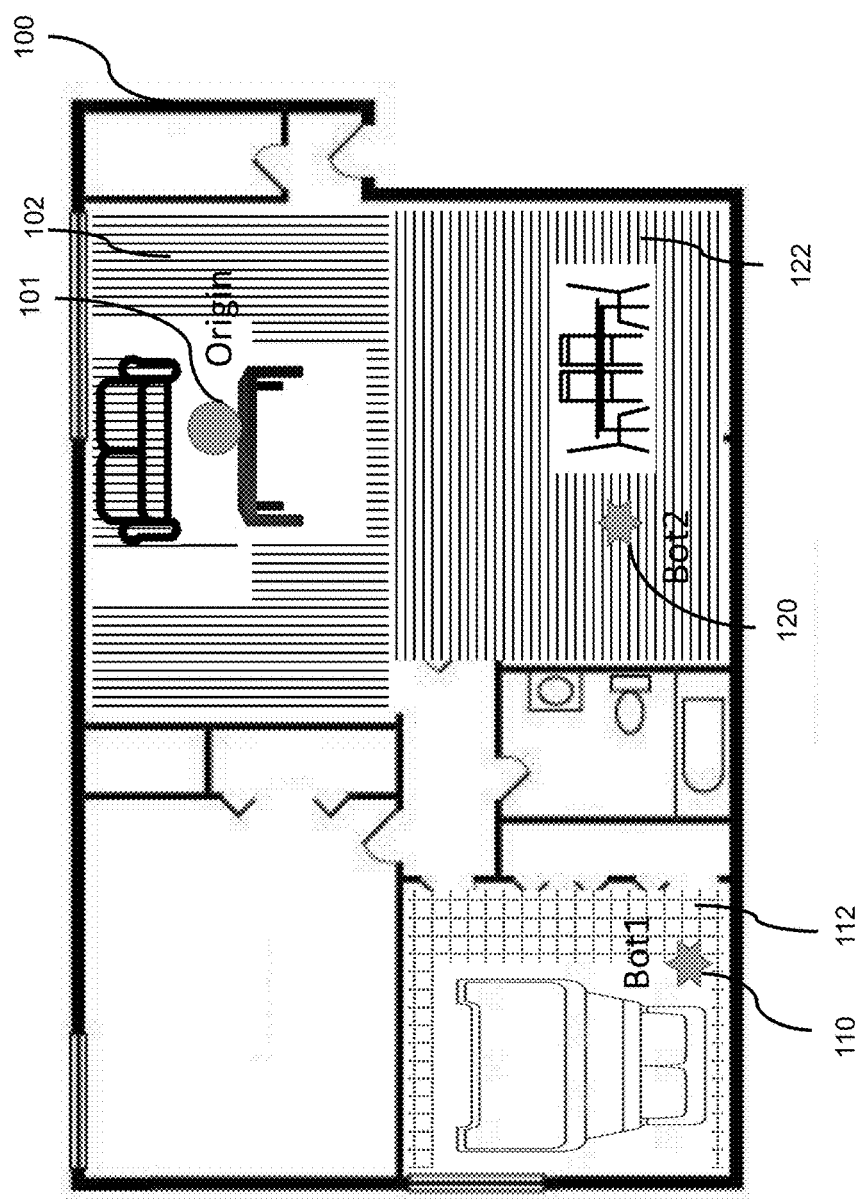
FIG. 1 illustrates an exemplary scenario where object motion is detected based on spatial-temporal information in a venue, according to one embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching discloses systems, devices, and methods for detecting object motion in a venue based on channel information of a wireless multipath channel that is impacted by the object motion. In one embodiment, the motion of the object is detected based on motion information computed based on a time series of channel information of the wireless multipath channel. The motion information may include a heterogeneous similarity score between a current time window and a past time window of the time series of channel information.

In one embodiment, the disclosed system comprises a first wireless device configured for transmitting a wireless signal through a wireless multipath channel impacted by a motion of an object in the venue; and a second wireless device that has a different type from that of the first wireless device. The second wireless device is configured for: receiving the wireless signal through the wireless multipath channel impacted by the motion of the object in the venue, and obtaining a time series of channel information (CI) of the wireless multipath channel based on the wireless signal. The disclosed system further comprises a motion detector configured for detecting the motion of the object in the venue based on motion information related to the motion of the object. The motion information associated with the first and second wireless devices is computed based on the time series of CI by at least one of: the motion detector and the second wireless device.

The motion detector may be coupled to at least one of: the first wireless device; the second wireless device; a third wireless device having a same type as that of the first wireless device; a fourth wireless device having a same type as that of the second wireless device; a cloud server; a fog server; a local server; and an edge server. In one embodiment, the first wireless device is a Type 1 device having a Type 1; the second wireless device is a Type 2 device having a Type 2; the system further comprises at least one of: at least one additional Type 1 device, and at least one additional Type 2 device; the Type 1 devices and the Type 2 devices form a plurality of pairs of Type 1 and Type 2 devices. For each pair of Type 1 and Type 2 devices comprising a Type 1 device and a Type 2 device: the respective Type 1 device may be configured for transmitting a respective wireless signal through the wireless multipath channel impacted by the motion of the object in the venue, the respective Type 2 device may be configured for receiving the respective wireless signal through the wireless multipath channel and obtaining a respective time series of CI of the wireless multipath channel based on the respective wireless signal, and at least one of the motion detector and the respective Type 2 device may be configured for asynchronously computing respective heterogeneous motion information related to the motion of the object based on the respective time series of CI; and at least one of the motion detector and the Type 2 devices is configured for performing at least one of: monitoring the motion of the object in the venue individually and asynchronously based on the asynchronously computed heterogeneous motion information associated with a pair of Type 1 and Type 2 devices, monitoring the motion of the object in the venue jointly and asynchronously based on the asynchronously computed heterogeneous motion information associated with any pair of Type 1 and Type 2 devices comprising a particular Type 2 device, monitoring the motion of the object in the venue jointly and asynchronously based on the asynchronously computed heterogeneous motion information associated with any pair of Type 1 and Type 2 devices comprising a particular Type 1 device, and monitoring the motion of the object in the venue globally and asynchronously based on the asynchronously computed heterogeneous motion information associated with any pair of Type 1 and Type 2 devices.

According to various embodiments of the present teaching, an Origin may be a transceiver and a Bot may be another transceiver in the disclosed system for object motion detection and monitoring. Each of the Bot and the Origin may be a Type 1 or Type 2 heterogeneous wireless device.

In one embodiment, each CI of the respective CI time series may have at least one respective component. For each Type 2 device, and for each of the at least one respective particular pair of Type 1 and Type 2 devices comprising the Type 2 device, and for each of the at least one respective component, the following may be done: (a) a respective current component window of the component of the respective CI time series may be determined asynchronously based on the respective current window; (b) a respective past component window of the component of the respective CI time series may be determined asynchronously based on the respective past window; (c) the respective current component window may be compared component-wise with the respective past component window asynchronously; and (d) the motion of the object may be monitored component-wise based on the component-wise comparing of the respective current component window and the respective past component window asynchronously. The motion of the object may be detected based on the asynchronous component-wise comparing.

In one embodiment, the disclosed system has hardware components (e.g. wireless transmitter/receiver with antenna, analog circuitry, RF/IF/baseband elements, low-noise amplifier, power supply, processor, memory, etc.) working in pairs (a Type 1 device and a Type 2 device) and corresponding software components. The disclosed system is capable of detecting object motions in a venue, with a very high detection rate and a very low false alarm rate. In particular, the disclosed system is much better than an existing passive infra-red (PIR) sensor which is a widely used motion sensor in security systems.

First, the disclosed system has a much larger motion detection range. In one embodiment, the disclosed wireless motion detection system uses wireless signals (such as Wi-Fi or LTE) to probe the environment (venue) and have a large inherent range of about 10,000 square feet due to Wi-Fi. PIR has a much smaller range of about 100-200 square feet by using an infra-red signal.

Second, the disclosed system can detect motion around corners. While a PIR sensor relies on line-of-sight (LOS) operation, it cannot detect motion behind a wall or around a corner or behind an obstacle (e.g. TV, sofa, window, partitions, etc.). In contrast, the disclosed system works in both line-of-sight (LOS) and non-line-of-sight (NLOS) conditions. The disclosed system is fully capable of detecting motion behind multiple walls, around multiple corners and behind obstacles. In security applications, being able to detect motion around corners and behind walls is extremely important because intruders may exactly be hiding there in the dark waiting to do bad things.

Third, the disclosed system has a much better false alarm rate. A false alarm means that a system detects a motion when there is actually no motion. Such false alarms are very annoying to the operators and police. The disclosed system has a very low false alarm rate of even less than 0.1% while the false alarm rate of a PIR based detector is in the range of 10% or more. While a PIR based detector is sensitive to temperature change due to e.g. a strong sunshine, the disclosed system is not sensitive to sunshine or temperature change.

Fourth, the disclosed system does not need special installation like a PIR based detector. PIR based detectors need special installation. Once installed, they cannot be moved around. As the PIR based detector has very limited range, many PIR devices are labor intensive, time consuming and expensive. In addition, replacement of faulty PIR devices requires additional effort. The disclosed system can use existing Wi-Fi or LTE to perform motion detection. In other words, no special installation is needed. The disclosed system may just use some existing Wi-Fi-compliant device such as Wi-Fi router, smart phone, smart speaker (e.g. Amazon Echo, Google Home, etc.), smart devices (e.g. smart thermometer, smart camera, smart TV, smart set-top box, smart refrigerator, etc.). Type 1 devices and Type 2 devices may be plug-and-play devices without a requirement of special installation. Due to the plug-and-play nature, the disclosed wireless motion detection system still works when the devices are moved around by consumers (e.g. from living room to family room, or from one plug to another plug).

Moreover, the disclosed system can exploit existing standard-compliant mass-market infrastructure such as Wi-Fi and LTE. Thus many components of the disclosed system are typically mass-produced and thus have a low cost, suitable for the consumer market as well as niche markets.

In various embodiments, machine learning, training, discriminative training, deep learning, neural network, continuous time processing, distributed computing, distributed storage, GPU/DSP/coprocessor/multicore/multiprocessing acceleration may be applied to any/every operation disclosed in the present teaching.

In one embodiment, a task related to object motion may be performed based on some spatial-temporal information (e.g. location, speed, velocity, acceleration, a periodic motion, a time trend, a transient motion, a period, a characteristic, etc.) of an object based on at least one time series of channel information (CI), a time parameter associated with a current movement, and/or a past spatial-temporal information of the object. The one or more time series of channel information may be preprocessed. In one embodiment, the task may comprise a presentation of the spatial-temporal information. It may be presented in an audio-visual way, a graphical way, a textual way, symbolic way or mechanical way. For example, the spatial-temporal information may indicate a detection of motion of an object in different rooms of a house. A graphical user interface (GUI) may be constructed to show that the where-about of the object in a house. For example, the object may be a person. The location or approximate location of the object may be shown or marked.

The GUI may partition a house into living-room area, family-room area, dining-room area, bedroom1-area, bedroom2-area, etc. Each area may be assigned a color and/or shaded with the color. Each area may be animated (e.g. size of the area, shape of the area, color of the area, intensity of the color of the area, text display, symbol display, etc.). Or, the GUI may have separate representation of each area with or without a map. The representation may be animated. The animation may be in real time, or at a later time. Predicted object (user) behavior/activity may be animated as well. The presentation may also be in the form of vibration, mechanical feedback, physical feedback, haptic feedback, light, shade, shape, etc. to reflect the spatial-temporal information. The spatial-temporal information may include more than one analytics, e.g. number of people, existence of motion, motion intensity, motion duration, motion frequency, "abnormal" or "unexpected" motion, vital sign, alive/death, motionless, asleep, suspicious event, and/or fall-down, etc. For example, if motion is large, the color may be darker (more black/grey element) or more saturated or brighter. If motion is small, the color may be lighter or less saturated or dimmer. When the person enters a house, the GUI may show that he is at the front foyer area, living room, bedroom1, etc. The GUI may be implemented by software for a computer/a tablet, an app on a smart phone (e.g. iPhone, Android phone, etc.), an app in a smart device (e.g. smart glass, smart watch, etc.).

FIG. 1 illustrates an exemplary scenario where object motion is detected based on spatial-temporal information in a venue, according to one embodiment of the present teaching. FIG. 1 also illustrates an exemplary presentation of the spatial-temporal information in the venue. For example, as shown in FIG. 1, in a 2-bedroom apartment 100, Origin 101 may be placed in the living-room area 102, Bot 1 110 may be placed in a bedroom1-area 112, and Bot 2 120 may be placed in the dining-room area 122. Each of Bot 1 110 and Bot 2 120 can transmit a wireless signal to the Origin 101, which can obtain channel information of a wireless multi-path channel based on the wireless signal. The Origin 101, by itself or through a third device like a motion detector, can compute motion information based on the channel information and detect object motion/activity based on the motion information. That is, the Origin 101, by itself or through a third device like a motion detector, can detect object motion/ activity based on wireless signals transmitted by Bot 1 110 and/or Bot 2 120.

If object motion/activity is detected based on wireless signals transmitted by both Bot 1 110 and Bot 2 120, the activity/motion or the object (e.g. person/user) may be in the living-room area 102. If object motion/activity is detected based only on wireless signals transmitted by Bot 1 110, the activity/motion or the object (e.g. person/user) may be in the bedroom-1 area 112. If object motion/activity is detected based only on wireless signals transmitted by Bot 2 120, the activity/motion or the object (e.g. person/user) may be in the dining-room area 122. If object motion/activity cannot be detected based on wireless signals transmitted by either Bot 1 110 or Bot 2 120, then it may be determined that nobody and no object is in the apartment 100. The corresponding area where the activity/motion/person/user is detected may be marked with a predetermined pattern or color.

Figure 2:
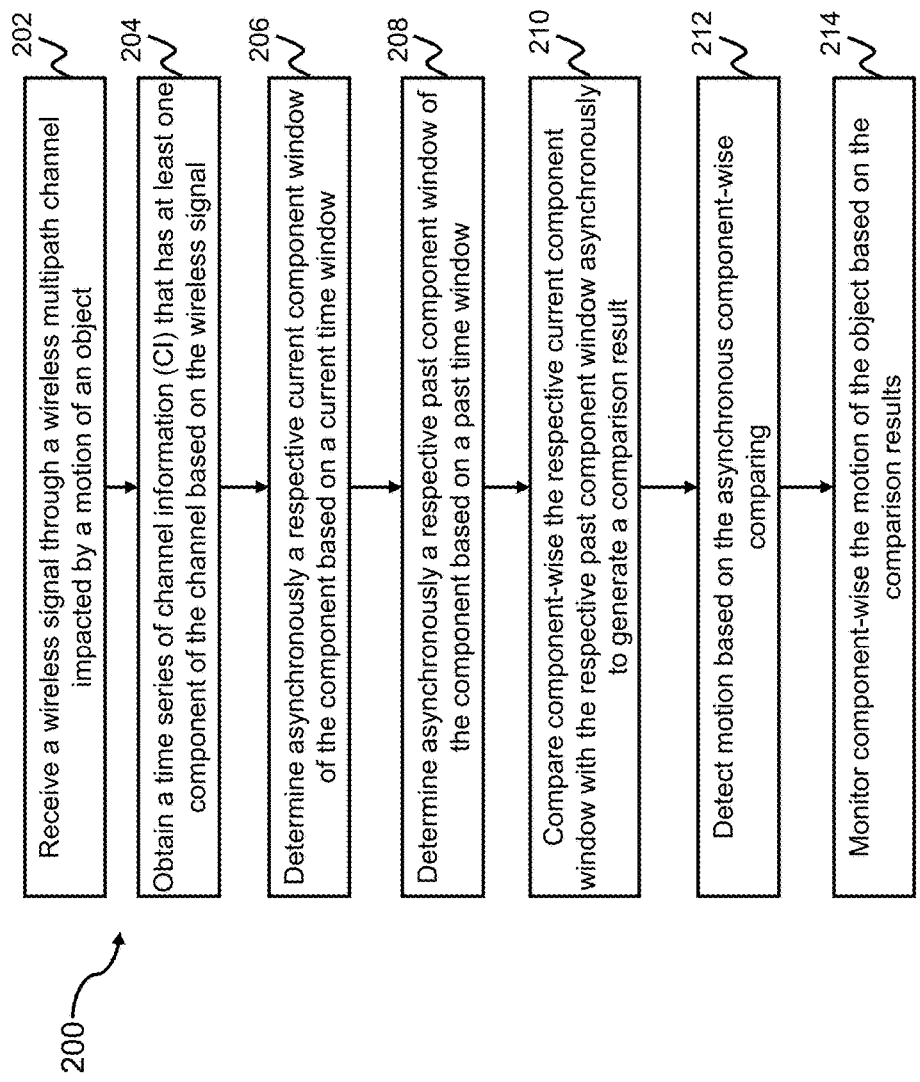
FIG. 2 illustrates a flowchart of an exemplary method for motion detection, according to one embodiment of the present teaching.

FIG. 2 illustrates a flowchart of an exemplary method for motion detection performed by a motion detector based on wireless channel information, according to one embodiment of the present teaching. At operation 202, a wireless signal is received through a wireless multipath channel impacted by a motion of an object. At operation 204, a time series of channel information (CI) that has at least one component of the channel is obtained based on the wireless signal. A respective current component window of the component is determined asynchronously, at operation 206, based on a current time window. A respective past component window of the component is determined asynchronously, at operation 208, based on a past time window. At operation 210, the respective current component window is compared component-wise with the respective past component window asynchronously to generate a comparison result. At operation 212, object motion is detected based on the asynchronous component-wise comparison result. Optionally at operation 214, the motion of the object is monitored based on the continuously generated comparison results.

Figure 3:
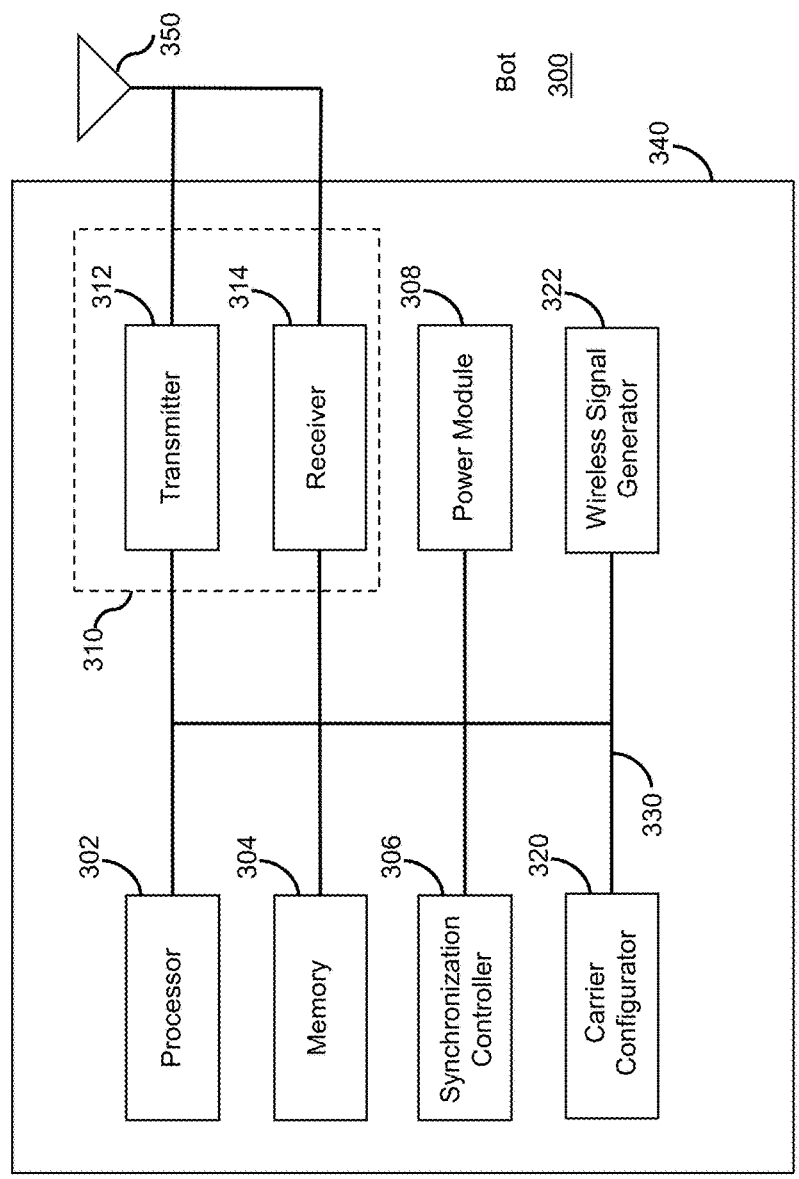
FIG. 3 illustrates an exemplary block diagram of a first wireless device, according to one embodiment of the present teaching.

FIG. 3 illustrates an exemplary block diagram of a first wireless device, e.g. a Bot 300, according to one embodiment of the present teaching. The Bot 300 is an example of a device that can be configured to implement the various methods described herein. As shown in FIG. 3, the Bot 300 includes a housing 340 containing a processor 302, a memory 304, a transceiver 310 comprising a transmitter 312 and receiver 314, a synchronization controller 306, a power module 308, a carrier configurator 320 and a wireless signal generator 322.

In this embodiment, the processor 302 controls the general operation of the Bot 300 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 304, which can include both read-only memory (ROM) and random access memory (RAM), can provide instructions and data to the processor 302. A portion of the memory 304 can also include non-volatile random access memory (NVRAM). The processor 302 typically performs logical and arithmetic operations based on program instructions stored within the memory 304. The instructions (a.k.a., software) stored in the memory 304 can be executed by the processor 302 to perform the methods described herein. The processor 302 and the memory 304 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 310, which includes the transmitter 312 and receiver 314, allows the Bot 300 to transmit and receive data to and from a remote device (e.g., an Origin or another Bot). An antenna 350 is typically attached to the housing 340 and electrically coupled to the transceiver 310. In various embodiments, the Bot 300 includes (not shown) multiple transmitters, multiple receivers, and multiple transceivers. In one embodiment, the antenna 350 is replaced with a multi-antenna array 350 that can form a plurality of beams each of which points in a distinct direction. The transmitter 312 can be configured to wirelessly transmit signals having different types or functions, such signals being generated by the processor 302. Similarly, the receiver 314 is configured to receive wireless signals having different types or functions, and the processor 302 is configured to process signals of a plurality of different types.

The Bot 300 in this example may serve as Bot 1 110 or Bot 2 120 in FIG. 1 for detecting object motion in a venue. For example, the wireless signal generator 322 may generate and transmit, via the transmitter 312, a wireless signal through a wireless multipath channel impacted by a motion of an object in the venue. The wireless signal carries information of the channel. Because the channel was impacted by the motion, the channel information includes motion information that can represent the motion of the object. As such, the motion can be indicated and detected based on the wireless signal. The generation of the wireless signal at the wireless signal generator 322 may be based on a request for motion detection from another device, e.g. an Origin, or based on a system pre-configuration. That is, the Bot 300 may or may not know that the wireless signal transmitted will be used to detect motion.

In one embodiment, the Bot 300 may be a particular asynchronous heterogeneous Type 1 device of a radio monitoring system. The radio monitoring system may comprise at least one asynchronous heterogeneous Type 1 device and at least one asynchronous heterogeneous Type 2 device. The radio monitoring system may comprise at least one combination of Type 1 and Type 2 devices, each combination comprising one of the at least one Type 1 device, and one of the at least one Type 2 device. The particular asynchronous heterogeneous Type 1 device is in at least one particular combination of Type 1 and Type 2 devices of the radio monitoring system. The particular Type 1 device is paired with at least one particular Type 2 device through the at least one particular combination of Type 1 and Type 2 devices. The particular asynchronous heterogeneous Type 1 device comprises a wireless circuitry; a first processor communicatively coupled with the wireless circuitry; a first memory communicative coupled with the first processor; and a first set of instructions stored in the first memory which, when executed, cause the first processor to transmit asynchronously using the wireless circuitry an asynchronous heterogeneous wireless signal from the particular Type 1 device to the at least one particular Type 2 device through a wireless multipath channel impacted by a dynamics of a substance in a site. For each of the at least one particular Type 2 device: at least one series of channel information (time series of CI) of the wireless multipath channel gleaned from the asynchronous heterogeneous wireless signal transmitted by the wireless circuitry is fetched by the Type 2 device using a second processor, a second memory and a second set of instructions of the Type 2 device. In one example, the dynamics of the substance in the site is tracked individually and asynchronously, using a third processor, a third memory and a third set of instructions of a Type 3 device, based on time series of CI associated with a combination of Type 1 and Type 2 devices comprising the particular Type 1 device. In another example, the dynamics of the substance is tracked jointly and asynchronously based on time series of CI associated with any combinations of Type 1 and Type 2 devices comprising the particular Type 1 device. In another example, the dynamics of the substance is tracked jointly and asynchronously based on time series of CI associated with any combinations of Type 1 and Type 2 devices comprising one of the at least one particular Type 2 device. In another example, the dynamics of the substance is tracked globally and asynchronously based on time series of CI associated with any combinations of Type 1 and Type 2 devices.

In another embodiment, for each Type 1 device, and for each of the at least one combination of Type 1 and Type 2 devices comprising the Type 1 device, a respective heterogeneous similarity score associated with the respective combination of Type 1 and Type 2 devices is computed asynchronously based on comparing a respective current window and a respective past window of at least one respective time series of CI associated with the respective combination of Type 1 and Type 2 devices. In one example, the dynamics of the substance in the site is tracked individually and asynchronously based on asynchronously computed heterogeneous similarity score associated with the combination of Type 1 and Type 2 devices comprising the particular Type 1 device. In another example, the dynamics of the substance in the site is detected individually and asynchronously when a heterogeneous similarity score associated with the combination of Type 1 and Type 2 devices comprising the particular Type 1 device is greater than and/or equal to an individual threshold. In another example, the dynamics of the substance in the site is tracked jointly and asynchronously based on asynchronously computed heterogeneous similarity score associated with any combination of Type 1 and Type 2 devices comprising the particular Type 1 device. In another example, the dynamics of the substance in the site is detected jointly and asynchronously when a first joint score computed based on heterogeneous similarity score associated with any combination of Type 1 and Type 2 devices comprising the particular Type 1 device is at least one of: greater than, and equal to, a first joint threshold. In another example, the dynamics of the substance in the site is tracked jointly and asynchronously based on asynchronously computed heterogeneous similarity score associated with any combination of Type 1 and Type 2 devices associated with one of the at least one particular Type 2 device. In another example, the dynamics of the substance in the site is detected jointly and asynchronously when a second joint score computed based on heterogeneous similarity score associated with any combination of Type 1 and Type 2 devices associated with one of the at least one particular Type 2 device is at least one of: greater than, and equal to, a second joint threshold. In another example, the dynamics of the substance in the site is tracked globally and asynchronously based on asynchronously computed heterogeneous similarity score associated with any combination of Type 1 and Type 2 devices. In another example, the dynamics of the substance in the site is detected globally and asynchronously when a third joint score computed based on heterogeneous similarity score associated with any combination of Type 1 and Type 2 devices is greater than and/or equal to a third joint threshold.

The synchronization controller 306 in this example may be configured to control the operations of the Bot 300 to be synchronized or un-synchronized with another device, e.g. an Origin or another Bot. In one embodiment, the synchronization controller 306 may control the Bot 300 to be synchronized with an Origin that receives the wireless signal transmitted by the Bot 300. In another embodiment, the synchronization controller 306 may control the Bot 300 to transmit the wireless signal asynchronously with other Bots. In another embodiment, each of the Bot 300 and other Bots may transmit the wireless signals individually and asynchronously.

The carrier configurator 320 in this example may configure transmission resources, e.g. time and carrier, for transmitting the wireless signal generated by the wireless signal generator 322. In one embodiment, each CI of the time series of CI has one or more components each corresponding to a carrier or sub-carrier of the transmission of the wireless signal. The detection of the motion may be based on motion detections on any one or any combination of the components.

The power module 308 can include a power source such as one or more batteries, and a power regulator, to provide regulated power to each of the above-described modules in FIG. 3. In some embodiments, if the Bot 300 is coupled to a dedicated external power source (e.g., a wall electrical outlet), the power module 308 can include a transformer and a power regulator.

The various modules discussed above are coupled together by a bus system 330. The bus system 330 can include a data bus and, for example, a power bus, a control signal bus, and/or a status signal bus in addition to the data bus. It is understood that the modules of the Bot 300 can be operatively coupled to one another using any suitable techniques and mediums.

Although a number of separate modules or components are illustrated in FIG. 3, persons of ordinary skill in the art will understand that one or more of the modules can be combined or commonly implemented. For example, the processor 302 can implement not only the functionality described above with respect to the processor 302, but also implement the functionality described above with respect to the wireless signal generator 322. Conversely, each of the modules illustrated in FIG. 3 can be implemented using a plurality of separate components or elements.

Figure 4:
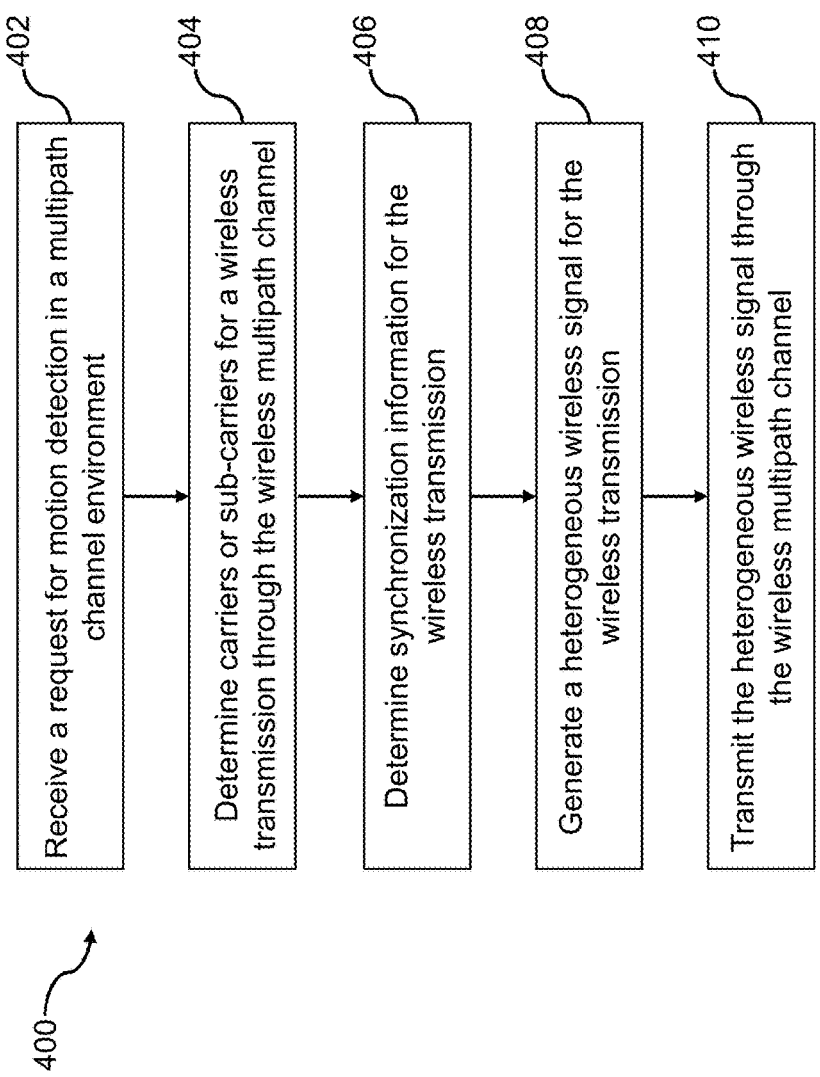
FIG. 4 illustrates a flowchart of an exemplary method performed by a first wireless device, according to one embodiment of the present teaching.

FIG. 4 illustrates a flowchart of an exemplary method 400 performed by a first wireless device, e.g. the Bot 300 in FIG. 3, in accordance with some embodiments of the present disclosure. Optionally at operation 402, the Bot receives a request for motion detection in a multipath channel environment. At operation 404, the Bot determines carriers or sub-carriers for a wireless transmission through the wireless multipath channel. At operation 406, the Bot may determine synchronization information for the wireless transmission. At operation 408, the Bot may generate a heterogeneous wireless signal for the wireless transmission. At operation 410, the Bot transmits the heterogeneous wireless signal through the wireless multipath channel.

Figure 5:
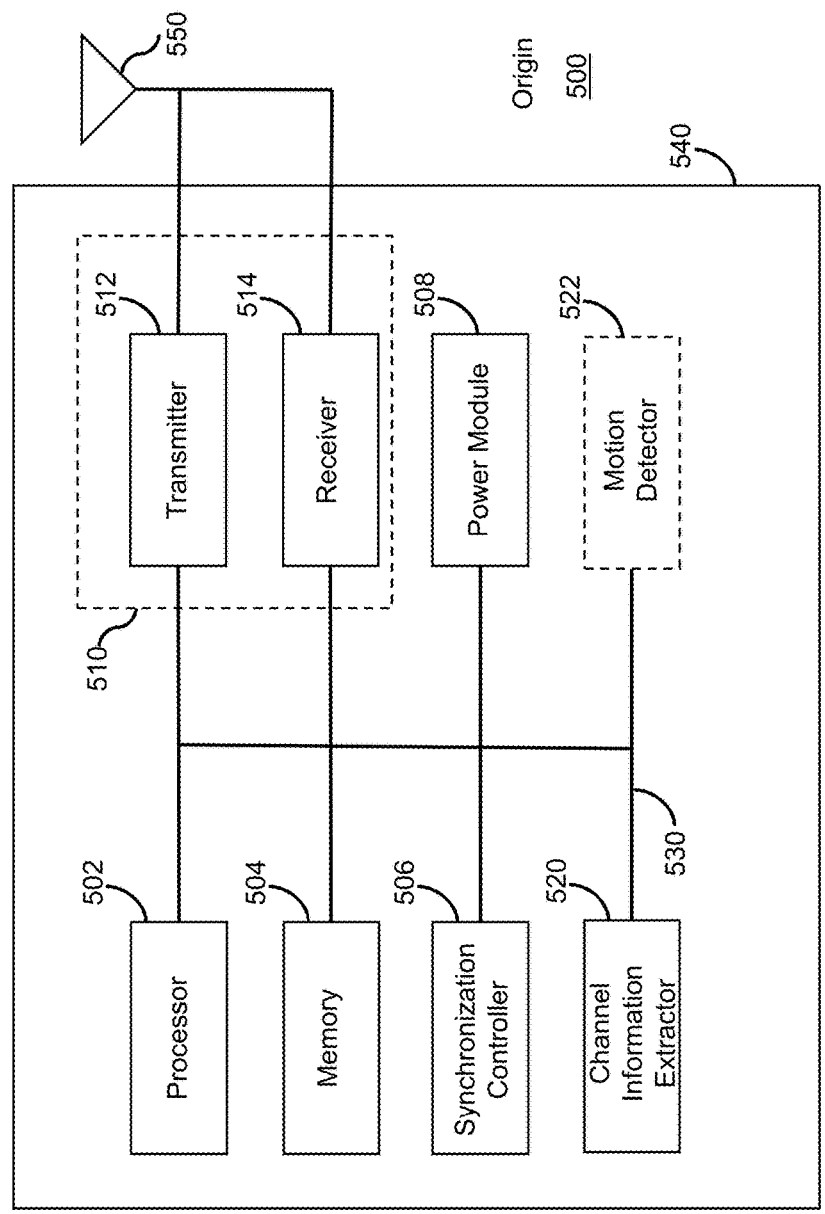
FIG. 5 illustrates an exemplary block diagram of a second wireless device, according to one embodiment of the present teaching.

FIG. 5 illustrates an exemplary block diagram of a second wireless device, e.g. an Origin 500, according to one embodiment of the present teaching. The Origin 500 is an example of a device that can be configured to implement the various methods described herein. As shown in FIG. 5, the Origin 500 includes a housing 540 containing a processor 502, a memory 504, a transceiver 510 comprising a transmitter 512 and a receiver 514, a power module 508, a synchronization controller 506, a channel information extractor 520, and an optional motion detector 522.

In this embodiment, the processor 502, the memory 504, the transceiver 510 and the power module 508 work similarly to the processor 302, the memory 304, the transceiver 310 and the power module 308 in the Bot 300. An antenna 550 or a multi-antenna array 550 is typically attached to the housing 540 and electrically coupled to the transceiver 510.

The Origin 500 may be a second wireless device that has a different type from that of the first wireless device (the Bot 300). In particular, the channel information extractor 520 in the Origin 500 is configured for receiving the wireless signal through the wireless multipath channel impacted by the motion of the object in the venue, and obtaining a time series of channel information (CI) of the wireless multipath channel based on the wireless signal. The channel information extractor 520 may send the extracted CI to the optional motion detector 522 or to a motion detector outside the Origin 500 for detecting object motion in the venue.

The motion detector 522 is an optional component in the Origin 500. In one embodiment, it is within the Origin 500 as shown in FIG. 5. In another embodiment, it is outside the Origin 500 and in another device, which may be a Bot, another Origin, a cloud server, a fog server, a local server, and an edge server. The optional motion detector 522 may be configured for detecting the motion of the object in the venue based on motion information related to the motion of the object. The motion information associated with the first and second wireless devices is computed based on the time series of CI by the motion detector 522 or another motion detector outside the Origin 500.

In one embodiment, the Origin 500 is a particular asynchronous heterogeneous Type 2 device of a radio monitoring system. The radio monitoring system may comprise at least one asynchronous heterogeneous Type 1 device and at least one asynchronous heterogeneous Type 2 device. The radio monitoring system may comprise at least one pairing of Type 1 and Type 2 devices, each pairing comprising one of the at least one Type 1 device, and one of the at least one Type 2 device. The particular asynchronous heterogeneous Type 2 device is in at least one particular pairing of Type 1 and Type 2 devices of the radio monitoring system. The particular Type 2 device is grouped with at least one particular Type 1 device through the at least one particular pairing of Type 1 and Type 2 devices. In one example, the particular asynchronous heterogeneous Type 2 device comprises: a wireless circuitry to receive asynchronously at least one asynchronous heterogeneous radio signal, a second heterogeneous processor communicatively coupled with the wireless circuitry, a second heterogeneous memory communicative coupled with the second heterogeneous processor, and a second heterogeneous set of instructions stored in the second heterogeneous memory. Each asynchronous heterogeneous radio signal is transmitted asynchronously by one of the at least one particular Type 1 device using a respective first heterogeneous processor, a respective first heterogeneous memory and a respective first heterogeneous set of instructions of the Type 1 device to at least one asynchronous heterogeneous Type 2 device through a wireless multipath channel influenced by a movement of a mass in a site. The second heterogeneous set of instructions, when executed, cause the second heterogeneous processor to secure asynchronously at least one respective series of channel information (time series of CI) of the wireless multipath channel, for each of the at least one particular pairing of Type 1 and Type 2 devices.

In one embodiment, the at least one respective time series of CI associated with the particular pairing of Type 1 and Type 2 devices is being derived asynchronously from the respective asynchronous heterogeneous radio signal received asynchronously by the wireless circuitry. In one example, the movement of the mass in the site is monitored individually and asynchronously, using a third processor, a third memory and a third set of instructions of a Type 3 device, based on time series of CI associated with a pairing of Type 1 and Type 2 devices comprising the particular Type 2 device. In another example, the movement of the mass is monitored jointly and asynchronously based on time series of CI associated with any pairings of Type 1 and Type 2 devices comprising the particular Type 2 device. In another example, the movement of the mass is monitored jointly and asynchronously based on time series of CI associated with any pairings of Type 1 and Type 2 devices comprising one of the at least one particular Type 1 device. In another example, the movement of the mass is monitored globally and asynchronously based on time series of CI associated with any pairings of Type 1 and Type 2 devices.

In one embodiment, for each Type 2 device, and for each of the at least one pairing of Type 1 and Type 2 devices comprising the Type 2 device, a respective heterogeneous similarity score associated with the respective pairing of Type 1 and Type 2 devices is computed asynchronously based on comparing a respective current window and a respective past window of at least one respective time series of CI associated with the pairing of Type 1 and Type 2 devices. In one example, the movement of the mass in the site is monitored individually and asynchronously based on asynchronously computed heterogeneous similarity score associated with the pairing of Type 1 and Type 2 devices comprising the particular Type 2 device. In another example, the movement of the mass in the site is detected individually and asynchronously when a heterogeneous similarity score associated with the pair of Type 1 and Type 2 devices comprising the particular Type 2 device is at least one of: greater than, and equal to, an individual threshold. In another example, the movement of the mass in the site is monitored jointly and asynchronously based on asynchronously computed heterogeneous similarity score associated with any pairing of Type 1 and Type 2 devices comprising the particular Type 2 device. In another example, the movement of the mass in the site is detected jointly and asynchronously when a first joint score computed based on heterogeneous similarity score associated with any pairing of Type 1 and Type 2 devices comprising the particular Type 2 device is at least one of: greater than, and equal to, a first joint threshold. In another example, the movement of the mass in the site is monitored jointly and asynchronously based on asynchronously computed heterogeneous similarity score associated with any pairing of Type 1 and Type 2 devices associated with one of the at least one particular Type 1 device. In another example, the movement of the mass in the site is detected jointly and asynchronously when a second joint score computed based on heterogeneous similarity score associated with any pairing of Type 1 and Type 2 devices associated with one of the at least one particular Type 1 device. In another example, the movement of the mass in the site is monitored globally and asynchronously based on asynchronously computed heterogeneous similarity score associated with any pairing of Type 1 and Type 2 devices. In another example, the movement of the mass in the site is detected globally and asynchronously when a third joint score computed based on heterogeneous similarity score associated with any pairing of Type 1 and Type 2 devices is at least one of: greater than, and equal to, a third joint threshold.

The synchronization controller 506 in this example may be configured to control the operations of the Origin 500 to be synchronized or un-synchronized with another device, e.g. a Bot, another Origin, or an independent motion detector. In one embodiment, the synchronization controller 506 may control the Origin 500 to be synchronized with a Bot that transmits a wireless signal. In another embodiment, the synchronization controller 506 may control the Origin 500 to receives the wireless signal asynchronously with other Origins. In another embodiment, each of the Origin 500 and other Origins may receive the wireless signals individually and asynchronously. In one embodiment, the optional motion detector 522 or a motion detector outside the Origin 500 is configured for asynchronously computing respective heterogeneous motion information related to the motion of the object based on the respective time series of CI.

In one example, the optional motion detector 522 or a motion detector outside the Origin 500 is configured for monitoring and/or detecting the motion of the object in the venue individually and asynchronously based on the asynchronously computed heterogeneous motion information associated with a pair of Type 1 and Type 2 devices. In another example, the optional motion detector 522 or a motion detector outside the Origin 500 is configured for monitoring and/or detecting the motion of the object in the venue jointly and asynchronously based on the asynchronously computed heterogeneous motion information associated with any pair of Type 1 and Type 2 devices comprising a particular Type 2 device. In another example, the optional motion detector 522 or a motion detector outside the Origin 500 is configured for monitoring and/or detecting the motion of the object in the venue jointly and asynchronously based on the asynchronously computed heterogeneous motion information associated with any pair of Type 1 and Type 2 devices comprising a particular Type 1 device. In another example, the optional motion detector 522 or a motion detector outside the Origin 500 is configured for monitoring and/or detecting the motion of the object in the venue globally and asynchronously based on the asynchronously computed heterogeneous motion information associated with any pair of Type 1 and Type 2 devices. A detailed structure of the optional motion detector 522 or a motion detector outside the Origin 500 will be described with respect to FIG. 7.

The various modules discussed above are coupled together by a bus system 530. The bus system 530 can include a data bus and, for example, a power bus, a control signal bus, and/or a status signal bus in addition to the data bus. It is understood that the modules of the Origin 500 can be operatively coupled to one another using any suitable techniques and mediums.

Although a number of separate modules or components are illustrated in FIG. 5, persons of ordinary skill in the art will understand that one or more of the modules can be combined or commonly implemented. For example, the processor 502 can implement not only the functionality described above with respect to the processor 502, but also implement the functionality described above with respect to the channel information extractor 520. Conversely, each of the modules illustrated in FIG. 5 can be implemented using a plurality of separate components or elements.

In one embodiment, in addition to the Bot 300 and the Origin 500, the system may also comprise: a third wireless device, e.g. another Bot, configured for transmitting an additional heterogeneous wireless signal through an additional wireless multipath channel impacted by the motion of the object in the venue, and a fourth wireless device, e.g. another Origin, that has a different type from that of the third wireless device. The fourth wireless device may be configured for: receiving the additional heterogeneous wireless signal through the additional wireless multipath channel impacted by the motion of the object in the venue, and obtaining a time series of additional channel information (CI) of the additional wireless multipath channel based on the additional heterogeneous wireless signal. The additional CI of the additional wireless multipath channel is associated with a different protocol or configuration from that associated with the CI of the wireless multipath channel. For example, the wireless multipath channel is associated with LTE, while the additional wireless multipath channel is associated with Wi-Fi. In this case, the optional motion detector 522 or a motion detector outside the Origin 500 is configured for detecting the motion of the object in the venue based on both the motion information associated with the first and second wireless devices and additional motion information associated with the third and fourth wireless devices computed by at least one of: an additional motion detector and the fourth wireless device based on the time series of additional CI.

Figure 6:
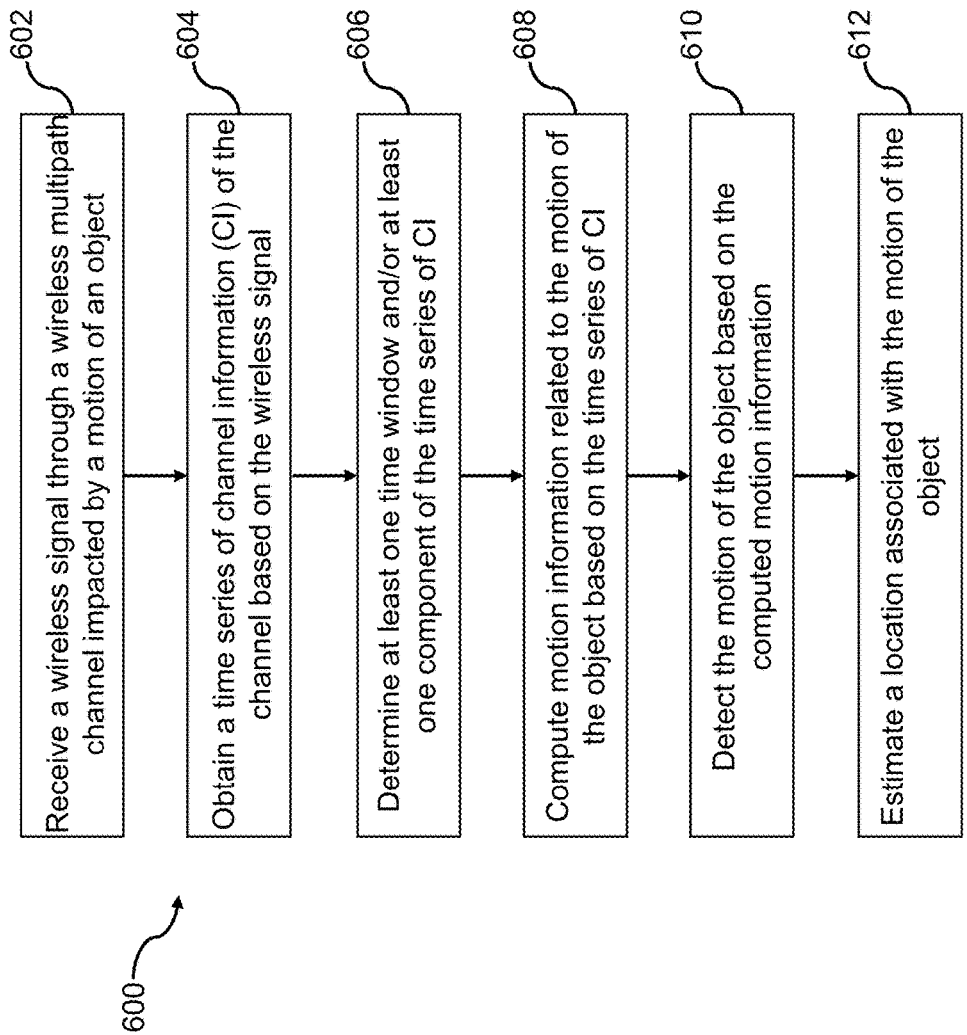
FIG. 6 illustrates a flowchart of an exemplary method performed by a second wireless device, according to one embodiment of the present teaching.

FIG. 6 illustrates a flowchart of an exemplary method performed by a second wireless device, e.g. the Origin 500 in FIG. 5, in accordance with some embodiments of the present disclosure. At operation 602, the Origin receives and analyzes a wireless signal through a wireless multipath channel impacted by a motion of an object. At operation 604, the Origin obtains a time series of channel information (CI) of the channel based on the wireless signal. Optionally at operation 606, the Origin determines at least one time window and/or at least one component of the time series of CI. Optionally at operation 608, the Origin computes motion information related to the motion of the object based on the time series of CI. Optionally at operation 610, the Origin detects the motion of the object based on the computed motion information. Optionally at operation 612, the Origin estimates a location associated with the motion of the object.

Figure 7:
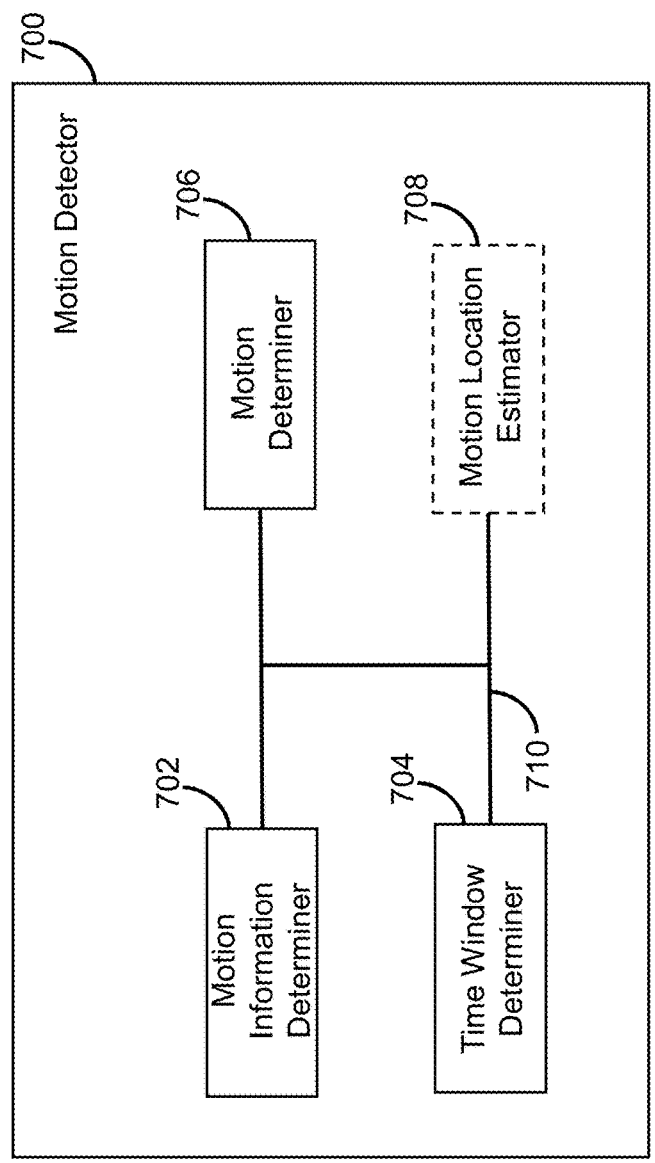
FIG. 7 illustrates an exemplary motion detector, according to one embodiment of the present teaching.

FIG. 7 illustrates an exemplary motion detector 700, according to one embodiment of the present teaching. The motion detector 700 may serve as a motion detector (e.g. the optional motion detector 522) in an Origin, or an independent motion detector outside any Origin. As shown in FIG. 7, the motion detector 700 in this example includes a motion information determiner 702, a motion determiner 706, a time window determiner 704, and an optional motion location estimator 708. According to various embodiments, the motion detector 700 may be coupled to at least one of: the first wireless device; the second wireless device; a third wireless device having a same type as that of the first wireless device; a fourth wireless device having a same type as that of the second wireless device; a cloud server; a fog server; a local server; and an edge server, for detecting and monitoring object motions.

In one embodiment, the motion detector 700 may receive the time series of CI from the channel information extractor 520, and compute motion information based on the time series of CI. For example, the motion information determiner 702 may receive the respective time series of CI from an Origin, and asynchronously compute respective heterogeneous motion information related to the motion of the object based on the respective time series of CI. In one example, the motion information determiner 702 may compute a heterogeneous similarity score between a current time window and a past time window of the time series of CI, based on at least one of: a distance score, an absolute distance, a Euclidean distance, a norm, a metric, a statistical characteristic, a time reversal resonating strength (TRRS), a cross-correlation, an auto-correlation, a covariance, an auto-covariance, an inner product of two vectors, a preprocessing, a signal conditioning, a denoising, a phase correction, a timing correction, a timing compensation, a phase offset compensation, a transformation, a projection, a filtering, a feature extraction, a finite state machine, a history of past similarity score, another past window of the at least one CI time series, a component-wise operation, machine learning, a neural network, a deep learning, a training, a discrimination, a weighted averaging, and another operation, such that the motion of the object in the venue is detected based on the computed heterogeneous similarity score. The motion information determiner 702 may send the computed motion information to the motion determiner 706 for detecting and monitoring object motions.

In one embodiment, the time window determiner 704 can determine a current window and a past window of the time series of CI, and send the current time window and the past time window to the motion information determiner 702. Then the motion information determiner 702 can compute asynchronously a heterogeneous similarity score between the current window and the past window of the time series of CI, such that the motion of the object in the venue is detected based on the motion information and the heterogeneous similarity score.

The motion determiner 706 in this example may receive the computed motion information from the motion information determiner 702, and detect the motion of the object in the venue based on motion information related to the motion of the object. In one embodiment, for each of the at least one component, the time window determiner 704 can determine asynchronously a respective current component window of the component based on a current time window, determine asynchronously a respective past component window of the component based on a past time window, and send the information about the respective current component window and the respective past component window to the motion determiner 706. The motion determiner 706 may compare component-wise the respective current component window with the respective past component window asynchronously to generate a comparison result, monitor component-wise the motion of the object based on the comparison result, and detect the motion of the object in the venue based on the asynchronous component-wise comparing.

In one embodiment, for each of the at least one component, the motion information determiner 702 can compute asynchronously a component similarity score associated with the respective current component window and the respective past component window, based on at least one of: a distance score, a norm, a metric, a statistical characteristic, a time reversal resonating strength (TRRS), a cross-correlation, an auto-correlation, a covariance, an auto-covariance, an inner product of two vectors, a preprocessing, a signal conditioning, a denoising, a phase correction, a timing correction, a timing compensation, a phase offset compensation, a transformation, a projection, a filtering, a feature extraction, a finite state machine, a history of past similarity score, another past window of the at least one time series of CI, a component-wise operation, machine learning, a neural network, a deep learning, a training, a discrimination, a weighted averaging, and another operation. The motion information determiner 702 may then compute asynchronously a heterogeneous similarity score based on a heterogeneous function of the at least one component similarity score. The heterogeneous function comprises at least one of: a representative value, a typical value, a weighted average, a percentile, a maximum, a minimum, a 40% quartile, a 50% quartile, a 60% quartile, a mean, a median, a mode, a sum, a product, a root, an arithmetic mean, a geometric mean, a harmonic mean, a generalized mean, an ordered statistic, a trimmed mean, a statistical function, an expected value, a variance, a selected one, and another function. The motion determiner 706 may detect the motion of the object in the venue when the heterogeneous similarity score is greater than or equal to a first threshold.

In another embodiment, for each of the at least one component, the motion information determiner 702 may compute asynchronously a component similarity score associated with the respective current component window and the respective past component window, based on at least one of: a distance score, a norm, a metric, a statistical characteristic, a time reversal resonating strength (TRRS), a cross-correlation, an auto-correlation, a covariance, an auto-covariance, an inner product of two vectors, a preprocessing, a signal conditioning, a denoising, a phase correction, a timing correction, a timing compensation, a phase offset compensation, a transformation, a projection, a filtering, a feature extraction, a finite state machine, a history of past similarity score, another past window of the at least one time series of CI, a component-wise operation, machine learning, a neural network, a deep learning, a training, a discrimination, a weighted averaging, and another operation. Then for each of the at least one component, the motion determiner 706 may detect component-wise the motion of the object asynchronously when the respective component similarity score is greater than or equal to a respective component threshold, and detect the motion of the object in the venue when a percentage of component-wise motion detection in a selected group of components is greater than or equal to a second threshold.

In one embodiment, the first wireless device is a Type 1 device having a Type 1; the second wireless device is a Type 2 device having a Type 2. In one example, the motion determiner 706 may monitor and/or detect the motion of the object in the venue individually and asynchronously based on the asynchronously computed heterogeneous motion information associated with a pair of Type 1 and Type 2 devices. In another example, the motion determiner 706 may monitor and/or detect the motion of the object in the venue jointly and asynchronously based on the asynchronously computed heterogeneous motion information associated with any pair of Type 1 and Type 2 devices comprising a particular Type 2 device. In another example, the motion determiner 706 may monitor and/or detect the motion of the object in the venue jointly and asynchronously based on the asynchronously computed heterogeneous motion information associated with any pair of Type 1 and Type 2 devices comprising a particular Type 1 device. In another example, the motion determiner 706 may monitor and/or detect the motion of the object in the venue globally and asynchronously based on the asynchronously computed heterogeneous motion information associated with any pair of Type 1 and Type 2 devices.

In one embodiment, for each pair of Type 1 and Type 2 devices comprising a Type 1 device and a Type 2 device, the respective Type 2 device or the motion information determiner 702 in the motion detector 700 is configured for computing asynchronously a respective heterogeneous similarity score between a respective current window and a respective past window of the respective time series of CI. Then the motion determiner 706 or the Type 2 device may detect the motion of the object in the venue individually and asynchronously when a first function of the respective heterogeneous similarity score associated with a pair of Type 1 and Type 2 devices is greater than or equal to a respective individual threshold, detect the motion of the object in the venue jointly and asynchronously when a second function of the heterogeneous similarity scores associated with any pair of Type 1 and Type 2 devices comprising a particular Type 2 device is greater than or equal to a respective joint threshold, detect the motion of the object in the venue jointly and asynchronously when a third function of the heterogeneous similarity scores associated with any pair of Type 1 and Type 2 devices comprising a particular Type 1 device is greater than or equal to another respective joint threshold, and/or detect the motion of the object in the venue globally and asynchronously when a fourth function of the heterogeneous similarity scores associated with any pair of Type 1 and Type 2 devices is greater than or equal to a respective global threshold.

The optional motion location estimator 708 in this example is an optional component in the motion detector 700. In one embodiment, the optional motion location estimator 708 may be outside the motion detector 700 and serve as a supervisory device, that is configured for: partitioning a map of the venue into a plurality of regions; and/or associating asynchronously the motion of the object with at least one of the plurality of regions of the map of the venue based on heterogeneous motion information received from the Type 2 wireless devices. In one embodiment, at least one of the motion detector 700 and the Type 2 devices is configured for performing at least one of: partitioning a respective feature space of each of the heterogeneous motion information into a plurality of respective feature segments; constructing a respective mapping that associates each respective feature segment with at least one of the plurality of regions of the map of the venue; associating asynchronously the motion of the object individually with at least one of the plurality of regions of the map of the venue based on the respective mapping; partitioning a joint feature space of heterogeneous motion information associated with a plurality of pairs of Type 1 and Type 2 devices into a plurality of joint feature segments; constructing a joint mapping that associates each joint feature segment with at least one of the plurality of regions of the map of the venue; and associating asynchronously the motion of the object jointly with a particular one of the plurality of regions of the map of the venue based on the joint mapping.

In one embodiment, the motion detector 700 may serve as a Type 3 device of a radio monitoring system. The radio monitoring system may comprise at least one asynchronous heterogeneous Type 1 device and at least one asynchronous heterogeneous Type 2 device. The radio monitoring system may comprise at least one doublet of Type 1 and Type 2 devices, each doublet comprising one of the at least one asynchronous heterogeneous Type 1 device, and one of the at least one asynchronous heterogeneous Type 2 device. The Type 3 device may comprise a third processor communicatively coupled with at least one of: at least one asynchronous heterogeneous Type 1 device, and at least one asynchronous heterogeneous Type 2 device; a third memory communicatively coupled with the third processor; and a third set of instructions stored in the third memory. The third set of instructions, when executed, cause the third processor to: for each Type 2 device, and for each of the at least one doublet of Type 1 and Type 2 devices comprising the Type 2 device, receive asynchronously at least one respective time series of channel information (time series of CI) of a wireless multipath channel influenced by a motion of an item in a place received asynchronously by the Type 2 device using a respective second processor, a respective second memory and a respective second set of instructions of the Type 2 device. The at least one respective time series of CI associated with the respective doublet of Type 1 and Type 2 devices is obtained asynchronously from a respective asynchronous heterogeneous radio signal transmitted from a respective Type 1 device of the respective doublet using a respective first processor, a respective first memory and a respective first set of instructions of the respective Type 1 device to at least one asynchronous heterogeneous Type 2 device through the wireless multipath channel. In addition, the third set of instructions, when executed, cause the third processor to perform at least one of the following: tracking the motion of the item in the place individually and asynchronously, based on time series of CI associated with a particular doublet of Type 1 and Type 2 devices comprising a particular Type 2 device and a particular Type 1 device, tracking the motion of the item jointly and asynchronously based on time series of CI associated with any of the at least one doublet of Type 1 and Type 2 devices associated with the particular Type 2 device, tracking the motion of the item jointly and asynchronously based on time series of CI associated with any of the at least one doublet of Type 1 and Type 2 devices associated with the particular Type 1 device, and tracking the motion of the item globally and asynchronously based on time series of CI associated with any of the at least one doublet of Type 1 and Type 2 devices.

In one embodiment, the system may comprise a monitoring device configured for signaling asynchronously information associated with at least one of: the map of the venue, the plurality of partitioned regions of the map, regions associated with any detected motion of the object, heterogeneous motion information associated with at least one pair of Type 1 and Type 2 devices, the component-wise similarity score, the heterogeneous similarity score, past motion information, past similarity score, another past information, Type 1 devices, and Type 2 devices. In one example, the monitoring device may be a mobile phone running an app or GUI to display the detection or monitoring result. In other examples, the monitoring device may be a desktop, a laptop, a tablet, an IoT device, or a smart speaker.

FIG. 8 illustrates an exemplary algorithm of motion detection, according to one embodiment of the present teaching. In FIG. 8, G(f; t) may denote the CSI (or CI) amplitude of subcarrier f at time slot t. For a system with M by N antenna configuration, the total number of subcarriers is F=MNL, where L is the number subcarrier for each antenna pair. For each subcarrier f, one may compute a motion statistic as the first order of the sample auto-correlation coefficient, where T is the length of the time window to compute the motion statistic. The physical meaning of the motion statistic is that the higher the motion statistic, the stronger the motion is. On each subcarrier, there is a motion statistic calculated for detecting a motion, e.g., when its sample auto-correlation coefficient is larger than a predefined threshold. A majority vote may be applied to fuse all the decisions from F subcarriers of the system. When more than half of the total number of the available subcarriers detect the human motion inside the elevator, then the system detects the motion; otherwise, no motion is detected. In another embodiment, G(f; t) may be defined as another function of the CI on subcarrier f at time slot t, for example, (CSI amplitude)^2, (CSI amplitude)^4, real/imaginary part of the CSI after phase offset cleaning. The motion static may also be defined as the sample auto-correlation coefficient with another order, if the order is less than a quarter of the time window length T. Other decision fusion rule such as weighted combining of the individual decision may also be adopted.

Figure 9:
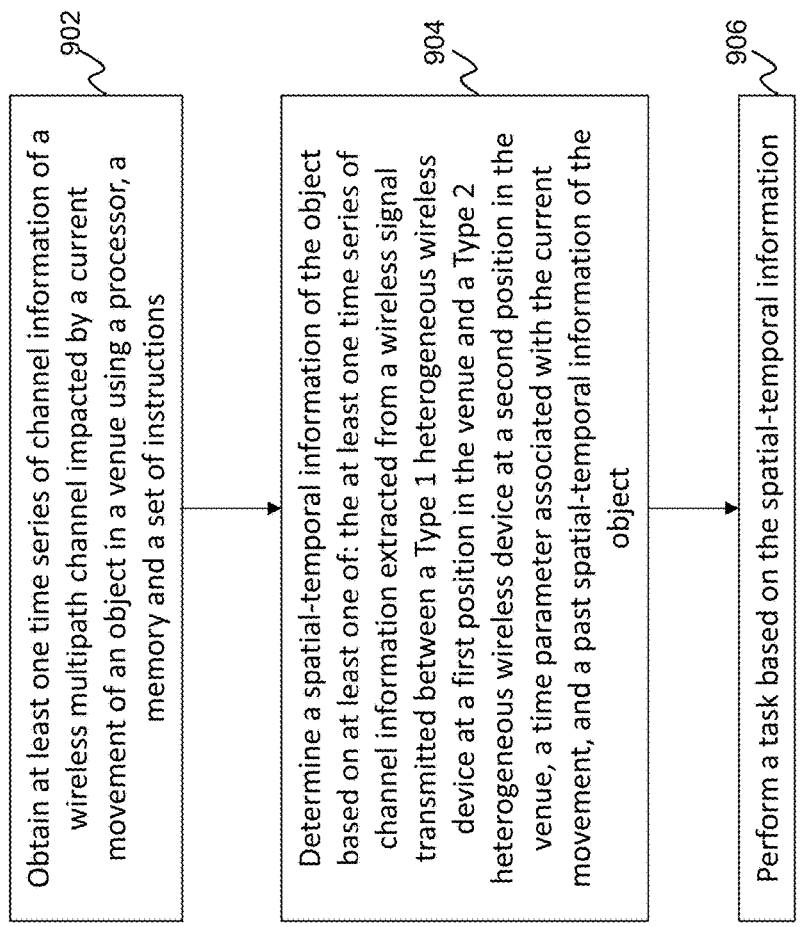
FIG. 9 illustrates an exemplary method for object motion detection, according to one embodiment of the present teaching.

FIG. 9 illustrates an exemplary method for object motion detection, according to one embodiment of the present teaching. At operation 902, at least one time series of channel information of a wireless multipath channel is obtained, using a processor, a memory and a set of instructions stored in the memory. The at least one time series of channel information is extracted from a wireless signal transmitted between a Type 1 heterogeneous wireless device at a first position in a venue and a Type 2 heterogeneous wireless device at a second position in the venue through the wireless multipath channel. The wireless multipath channel is impacted by a motion of an object in the venue. At operation 904, a spatial-temporal information of the object is determined based on at least one of: the at least one time series of channel information, a time parameter associated with the motion, and a past spatial-temporal information of the object. At operation 906, a task is performed based on the spatial-temporal information. The spatial-temporal information may be a form of motion information, and motion information may be a form of spatial-temporal information. A Type 1 device may be the First Device, the Type 2 device may be the Second Device. The "task" mentioned above may be to "monitor motion" and/or to "detect motion".

Figure 10:
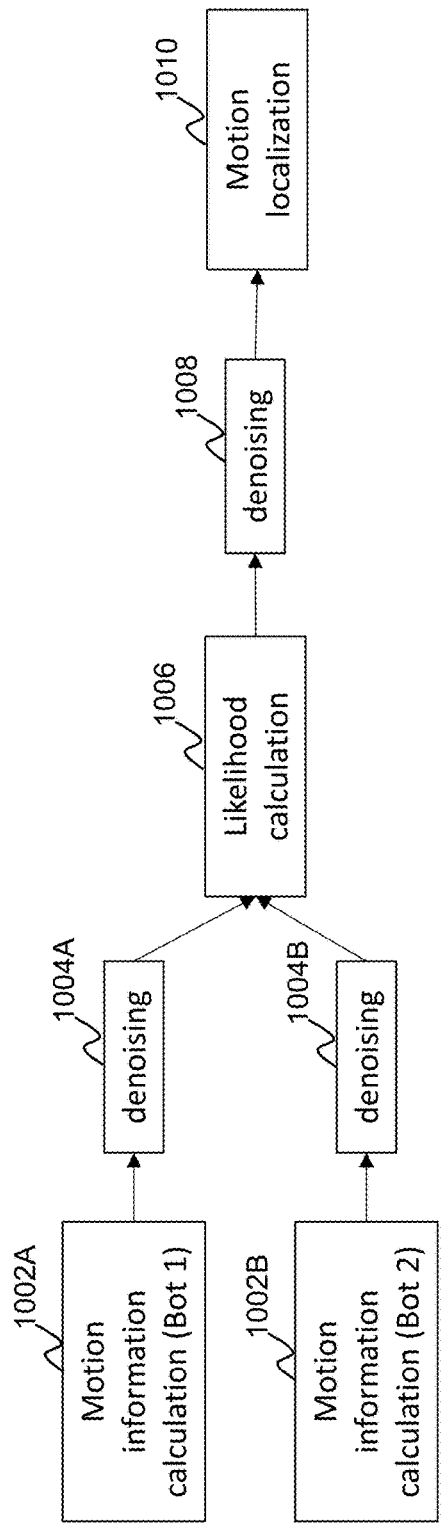
FIG. 10 illustrates an exemplary flowchart for a method of object motion localization, according to one embodiment of the present teaching.

FIG. 10 illustrates an exemplary flowchart for a method of object motion localization, according to one embodiment of the present teaching. The object motion localization in FIG. 10 is based on 2 Bots (Type 1 Devices), paired with a particular Origin (Type 2 Device). First, for each Bot, the motion information/statistics associated with each Bot-Origin pair (1002A and 1002B) is calculated. Then each of the calculated motion information is passed through a denoising processor (e.g. a low pass filter) to remove noise (1004A and 1004B). Then a motion likelihood (1006) is calculated according to some function. The motion likelihood may denote a probability of motion occurring near a Bot or near an Origin. Since the likelihood may also be noisy, e.g., change rapidly when motion occurs, the likelihood values may go through another denoising processor 1008. Finally, a decision of motion localization is made on where the motion happens.

An example function of mapping motion information to likelihood may be defined as follows. Denote $m_i(t)$ as the motion information calculated for Bot i-Origin pair at time t. An example of motion likelihood near Bot i at time t may be calculated as $$L_i(t) = \begin{cases} 1, & \text{Bot } i \text{ detects motion, the other } Bot \text{ doesn't detect motion;} \\ 0, & \text{Bot } i \text{ doesn't detect motion, the other } Bot \text{ detect motion;} \\ \frac{m_i^p}{\Sigma_i m_i^p}, & \text{Both } Bots \text{ detect motion} \end{cases}$$

$L_i(t)$ is undefined when neither of the bots detect motion. Denote $\tilde{L}_i(t)$ as the likelihood after denoising an example of motion localization decision rule can be $$MLoc(t) = \begin{cases} \text{Near } Bot \text{ 1}, & \text{when } \tilde{L}_1(t) > \eta_1 \\ \text{Near } Bot \text{ 2}, & \text{when } \tilde{L}_2(t) > \eta_2 \\ \text{Near the common area}, & \text{when } \tilde{L}_1(t) < \eta_1 \text{ and } \tilde{L}_2(t) < \eta_2 \end{cases}$$

When both $L_i(t)$ and $L_2(t)$ are undefined, then no motion exists in the monitored area.

Different embodiments of the present disclosure will now be described in detail hereinafter. It is noted that the features of the embodiments and examples in the present disclosure may be combined with each other in any manner without conflict.

In one embodiment, a wireless (or radio or RF) monitoring system comprises at least one asynchronous heterogeneous Type 1 wireless (or radio or RF) device (or apparatus) and at least one asynchronous heterogeneous Type 2 wireless (or radio or RF) device. The wireless (or radio or RF) monitoring system also comprises at least one pair (or pairing, or couple, or duo, or combination, or doublet, or combo, or match, or team) of Type 1 and Type 2 devices, each pair comprising one of the at least one asynchronous heterogeneous Type 1 device, and one of the at least one asynchronous heterogeneous Type 2 device. Each of the at least one Type 2 device is in at least one respective particular pair of Type 1 and Type 2 devices. Each Type 2 device is associated (or grouped or coupled or paired or conjoined or combined or affiliate or partnered) with at least one respective particular Type 1 device through the at least one respective particular pair of Type 1 and Type 2 devices.

In one embodiment, a disclosed method of the wireless (or radio or RF) monitoring system comprises obtaining (or receiving, or getting, or collecting, or retrieving, or securing, or fetching) asynchronously at least one respective time series of channel information (CI) (or channel data) of a wireless multipath channel impacted (or influenced) by a motion (or movement, or act, or gesture, or change, or drift, or dynamics, or flow, or fluctuation, or flux, or gesticulation, or kinetics, or locomotion, or mobility, or movement, or oscillation, or passing, or progressing, or stirring, or swaying) of an object (or article, or body, or commodity, or gadget, or item, or matter, or substance, or entity, or mass) in a venue (or locale, or place, or site, or setting, or ground) for each Type 2 device and for each of the at least one respective particular pair of Type 1 and Type 2 devices comprising the Type 2 device. The at least one respective time series of CI (CI time series) associated with the particular pair of Type 1 and Type 2 devices is extracted (or obtained or derived or gleaned or collected or garnered) asynchronously from a respective asynchronous heterogeneous wireless (or radio or RF) signal. The respective asynchronous heterogeneous wireless (or radio or RF) signal is transmitted asynchronously from a respective one of the at least one respective particular Type 1 device using a respective first heterogeneous processor, a respective first heterogeneous memory and a respective first heterogeneous set of instructions of the Type 1 device to at least one asynchronous heterogeneous Type 2 device through the wireless multipath channel.

The motion of the object in the venue is monitored (or tracked or checked or observed or overseen or observed or surveyed) using a third processor, a third memory and a third set of instructions of a Type 3 device in at least one of the four following ways: (a) the motion of the object in the venue is monitored individually and asynchronously, based on CI time series associated with a pair of Type 1 and Type 2 devices comprising a particular Type 2 device; (b) the motion of the object is monitored jointly and asynchronously based on CI time series associated with any of the at least one pair of Type 1 and Type 2 devices associated with the particular Type 2 device; (c) the motion of the object is monitored jointly and asynchronously based on CI time series associated with any of the at least one pair of Type 1 and Type 2 devices associated with one of the at least one respective particular Type 1 device, and (d) the motion of the object is monitored globally and asynchronously based on CI time series associated with any of the at least one pair of Type 1 and Type 2 devices.

For example, more than one asynchronous heterogeneous Type 1 devices may transmit asynchronously their respective asynchronous heterogeneous wireless (or radio or RF) signals to the same Type 2 devices. (Some Type 1 device may be transmitting to more than one Type 2 devices.) Their transmission may be synchronized momentarily. Their transmission may be asynchronous, but sometimes the wireless (or radio or RF) signals of two of the Type 1 devices may overlap in time. Their transmission may be coordinated. The motion of the object may be jointly monitored based on CI time series associated pairs of Type 1 and Type 2 devices comprising the Type 2 device and one of the more than one asynchronous Type 1 devices.

In another example, an asynchronous heterogeneous Type 1 devices may transmit the asynchronous heterogeneous wireless (or radio or RF) signal to more than one asynchronous heterogeneous Type 2 devices. The asynchronous heterogeneous wireless (or radio or RF) signal may be received asynchronously, or near synchronously, or simply synchronously. CI time series may be extracted asynchronously from the received asynchronous heterogeneous wireless (or radio or RF) signal. The motion of the object may be jointly monitored based on the CI time series associated pairs of Type 1 and Type 2 devices each comprising the asynchronous heterogeneous Type 1 device and one of the more than one asynchronous heterogeneous Type 2 devices.

Each channel information (CI) may comprise at least one of: a channel state information (CSI), a frequency domain CSI, a frequency domain CSI associated with at least one sub-band, a time domain CSI, a CSI in a domain, a channel impulse response (CIR), a channel frequency response (CFR), a channel characteristics, a channel filter response, a CSI of the wireless multipath channel, an information of the wireless multipath channel, a time stamp, an auxiliary information, a data, a meta data, a user data, an account data, an access data, a security data, a session data, a status data, a supervisory data, a household data, an identity (ID), a device data, a network data, a neighborhood data, an environment data, a real-time data, a sensor data, a stored data, an encrypted data, a compressed data, a protected data, and/or another channel information.

A channel information (CI) may be extracted from a received probe signal (with multi-path) by a Type 2 device, an integrated circuit (IC, or chip) of the Type 2 device (e.g. a Wi-Fi chip, an LTE chip, a cellular network chip, a wireless network chip, a mesh network chip, a Bluetooth chip, a UWB chip, etc). The probe signal may/may not contain data. More than one CI may be extracted from a received probe signal. One CI may be extracted for each pair of transmitting antenna and receiving antenna. For example, for a Type 1 device with 3 transmitting antennas and a Type 2 device with 2 receiving antennas, a total of 6 CI may be extracted from each probe signal.

A CI may comprise information of the channel from more than one pairs of transmitting antennas and receiving antennas. A CI may be sent from the Type 2 device to another device (e.g. a neighboring device, a companion device, a paired device, an edge device, a cloud device). The another device may be communicatively coupled with the Type 2 device. The another device may be another Type 2 device, the Type 1 device and/or another Type 1 device. The CI obtained by different heterogeneous Type 2 devices may be different because different heterogeneous Type 2 devices may be at different locations within the venue such that they may experience different multipath patterns. In other words, the respective wireless multipath channel experienced by respective heterogeneous Type 2 device may be different. The CI may capture information (e.g. motion, periodic motion, shape, size, volume, path, direction, distance, speed, acceleration, change, rate of change, etc.) of the venue and/or any object (people, pet, creature, machine, device with movable parts, door, window, wall, partitioning, furniture, fixture, piping, air conditioning, heating, fan, etc.) in the venue. The CI may have some inherent imperfection such as noise, phase error, timing error, etc. The CI may be preprocessed, processed and/or post-processed.

Any preprocessing, processing and/or postprocessing may comprise: doing nothing, zero-padding, time-domain processing, frequency domain processing, time-frequency processing, spatially varying processing, temporally varying processing, adaptive processing, de-noising, smoothing, conditioning, enhancement, restoration, feature extraction, weighted averaging, averaging over antenna links, averaging over selected frequency, averaging over selected components, quantization, vector quantization, filtering, linear filtering, nonlinear filtering, low-pass filtering, bandpass filtering, high-pass filtering, median filtering, ranked filtering, quartile filtering, percentile filtering, mode filtering, linear filtering, nonlinear filtering, finite impulse response (FIR) filtering, infinite impulse response (IIR) filtering, moving average (MA) filtering, auto-regressive (AR) filtering, auto-regressive moving average (ARMA) filtering, thresholding, soft thresholding, hard thresholding, soft clipping, local maximization, local minimization, optimization of a cost function, neural network, machine learning, supervised learning, unsupervised learning, semi-supervised learning, transformation, mapping, transform, inverse transform, integer transform, power-of-2 transform, real transform, floating-point transform, fixed-point transform, complex transform, fast transform, Fourier transform, Laplace transform, Hadamard transform, Hilbert transform, sine transform, cosine transform, triangular transform, wavelet transform, transformation, decomposition, selective filtering, adaptive filtering, derivative, first order derivative, second order derivative, higher order derivative, integration, zero crossing, indicator function, absolute conversion, convolution, multiplication, division, another transform, another processing, another filter, another function, and/or another preprocessing.

Any of preprocessing, processing and/or post-processing may comprise: normalization, temporal normalization, frequency normalization, magnitude correction, phase correction, phase cleaning, cleaning a phase associated with the channel information, normalizing components associated with the channel information, cleaning a phase of frequency components of the channel information, normalizing the frequency components, re-sampling, labeling, tagging, training, sorting, grouping, folding, thresholding, matched filtering, spectral analysis, clustering, quantization, vector quantization, time correction, time base correction, time stamp correction, sampling rate up-conversion/down-conversion, interpolation, intrapolation, extrapolation, subsampling, decimation, compression, expansion, encryption decryption, coding, storing, retrieving, transmitting, receiving, representing, merging, combining, splitting, tracking, monitoring, projection, orthogonal projection, non-orthogonal projection, over-complete projection, decomposition, eigen-decomposition, principal component analysis (PCA), sparse approximation, matching pursuit, and another operation etc.

In the case of at least one Type 1 devices interacting with at least one Type 2 devices, the processing, preprocessing, post-processing, and/or other processing may be different (heterogeneous) for different devices. The processing/preprocessing/post-processing/other processing may be based on locations, orientation, direction, roles, user-related characteristics, settings, configurations, available resources, available bandwidth, network connection, hardware, software, processor, co-processor, memory, battery life, available power, antennas, antenna types, directional/unidirectional characteristics of the antenna, power setting, and/or other parameters/characteristics of the devices.

Any preprocessing, processing and/or postprocessing may require one or more thresholds. Any thresholds may be pre-determined, adaptively determined and/or determined by a finite state machine. The adaptive determination may be based on time, space, location, antenna, path, link, state, battery life, remaining battery life, available power, available computational resources, available network bandwidth, etc.

The wireless (or radio or RF) signal transmitted from the heterogeneous Type 1 device to the heterogeneous Type 2 device may be a series of probe signals. Each probe signal may be an impulse, a number (e.g. 2, 3, 4, or more) of impulses, or another signal waveform. The another signal waveform may be based on the wireless multipath channel. The time separation of the number of impulses may be changed over time. (For example, the time separation between the second and third impulses may be different from the time separation between the first and second impulses). The magnitude of different impulses may be different (e.g. the first impulse may be stronger or weaker than the second impulse). The shape of different impulses may be different. (e.g. the first impulse may have a narrow, triangular waveform while the second impulse may have yet another waveform). The probe signal may be adaptive changed over time. The probe signal(s) may be different for different channels, different space-time-frequency channels, different antenna, etc. The probe signal(s) may be different for different Type 1 devices and/or Type 2 devices. The probe signal may be changed based on a feedback signal (e.g. from one or more Type 2 devices). The probe signal(s) may/may comprise data. Some probe signals may comprise data while some other probe signals may not comprise data.

The series of probe signals may be at regular intervals (e.g. 40 probe signals per second, with an interval of 25 ms ($\frac{1}{40}$ second) between adjacent probe signals), or irregular intervals (e.g. probe signals sent when the wireless channel is less busy or not busy, or probe signals sent in short/longer/long bursts adaptively or on demand). The regular intervals and/or waveform associated with each probe signal may be changed over time. For example, the probe signals may be 40 probe signals per second for a period of time (e.g. 1 day, 1 hour, or 20 seconds), and changed to 1000 probe signals per second for another period of time. The change may be based on a user input, a system command, a task, a change in the task, the venue, a change of the venue, the respective object, a change of the respective object, the respective motion of the respective object, a change of the respective motion of the respective object, and/or the monitoring of the respective object/the respective motion of the respective object.

The wireless multipath channel may be associated with a media access control (MAC) layer, a physical (PHY) layer, Wi-Fi, an IEEE 802.11 standard, 802.11a/b/g/n/ac/ad/af/ag/ah/ai/aj/aq/ax/ay, Bluetooth, Bluetooth 1.0/1.1/1.2/2.0/2.1/3.0/4.0/4.1/4.2/5, BLE, mesh network, an IEEE 802.16/1/1a/1b/2/2a/a/b/c/d/e/f/g/h/i/j/k/l/m/n/o/p/, standard, 802.16, Zigbee, WiMax, UWB, mobile channel, 1G/2G/3G/3.5G/4G/LTE/5G/6G/7G, etc.

The venue may comprise an indoor environment, an enclosed environment, an outdoor environment, an open-air environment (e.g. an open-air parking lot), a facility, a warehouse, a factory, a manufacturing facility, an assembly line, a building, a multi-story building, a house, a home, an office, a store, a supermarket, a casino, a hotel, a room, a box, a stadium, a hall, a station, an airport, a port, a subway, a vehicle, a car, a boat, a ship, a cruise ship, a military vehicle, a submersible, a plane, a drone, a cave, a tunnel, a pipe, a piping system, a crawl space, a maintenance system, a tube, an air conditioning/ventilation system, a fluid, etc. The venue may comprise people, pet, children, animals, plants, partitions, walls, dry walls, concrete walls, brick walls, glass walls, metal walls, doors, windows, glasses, floors, ceilings, attics, garage, fireplace, parking facilities, structure elements, columns, beams, movable objects, non-movable objects, furniture, wardrobe, fixtures, machines, devices, lighting, curtains, blinds, construction features, building features, water pipes, air ducts, crawl space, basement, elevator, stairs, stair wells, hall way, corridor, maintenance space, fan, ventilation system, air-condition system, heat, HVAC, electrical wiring, refrigerator, cooking devices, oven, microwave, stove, television, sound system, smart speaker, lights, carpets, restricted area, limited-access area, forbidden area, etc.

The object may comprise a person, a crowd, a congregation of people, a group of people, a baby, a sick person, an older person, a younger person, an intruder, a suspicious person, a consumer, a supervisor, a professional, an athlete, a waiter, a shopper, a staff, an officer, a customer, a manager, a high-valued person, a targeted person, a doctor, a patient, a guest, a security personnel, a traveler, a pet, an animal, a vehicle, a automated guided vehicle (AGV), a driverless car, a motorcycle, a bicycle, a boat, a ship, a truck, a car, a train, a tram, an electric vehicle, a plane, a drone, an air-borne device, a subway train, a transport, a vehicle on a track/rail, a machine, a fixture, a furniture, a moveable object, a non-moveable object, a lift, a chair, a table, a valuable object, a jewelry, a robot, a robotic arm, a motion capture device, a tool, a body part of a person, a head, a neck, a shoulder, an arm, an elbow, a hand, a finger, a refrigerator, an air conditioner, a vacuum cleaner, a smart device, a smart fabric, a smart material, a smart phone, a phone, an electric device, an electronic device, a television, a media device, a heating device, a microwave oven, an oven, a stove, a light-emitting device, a sound-producing device, a speaker, a light-capturing device, a camera, a infra-red sensor, a sound-capturing device, a microphone, a moveable object, a non-moveable object, a rigid object, a non-rigid object, a fluid object, a deforming object, a fan, a hollow object, a box, a room, a liquid, a fluid, a plasma, a particle, etc.

Two of the respective objects may be the same object. Any of the respective objects may be the same object. The motion may comprise no-motion, inaction, idling, immobility, rest, stagnation, a repose, an impulsive motion, a collision, an impact, an explosion, a stiffening, a relaxation, a locomotion, an induced motion, a reactive motion, an active motion, a sudden motion, a steady motion, a waving motion, a motion sequence, a steady-state motion sequence, a repeatable motion, a changing motion, a timed motion, an oscillation, a periodic motion, a pseudo-periodic motion, a translational motion, a rotational motion, a regular motion, an irregular motion, a transient motion, a resizing, a deformation, a complex motion, a vibration, a shaking, an earthquake, a shock, an event, a chaotic motion, a statistical motion, a stationary motion, a non-stationary motion, a head motion, a neck motion, a shoulder motion, an arm motion, a hand motion, a finger motion, a waist motion, a leg motion, a foot motion, a body motion, an emotion display, an act, a gesture, a gait, a lie-down motion, a get-up motion, a sitting, a standing, a walking, a running, a jogging, a jumping, a dancing, a bow, a curtsy, a signing, an expression, an indication, a talking, a singing, a wind motion, a turbulence, a door movement, a window movement, a machine motion, a movement of a moveable object, an installation of a machine, a movement associated with a motor, a car movement, a braking, a turn, a change of direction, a drift, a sway, a stirring, a fluctuation, a disturbance, a flux, a mixing, a stirring, a right-turn, a left-turn, a wind-induced motion, a heart-beat, a breathing motion, a water motion, a fluid motion, a flow, a fluctuation, a motion of a flexible/non-rigid object, a temperature-related motion, expansion, contraction, a crowd motion, a turmoil, an unrest, etc.

The monitoring may comprise monitoring at least one characteristics associated with the respective object and/or the respective motion of the respective object. The characteristics may comprise at least one of: a frequency of pseudo-periodic motion, a frequency characteristics, a frequency spectrum, a time period of pseudo periodic motion, a count of periodic motion, a temporal characteristics, a temporal profile, a timing of pseudo-periodic motion, a starting time, an ending time, a duration, an occurrence of event(s), a timing of events, a time separation between two events, an evolution of events, a count of events, a count of frequency domain events, a count of time domain events, a count of time-frequency events, a history of motion, a motion type, a motion classification, a location of the object, a speed, a displacement, an acceleration, a rotational speed, a rotational characteristics, a gait cycle of the object, a transient behavior of the object, a transient motion, a change in pseudo-periodic motion, a change in frequency of pseudo-periodic motion, a change in gait cycle, an event associated with pseudo-periodic motion, an event associated with transient motion, a sudden-motion event, a fall-down event, and another information.

The characteristics may further comprise a location, a location tag, a location label, a starting location, an ending location, a horizontal location, a vertical location, a length, an area, a volume, a capacity, a distance, a direction, a displacement, a displacement vector, a speed, a velocity, a velocity vector, an acceleration, an acceleration vector, a rotational speed, a rotational acceleration, a gait cycle, a motion type, a motion classification, a motion characteristics, a sudden motion, a correlation between two characteristic, a similarity between two characteristics, a co-occurrence of two characteristics, a timed-occurrence of two characteristics, a temporal characteristics, a timing, a time stamp, a time period, a time window, a sliding time window, a time delay, a time mapping, a time label, a time tag, a starting time, an ending time, a temporal profile, a temporal history, a trend, a spatial-temporal trend, a frequency trend, a frequency characteristics, a frequency, a temporal frequency, a spatial frequency, a spatial-temporal frequency, a frequency range, a starting frequency, an ending frequency, a temporal range, a spatial range, a spatial-temporal change, a spatial change, a temporal change, a frequency change, a frequency shift, an information of a periodic motion, an information of a transient motion, a time trend, a frequency trend, a spatial trend, a time-varying characteristics, a steady-state characteristics, a transient characteristics, a consumed characteristics, a remaining characteristics, a stationary characteristics, a cyclo-stationary characteristics, a pseudo-stationary characteristics, an event, a temporal event, a spatial event, a frequency event, a spatial-temporal event, and/or another information.

A heterogeneous Type 1 device and/or a heterogeneous Type 2 device may be an antenna, a device with an antenna, a device that has interface to attach/connect to/link an antenna, a device with a wireless transceiver, a device with a wireless transmitter, a device with a wireless receiver, an internet-of-thing (IoT) device, a device with wireless network, a device with both wired networking and wireless networking capability, a device with a wireless integrated circuit (IC), a Wi-Fi device, a device with a Wi-Fi chip (e.g. 802.11a/b/g/n/ac/ax standard compliant, etc), a Wi-Fi access point (AP), a Wi-Fi client, a Wi-Fi router, a Wi-Fi repeater, a Wi-Fi hub, a Wi-Fi mesh network router/hub/AP, a wireless mesh network router, an adhoc network device, a wireless mesh network device, a mobile device (e.g. 2G/2.5G/3G/3.5G/4G/LTE/5G/6G/7G, etc), a cellular device, a mobile network base station, a mobile network hub, a mobile network compatible device, an LTE device, a device with an LTE module, a mobile module (e.g. a circuit board with an mobile-enabling chip (IC) such as Wi-Fi chip, LTE chip, BLE chip, etc), a Wi-Fi chip (IC), an LTE chip, a BLE chip, a device with a mobile module, a smart phone, a companion device (e.g. dongle, attachment, plugin) for smart phones, a dedicated device, a plug-in device, an AC-powered device, a battery-powered device, a device with a processor/memory/set of instructions, a smart clock, a smart stationary, a smart pen, a smart user-interface, a smart paper, a smart mat, a smart camera, a smart television (TV), a set-top-box, a smart microphone, a smart speaker, a smart refrigerator, a smart oven, a smart machine, a smart phone, a smart wallet, a smart furniture, a smart door, a smart window, a smart ceiling, a smart floor, a smart wall, a smart table, a smart chair, a smart bed, a smart night-stand, a smart air-conditioner, a smart heater, a smart pipe, a smart duct, a smart cable, a smart carpet, a smart decoration, a smart gadget, a smart USB device, a smart plug, a smart dongle, a smart lamp/light, a smart tile, a smart ornament, a smart bottle, a vehicle, a smart car, a smart AGV, a drone, a smart robot, a laptop, a tablet, a computer, a harddisk, a network card, a smart instrument, a smart racket, a smart ball, a smart shoe, a smart wearable, a smart clothing, a smart glasses, a smart hat, a smart necklace, a smart food, a smart pill, a small device that moves in the body of a creature (e.g. in blood vessels, in lymph fluid, digestive system, etc). The Type 1 device and/or Type 2 device may be communicatively coupled with: the internet, another device with access to internet (e.g. smart phone), a cloud server, an edge server, a local server, and/or a storage.

There may be more than one heterogeneous Type 1 device. The Type 1 devices (and/or Type 2 devices) may be heterogeneous. For example, a Type 1 device (and/or Type 2 devices) may be a Wi-Fi access point, another Type 1 device (and/or Type 2 device) may be a smart TV, and/or yet another Type 1 device may be a simple device dedicated to sending the series of probe signals (and/or yet another Type 2 device may be a simple device dedicated to receiving the series of probe signals and passing them on). Different Type 1 devices (and/or Type 2 devices) may have different functionalities, brands (e.g. Sony, Samsung, Philips, Apple, etc), models, size, form factors, shape, color, modules, antennas, circuitry, logic circuits, processors, clock, bus, memory, memory buses, storage, sets of instructions, power (e.g. AC or DC, rechargeable battery, etc), chips (IC), chip sets, firmware, software, network connection, priorities, access rights, security settings, etc.

A device may function as a Type 1 device and a Type 2 device. The device may function as Type 1 device at a time and as Type 2 device at a different time. The device may function as Type 1 device and Type 2 device simultaneously.

A heterogeneous Type 1 device and/or a heterogeneous Type 2 device may comprise an integrated circuits (IC). The IC may be standard compliant. The IC may support more than one standards/protocols (e.g. 802.11a/b/e/g/n/ac/ax, 2G/2.5G/3G/3.5G/4G/LTE/5G/6G, 802.16, mesh network, adhoc network, beyond 4G, Bluetooth, BLE, another network, UWB, RFID, etc). The Type 1 or Type 2 device may detect a motion and control another device (e.g. TV, fan, radio, speaker, light, air conditioner, heater, electrical appliance, security system, etc). A heterogeneous Type 1 device and/or a Type 2 device may comprise more than one antenna. The antennas may be heterogeneous. An antenna may be directional or omni-directional. The antennas may be arranged in a circle/ellipse, in a straight line, in a lattice, or another pattern, or another placing order. A particular heterogeneous Type 1 device may/may not establish communication link with a particular Type 2 device.

The Type 3 device may be a networked server, a cloud server, a fog server, an edge server, a local server, a local client, a smart device, a smart phone, an internet-of-thing device. The Type 3 processor may be a heterogeneous Type 1 device, or a heterogeneous Type 2 device.

The first processor, the second processor and/or the third may be a microprocessor, a multi-processor, a multi-core processor, a parallel processor, a CISC processor, a RISC processor, a micro-controller, central processing unit (CPU), a graphical processor unit (GPU), a digital signal processor (DSP), an FPGA, an embedded processor (e.g. ARM), a logic circuit, etc. The third processor may be the first processor, the second processor or another processor.

The first memory, the second memory and/or the third memory may be RAM, ROM, PROM, EPROM, EEPROM, harddisk, flash memory, storage network, internal storage, external storage, local storage, edge storage, and/or cloud storage. The first memory, the second memory and/or the third memory may be volatile and/or non-volatile. The first set of instructions, second set of instructions and/or the third set of instructions may be embedded, pre-loaded, loaded upon boot up, loaded on the fly, loaded on demand, pre-installed, installed, and/or downloaded.

For each Type 2 device, and for each of the at least one respective particular pair of Type 1 and Type 2 devices comprising the Type 2 device, at least one respective heterogeneous motion information associated with the motion of the object may be computed (or obtained or calculated or estimated or determined or evaluated) asynchronously based on the at least one respective CI time series associated with the respective particular pair of Type 1 and Type 2 devices.

The motion of the object in the venue may be monitored individually and asynchronously based on asynchronously computed heterogeneous motion information associated with the pair of Type 1 and Type 2 devices comprising the particular Type 2 device. The motion of the object may be monitored jointly and asynchronously based on asynchronously computed heterogeneous motion information associated with any of the at least one pair of Type 1 and Type 2 devices associated with the particular Type 2 device. The motion of the object may be monitored jointly and asynchronously based on asynchronously computed heterogeneous motion information associated with any of the at least one pair of Type 1 and Type 2 devices associated with the respective particular Type 1 device. The motion of the object may be monitored globally and asynchronously based on asynchronously computed heterogeneous motion information associated with any of the at least one pair of Type 1 and Type 2 devices. For example, at least one combined score may be computed based on all the scores and the motion of the object may be monitored jointly based on the at least one combined score. Computation may be shared among the first processor, the second processor, the third processor, a companion processor, a cloud server, a fog server, and/or a local server.

For each Type 2 device, and for each of the at least one respective particular pair of Type 1 and Type 2 devices comprising the Type 2 device, a respective heterogeneous similarity score between a respective current window and a respective past window of the at least one respective CI time series associated with the respective particular pair of wireless devices may be computed asynchronously.

The respective heterogeneous similarity score may be computed based on at least one of: a distance score, an absolute distance (e.g. l_1 norm), a Euclidean distance, a norm, a metric, a statistical characteristic, a time reversal resonating strength (TRRS), a cross-correlation, an auto-correlation, a covariance, an auto-covariance, and/or an inner product of two vectors. The respective heterogeneous similarity score may also be computed based on at least one of: a preprocessing, a signal conditioning, a denoising, a phase correction, a timing correction, a timing compensation, a phase offset compensation, a transformation, a projection, and/or a filtering. The respective heterogeneous similarity score may also be computed based on at least one of: a feature extraction, a finite state machine, a history of past similarity score, another past window of the at least one CI time series, a component-wise operation, machine learning, a neural network, a deep learning, a training, a discrimination, a weighted averaging, and/or another operation.

The motion of the object in the venue may be monitored individually and asynchronously based on asynchronously computed heterogeneous similarity score associated with the pair of Type 1 and Type 2 devices comprising the particular Type 2 device. The motion of the object may be monitored jointly and asynchronously based on asynchronously computed heterogeneous similarity score associated with any of the at least one pair of Type 1 and Type 2 devices associated with the particular Type 2 device. The motion of the object may be monitored jointly and asynchronously based on asynchronously computed heterogeneous similarity score associated with any of the at least one pair of Type 1 and Type 2 devices associated with the respective particular Type 1 device. The motion of the object may be monitored globally and asynchronously based on asynchronously computed heterogeneous similarity score associated with any of the at least one pair of Type 1 and Type 2 devices.

Each of the current window and the past window of a (or more than one, or all) CI time series may be represented as or transformed into a vector. The similarity score may be a distance between the two vectors such as absolute distance, Euclidean distance or other distance. The CI (or windows of CI, or sliding window of CI) may be considered a stochastic process. The similarity measure may be a cross-covariance, or auto-covariance. A covariance close to 1 may mean two CIs (or two windows of CI) being very similar (or highly correlated). In the case of CI with zero mean, covariance may become correlation. Inner product may be a way to compute correlation.

The inner product of two vectors: Assuming N components for each CI. A vector associated with a CI may be an N-tuple containing the N components. There may be more than one CI time series, say M time series, with M>=1. A vector associated with the M channel information (CI) time series, at a particular time, may be a K-tuple, with K=M*N, containing the N components of the M channel information (CI) at the particular time.

Consider a window of a CI time series containing P channel information (CI), with P>=1. A vector associated with the window may be a K-tuple, with K=P*N, containing the N components of the P channel information (CI) of the window.

Consider a composite window of M channel information (CI) time series containing a window of P channel information (CI), with P>=1 of each CI time series. A vector associated with the composite window may be a K-tuple, with K=P*M*N, containing the N components of the P channel information (CI) of the window of each of the M time series.

Consider a composite window of M channel information (CI) time series containing a window of P_i channel information (CI), with P_i>=1, of the i^{th} CI time series, for i=1, ..., M. A vector associated with the composite window may be a K-tuple, with K=(P_1+P_2+ ... +P_M)*N, containing the N components of the P_i channel information (CI) of the window of the i^{th} CI time series, i=1, 2, ..., M.

Each CI of the at least one respective CI time series may have at least one respective component. For each Type 2 device, and for each of the at least one respective particular pair of Type 1 and Type 2 devices comprising the Type 2 device, and for each of the at least one respective component, the following may be done: (a) a respective current component window of the component of the at least one respective CI time series may be determined asynchronously based on the respective current window; (b) a respective past component window of the component of the at least one respective CI time series may be determined asynchronously based on the respective past window; (c) the respective current component window may be compared component-wise with the respective past component window asynchronously; and (d) the motion of the object may be monitored component-wise based on the component-wise comparing of the respective current component window and the respective past component window asynchronously.

The motion of the object in the venue may be monitored individually and asynchronously based on asynchronous component-wise comparing associated with the pair of Type 1 and Type 2 devices comprising the particular Type 2 device. The motion of the object may be monitored jointly and asynchronously based on asynchronous component-wise comparing associated with any of the at least one pair of Type 1 and Type 2 devices associated with the particular Type 2 device. The motion of the object may be monitored jointly and asynchronously based on asynchronous component-wise comparing associated with any of the at least one pair of Type 1 and Type 2 devices associated with the respective particular Type 1 device. The motion of the object may be monitored globally and asynchronously based on asynchronous component-wise comparing associated with any of the at least one pair of Type 1 and Type 2 devices.

For example, each CI may comprise a set/record with N elements (components), a collection of N items/features/characteristics/behavioral measures (components), an N-tuple, a matrix with N columns (with each column being a component), a matrix with N rows (with each row being a component), an N-component vector, an N-component channel response, an N-component time signal, an N-component channel, an N-component channel impulse response (CIR), an N-component frequency signal, an N-component channel frequency response (CFR), etc. The N components may be homogeneous or heterogeneous.

Each component may be different. For example, one component may be a complex number and another component may be a logical value. Each component may be associated with at least one of: a frequency, a frequency subcarrier, a frequency band, a time, a time lag, a time window, a time period, and/or a count.

The amount of CI in the current window (or current component window) and/or the amount of CI in the past window (or past component window) may be the same, or different. The amount of CI in the current window and/or the past window may be time varying. Complex conjugation may be applied.

The comparing may comprise preprocessing, signal conditioning, denoising, phase correction, timing correction, timing compensation, phase offset compensation, transformation, projection, filtering, feature extraction, finite state machine, machine learning, neural network, deep learning, training discrimination, weighted averaging, etc.

For example, the past motion information may be past CI, past CI associated with the motion of the object, past comparing, past motion decision, past motion statistics, past scores, past similarity scores, past component similarity scores, past device-wise similarity scores, etc.

For each Type 2 device, and for each of the at least one respective particular pair of Type 1 and Type 2 devices comprising the Type 2 device, for each of the at least one component, a component similarity score may be computed asynchronously based on the respective current component window and the respective past component window.

Each component similarity score may be computed based on at least one of: a distance score, a norm, a metric, a statistical characteristics, a time reversal resonating strength (TRRS), a cross-correlation, an auto-correlation, a covariance, an auto-covariance, an inner product of two vectors, a preprocessing, a signal conditioning, a denoising, a phase correction, a timing correction, a timing compensation, a phase offset compensation, a transformation, a projection, a filtering, a feature extraction, a finite state machine, a history of past similarity score, another past window of the at least one CI time series, a component-wise operation, machine learning, a neural network, a deep learning, a training, a discrimination, a weighted averaging, and/or another operation.

A respective heterogeneous similarity score may be computed asynchronously as a heterogeneous function of the at least one component similarity score. The heterogeneous function may comprise at least one of: a representative value, a typical value, a weighted average, a percentile, a maximum, a minimum, a 40% quartile, a 50% quartile, a 60% quartile, a mean, a median, a mode, a sum, a product, a root, an arithmetic mean, a geometric mean, a harmonic mean, a generalized mean, an ordered statistic, a trimmed mean, a statistical function, an expected value, a variance, a selected one, and/or another function.

The motion of the object in the venue may be monitored individually and asynchronously based on at least one of: heterogeneous similarity score, and at least one component similarity score, associated with the pair of Type 1 and Type 2 devices comprising the particular Type 2 device. The motion of the object may be monitored jointly and asynchronously based on at least one of: heterogeneous similarity score, and at least one component similarity score, associated with any of the at least one pair of Type 1 and Type 2 devices associated with the particular Type 2 device. The motion of the object may be monitored jointly and asynchronously based on at least one of: heterogeneous similarity score, and at least one component similarity score, associated with any of the at least one pair of Type 1 and Type 2 devices associated with the respective particular Type 1 device. The motion of the object may be monitored globally and asynchronously based on at least one of: heterogeneous similarity score, and at least one component similarity score, associated with any of the at least one pair of Type 1 and Type 2 devices.

The function may comprise at least one of: a representative value, a typical value, a weighted average, a percentile, a maximum, a minimum, a 10% quartile, a 20% quartile, a 30% quartile, a 40% quartile, a 50% quartile, a 60% quartile, a 70% quartile, a 80% quartile, a 90% quartile, a mean, a median, a mode, a sum, a product, a root, an arithmetic mean, a geometric mean, a harmonic mean, a generalized mean, an ordered statistics, a trimmed mean, a statistical function, an expected value, a variance, a thresholding, a counting, and/or a selected one.

The feature extraction may comprise at least one of: a sampled feature, a statistical feature, a time domain feature, a frequency domain feature, a decomposition, a singular value decomposition, a principal component analysis, an independent component analysis, a preprocessing, a signal processing, a postprocessing, a transformation, a linear processing, a nonlinear processing, a signal conditioning, a signal processing, a representative value, a typical value, a weighted average, a percentile, a maximum, a minimum, a 10% quartile, a 20% quartile, a 30% quartile, a 40% quartile, a 50% quartile, a 60% quartile, a 70% quartile, a 80% quartile, a 90% quartile, a mean, a median, a mode, a sum, a product, a root, an arithmetic mean, a geometric mean, a harmonic mean, a generalized mean, an ordered statistics, a trimmed mean, a statistical function, an expected value, a variance, a thresholding, a clustering, a training, a machine learning, a neural network, a deep learning, a counting, and/or a robust processing, etc.

For each Type 2 device, and for each of the at least one respective particular pair of Type 1 and Type 2 devices comprising the Type 2 device, for each of the at least one component, the motion of the object may be detected component-wise asynchronously when the respective component similarity score is at least one of: greater than, and equal to, a respective component threshold.

The motion of the object in the venue may be detected individually and asynchronously when at least one of: a first function of heterogeneous similarity score associated with the pair of Type 1 and Type 2 devices comprising the particular Type 2 device is at least one of: greater than, and equal to, a respective first individual threshold, and/or a first percentage of component-wise motion detection in a first selected group of components associated with the pair of Type 1 and Type 2 devices comprising the particular Type 2 device is at least one of: greater than, and equal to, a respective second individual threshold. The motion of the object may be detected jointly and asynchronously when at least one of: a second function of heterogeneous similarity scores associated with any of the at least one pair of Type 1 and Type 2 devices comprising the particular Type 2 device is at least one of: greater than, and equal to, a respective first joint threshold, and/or a second percentage of component-wise motion detection in a second selected group of components associated with any of the at least one pair of Type 1 and Type 2 devices comprising the particular Type 2 device is at least one of: greater than, and equal to, a respective second joint threshold. The motion of the object may be detected jointly and asynchronously when at least one of: a third function of heterogeneous similarity scores associated with any of the at least one pair of Type 1 and Type 2 devices associated with the respective particular Type 1 device is at least one of: greater than, and equal to, a respective third joint threshold, and/or a third percentage of component-wise motion detection in a third selected group of components associated with any of the at least one pair of Type 1 and Type 2 devices associated with the respective particular Type 1 device is at least one of: greater than, and equal to, a respective fourth joint threshold. The motion of the object may be detected globally and asynchronously when at least one of: a fourth function of heterogeneous similarity scores associated with any of the at least one pair of Type 1 and Type 2 devices is at least one of: greater than, and equal to, a respective first global threshold, and/or a fourth percentage of component-wise motion detection in a fourth selected group of components associated with any of the at least one pair of Type 1 and Type 2 devices is at least one of: greater than, and equal to, a respective second global threshold.

The first function, second function, third function and/or fourth function may be a linear function, nonlinear function, an average, a weighted average, an arithmetic mean, a geometric mean, a harmonic mean, a generalized mean, a trimmed mean, a robust mean, a weighted mean, a median, a mode, and/or another function. Two or more of the first function, second function, third function and/or fourth function may be mathematically similar.

The individual threshold and/or the joint threshold may be 0.1, 0.2, 0.3, 0.4, 0.5, 0.6, 0.7, 0.8, 0.9 and/or another threshold. It may be time varying. Two or more thresholds may be the same or different for some current time.

The motion of the object in the venue may be monitored asynchronously further based on another CI time series of another wireless multipath channel impacted by the motion of the object in the venue. The another CI time series may be extracted from another asynchronous heterogeneous wireless (or radio or RF) signal transmitted from an asynchronous heterogeneous Type 3 wireless device to an asynchronous heterogeneous Type 4 wireless device through the another wireless multipath channel. For example, Type 1 and Type 2 devices may be Wi-Fi devices, while Type 3 and Type 4 devices may be LTE, BLE, RFID or a another Wi-Fi devices. For example, Type 1 and Type 2 may be Wi-Fi at 2.4 GHz while Type 3 and Type 4 devices may be Wi-Fi 5 GHz.

The selected group of components (e.g. First, second, third, fourth selected group of components) may be a group of significant components, a group of insignificant components, important components, un-important components, improving components, decaying components, good components, bad components, components with certain behavior/trend, opinion-influencing components, targeted components, components with significant energy, a group of decomposition components with significant energy, a group of components significant/useful/sensitive for the monitoring, a group of components learned in a training stage, a group of components selected in some ways. For example, the selected component may be sensitive/revealing/differentiating/discriminating to some targeted event to be monitored. Two or more of the first, second, third, fourth selected group of components may overlap, and/or be the same.

For example, majority vote may be performed with the threshold being 0.5 (50%). The motion may be detected if the percentage is greater than 50%.

For each Type 2 device, and for each of the at least one respective particular pair of Type 1 and Type 2 devices comprising the Type 2 device, at least one respective heterogeneous motion information associated with the motion of the object may be computed asynchronously based on the at least one respective CI time series associated with the respective particular pair of Type 1 and Type 2 device.

A respective current window of the at least one respective CI time series associated with the respective particular pair of wireless devices with a respective past window of the at least one respective CI time series may be compared asynchronously. A respective heterogeneous similarity score between the respective current window and the respective past window of the at least one respective CI time series may be computed asynchronously.

The motion of the object in the venue may be monitored individually and asynchronously based on asynchronously computed heterogeneous motion information and heterogeneous similarity score associated with the pair of Type 1 and Type 2 devices comprising the particular Type 2 device. The motion of the object may be monitored jointly and asynchronously based on asynchronously computed heterogeneous motion information and heterogeneous similarity score associated with any of the at least one pair of Type 1 and Type 2 devices associated with the particular Type 2 device. The motion of the object may be monitored jointly and asynchronously based on asynchronously computed heterogeneous motion information and heterogeneous similarity score associated with any of the at least one pair of Type 1 and Type 2 devices associated with the respective particular Type 1 device. The motion of the object may be monitored globally and asynchronously based on asynchronously computed heterogeneous motion information and heterogeneous similarity score associated with any of the at least one pair of Type 1 and Type 2 devices.

For example, the Type 1 and Type 2 devices may be Wi-Fi devices (with the wireless (or radio or RF) signal being a Wi-Fi signal), while the Type 3 and Type 4 devices may be LTE devices (with the another wireless (or radio or RF) signal being an LTE signal). In another example, the Type 1 and Type 2 devices may be Wi-Fi devices using a Wi-Fi network with a first SSID (e.g. "my home network"), while the Type 3 and Type 4 devices may be Wi-Fi devices using a Wi-Fi network with a second SSID (e.g. "Your Neighborhood"). In another example, the Type 1, Type 2, Type 3 and Type 4 devices may be in the same Wi-Fi network. The Type 1 and Type 2 devices may be using 20 MHz bandwidth, while the Type 3 and Type 4 devices may be using 40 MHz bandwidth.

The Type 1 device and the Type 3 device may be the same device, or different devices. A Type 2 device and a Type 4 device may be the same device. Type 1 devices may be Type 3 devices, and vice versa. Type 2 devices may be Type 4 devices, and vice versa.

A map of the venue may be partitioned into more than one regions. The motion of the object may be associated asynchronously with at least one of the more than one regions of the map of the venue based on at least one of: (a) asynchronously computed heterogeneous motion information associated with the pair of Type 1 and Type 2 devices comprising the particular Type 2 device, (b) asynchronously computed heterogeneous motion information associated with any of the at least one pair of Type 1 and Type 2 devices associated with the particular Type 2 device, (c) asynchronously computed heterogeneous motion information associated with any of the at least one pair of Type 1 and Type 2 devices associated with the respective particular Type 1 device, and (d) asynchronously computed heterogeneous motion information associated with any of the at least one pair of Type 1 and Type 2 devices.

The respective similarity score may be one of the at least one respective motion information. The respective current window may have same or different duration (or length) as the respective past window. Current windows associated with different Type 2 devices may be different. Past windows associated with different Type 2 devices may also be different. The current window and the past window may have same amount of CI, same time duration, same pre-processing, same processing, same post-processing, and/or same settings. The current window and the past window may have different amount of CI, different time duration, different pre-processing, different processing, different post-processing, and/or different settings.

The motion information and/or past motion information may comprise information related to at least one of: a motion statistics, a motion magnitude, a motion phase, a location, a location coordinate, a change in location, a movement, a displacement, a distance, a motion differential, a speed, a speed differential, a change of speed, a change of direction, a velocity, an acceleration, a motion thresholding, a similarity score, a distance score, a distance, a Euclidean distance, a weighted distance, a norm, an L_1 (or l_1) norm, an L_2 (or l_2) norm, an L_k (or l_k) norm for k>2, a statistical distance, a correlation, an auto-correlation, a covariance, an auto-covariance, a cross-covariance, an inner product, an outer product, a motion signal transformation, a motion signal decomposition, a motion signal multi-resolution signal decomposition, a motion signal sparse principal component analysis, a singular value decomposition, truncated singular value decomposition, a principle component analysis, an a independent component analysis, factor analysis, dictionary learning, scalar quantization, vector quantization, matching pursuit, motion signal non-negative matrix factorization, latent Dirichlet Allocation (LDA), a motion clustering, a motion recognition, a motion identification, a motion localization, a motion feature extraction, a sample mean, a weighted mean, a trimmed mean, a robust mean, a sample variance, a presence, an absence, a presence of motion, an absence of motion, a presence of the object, an absence of the object, a change of the object, a deformation of the object, an action of the object, a movement of the object, an entrance of the object, an exit of the object, a presence of a repetitive motion, a motion frequency, a motion period, a motion rhythm, a breathing motion frequency, a breathing motion period, a motion cycle, a motion count, a motion intensity, a breathing motion period, a motion classification, a gait information, a motion sequence, a presence of a transient motion, a motion change, a motion event information, an entrance event, an exit event, an object fall down motion, a resizing motion, a deformation motion, a turning motion, a translational motion, a rotational motion, a gesture, a handwriting motion, a head motion, a mouth motion, a heart motion, an internal organ motion, a presence of a statistical motion, a statistical motion quantity, a mean, a variance, an autocorrelation, an auto-covariance, a cross correlation, a cross covariance, a wind motion, a motion localization, a motion location, a motion intensity, a presence of motion, an absence of motion, a presence of the object, an absence of the object, a time history of the motion statistics, a change of the motion statistics, a behavior of the motion statistics, and/or, a trend of the motion statistics, an appearing, a disappearing, an increase, a decrease, a speeding-up, a slowing-down, a direction change, a sudden motion, an impulsive motion, a size, a length, an area, a volume, a capacity, a shape, a form, a spatial quantity, a location, a distance, a spatial range, a spatial label, a spatial tag, a starting location, an ending location, a speed, an acceleration, a rotation, an angular motion, a differential, a direction, a spatial trend, a temporal quantity, a time stamp, a time label, a time tag, a starting quantity, an ending quantity, a starting time, an ending time, a duration, a count, a period, a time window, a rate, a timing, a time delay, a trend, a time trend, a motion profile, a time event, a time-space quantity, a time-frequency quantity, a time-frequency-space quantity, a periodic behavior, a transient behavior, a periodic motion, a pseudo-periodic motion, a transient motion, a steady state behavior, a planned motion, an unplanned motion, and/or a perturbation, a statistical behavior, a stationary behavior, a quasi-stationary behavior, a cyclo-stationary behavior, a chaotic behavior, a co-occurrence, a timed-occurrence, an interaction, a response, an activity, a sign of an activity, a gesture, a gait, a body motion, a body part motion, a hand motion, an arm motion, a foot motion, a leg motion, a head motion, a facial motion, a mouth motion, an eye motion, a gaze, a breathing motion, a heart motion, a writing motion, a drawing motion, a finger motion, a user-interface motion, an event, a fall-down event, a security event, an accident event, a home event, an office event, a factory event, a warehouse event, a manufacturing event, an assembly line event, a maintenance event, a car-related event, a navigation event, a tracking event, a door event, a door-open event, a door-close event, a window event, a window-open event, a window-close event, a repeatable event, a one-time event, another event, a frequency characteristics, a frequency, a spectrum, a starting frequency, an ending frequency, a changing frequency, a frequency shift, a frequency trend, a frequency event, a user, a household, an office, a factory, a warehouse, a facility, an identity (ID), a consumed quantity, an unconsumed quantity, a state, a physical state, a health state, a well-being state, an emotional state, a mental state, and/or another motion information. The respective similarity score may be different for different Type 2 devices.

For each respective pair of Type 1 and Type 2 devices, a respective feature space of the at least one respective heterogeneous motion information may be partitioned associated with the respective pair of Type 1 and Type 2 devices into more than one respective feature segments. A respective mapping that associates each respective feature segment with at least one of the more than one regions of the map of the venue may be constructed. The motion of the object may be associated asynchronously individually with at least one of the more than one regions of the map of the venue based on the respective mapping. A joint feature space of heterogeneous motion information associated with more than one pairs of Type 1 and Type 2 devices may be partitioned into more than one joint feature segments. A joint mapping that associates each joint feature segment with at least one of the more than one regions of the map of the venue may be constructed. The motion of the object may be associated with the particular one of the more than one regions of the map of the venue based on the joint mapping.

Two or more of the more than one regions may overlap. A region may be a subset of another region. A region may be a union of more than one other regions. A location of a region may be related to a location of one or more Type 2 device. The map and/or the regions may be 1-dimensional, 2-dimensional, 3-dimensional or higher-dimensional. A 2D region may be a rectangular, square, circle, ellipse or other shapes. A region may be concave, or convex. Some regions may be large. Some may be small. The more than one regions may comprise a decomposition (e.g. multi-resolution decomposition) of the venue into disjoint regions or overlapping regions. The more than one regions may be regular or irregular.

For each respective pair of Type 1 and Type 2 devices, a respective heterogeneous similarity score between a respective current window and a respective past window of the at least one respective CI time series associated with the respective pair of Type 1 and Type 2 devices may be computed asynchronously.

The motion of the object in the venue may be detected individually and asynchronously when a first function of heterogeneous similarity score associated with the pair of Type 1 and Type 2 devices comprising the particular Type 2 device is at least one of: greater than, and equal to, a respective individual threshold. The motion of the object in the venue may be detected jointly and asynchronously when a second function of heterogeneous similarity scores associated with any of the at least one pair of Type 1 and Type 2 devices comprising the particular Type 2 device is at least one of: greater than, and equal to, a respective joint threshold. The motion of the object in the venue may be detected jointly and asynchronously when a third function of heterogeneous similarity scores associated with any of the at least one pair of Type 1 and Type 2 devices associated with the respective particular Type 1 device is at least one of: greater than, and equal to, another respective joint threshold. The motion of the object in the venue may be detected globally and asynchronously when a fourth function of heterogeneous similarity scores associated with any of the at least one pair of Type 1 and Type 2 devices is at least one of: greater than, and equal to, a respective global threshold.

A feature may be a motion information, or a feature/characteristics/a function of one or more motion information. The features may be heterogeneous. For example, one feature may be a real number, another feature may be a boolean, another may be a complex number/vector, another may be a set, and yet another may be a collection of things. A feature may be obtained by applying an operation on one or more motion information. A feature space may be a space or a subspace. A feature space may be spanned by one or more of the features.

Some feature segments may be partitioned/bound/defined by hyperplanes and/or manifolds. Some feature segments may be partitioned/defined by scalar quantization and/or vector quantization. The feature space may be decomposed/divided into cells (e.g. "rectangular" cell of unity length in all dimensions). A feature segment may be a union of adjacent cells or non-adjacent cells.

The joint feature space may be a union of the respective feature space. The dimension of the feature space of different Type 2 devices may be different. The respective mapping or the joint mapping may be one-to-one, many-to-one, one-to-many, or many-to-many. The mapping may be onto.

An information may be signaled, presented, displayed, played, transmitted, stored asynchronously by a monitoring device. The information may be associated with at least one of: the map of the venue, the more than one partitioned regions of the map, regions associated with any detected motion of the object, heterogeneous motion information associated with at least one pair of Type 1 and Type 2 devices, component similarity score, heterogeneous similarity score, past motion information, past similarity score, another past information, Type 1 devices, Type 2 devices, Type 3 devices, and/or Type 4 devices. The signaling may comprise analysis, decomposing, transforming, processing, filtering, ordering, arranging, formatting, organizing, presenting, displaying, playing, transmitting, and/or storing.

The information may be displayed with the map of the venue. The information may be location, zone, region, area, corrected location, approximate location, location with respect to (w.r.t.) a map of the venue, location w.r.t. a segmentation of the venue, direction, a path, a path w.r.t. the map and/or the segmentation, a trace (e.g. location within a time window such as the past 5 seconds, or past 10 seconds; the time window duration may be adjusted adaptive; the time window duration may be adaptively adjusted w.r.t. speed, acceleration, etc.), a history of a path, approximate regions/zones along a path, a history/summary of past locations, a history of past locations of interest, frequently-visited areas, customer traffic, crowd distribution, crowd behavior, crowd control information, speed, acceleration, motion statistics, breathing rate, heart rate, presence/absence of motion, presence/absence of people, presence/absence of vital sign, gesture, gesture control (control of devices using gesture), location-based gesture control, information of a location-based operation, an identity (ID) of the respect object (e.g. a pet, a person, an self-guided machine/device, a vehicle, a drone, a car, a boat, a bicycle, a self-guided vehicle, a machine with a fan, an air-conditioner, a TV, a machine with a movable part), an identification of a user (e.g. a person), an information of the user, a location/speed/acceleration/direction/motion/gesture/gesture control/motion trace of the user, an ID of the user, an activity of the user, a state of the user, a sleeping/resting characteristics of the user, an emotional state of the user, a vital sign of the user, an environment information of the venue, a weather information of the venue, an earthquake, an explosion, a storm, a rain, a fire, a temperature, a collision, an impact, a vibration, a event, a door-open event, a door-close event, a window-open event, a window-close event, a fall-down event, a burning event, a freezing event, a water-related event, a wind-related event, an air-movement event, an accident event, a pseudo-periodic event (e.g. running on a treadmill, jumping up and down, skipping rope, somersault, etc), a crowd event, a vehicle event, a gesture of the user (e.g. a hand gesture, an arm gesture, a foot gesture, a leg gesture, a body gesture, a head gesture, a face gesture, a mouth gesture, an eye gesture, etc).

The location may be 2-dimensional (e.g. with 2D coordinates), 3-dimensional (e.g. with 3D coordinates). The location may be relative (e.g. w.r.t. a map) or relational (e.g. halfway between point A and point B, around a corner, up the stairs, on top of table, at the ceiling, on the floor, on a sofa, close to point A, a distance R from point A, within a radius of R from point A, etc). The location may be expressed in rectangular coordinate, polar coordinate, and/or another representation.

The information (e.g. location) may be marked with at least one symbol. The symbol may be time varying. The symbol may be flashing and/or pulsating with or without changing color/intensity. The size may change over time. The orientation of the symbol may change over time. The symbol may be a number that reflects an instantaneous quantity (e.g. vital sign/breathing rate/heart rate/gesture/state/status/action/motion of a user, temperature, network traffic, network connectivity, a status of a device/machine, remaining power of a device, a status of the device, etc). The rate of change, the size, the orientation, the color, the intensity and/or the symbol may reflect the respective motion. The information may be described verbally (e.g. using pre-recorded voice, or voice synthesis). The information may be described in text. The information may also be presented in a mechanical way (e.g. an animated gadget, a movement of a movable part).

The user-interface (UI) device may be a smart phone (e.g. an iPhone, an Android phone), a tablet (e.g. iPad), a laptop (e.g. notebook computer), a personal computer (PC), a device with graphical user interface (GUI), a smart speaker, a device with voice/audio/speaker capability, a virtual reality (VR) device, an augmented reality (AR) device, a smart car, a display in the car, a voice assistant, a voice assistant in a car, The map may be a 2-dimensional map, a 3-dimensional map and/or a higher-dimensional map. (e.g. a time varying 2D/3D map) Walls, windows, doors, entrances, exits, forbidden areas may be marked on the map. The map may comprise a floor plan of a facility. The map may have one or more layers (overlays). The map may be a maintenance map comprising at least one of: water pipes, gas pipes, wiring, cabling, air ducts, crawl-space, ceiling layout, underground layout.

The venue may be segmented into multiple zones such as bedroom, living room, storage room, walkway, kitchen, dining room, foyer, garage, first floor, second floor, rest room, offices, conference room, reception area, various office areas, various warehouse regions, various facility areas, etc. The segments/regions/areas may be presented in a map. Different regions may be color-coded. Different regions may be presented with a characteristic (e.g. color, brightness, color intensity, texture, animation, flashing, flashing rate, etc). Logical segmentation of the venue may be done using the at least one heterogeneous Type 2 device, or a server, or a cloud server, etc.

In another embodiment, a wireless (or radio or RF) monitoring system comprises at least one asynchronous heterogeneous Type 1 wireless (or radio) device and at least one asynchronous heterogeneous Type 2 wireless (or radio or RF) device. The wireless (or radio or RF) monitoring system comprises at least one pair of Type 1 and Type 2 devices, each pair comprising one of the at least one Type 1 device, and one of the at least one Type 2 device.

A particular asynchronous heterogeneous Type 2 device is in at least one particular pair of Type 1 and Type 2 devices of the wireless (or radio or RF) monitoring system. The particular Type 2 device is associated with at least one particular Type 1 device through the at least one particular pair of Type 1 and Type 2 devices.

The particular asynchronous heterogeneous Type 2 device of the wireless (or radio) monitoring system comprises a wireless circuitry, a second heterogeneous processor, a second heterogeneous memory and a second heterogeneous set of instructions.

The wireless circuitry receives asynchronously at least one asynchronous heterogeneous wireless (or radio or RF) signal. Each asynchronous heterogeneous wireless (or radio or RF) signal is transmitted asynchronously by one of the at least one particular Type 1 device using a respective first heterogeneous processor, a respective first heterogeneous memory and a respective first heterogeneous set of instructions of the Type 1 device to at least one asynchronous heterogeneous Type 2 device through a wireless multipath channel impacted by a motion of an object in a venue.

The second heterogeneous processor is communicatively coupled with the wireless circuitry. The second heterogeneous memory is communicative coupled with the second heterogeneous processor. The second heterogeneous set of instructions is stored in the second heterogeneous memory which, when executed, cause the second heterogeneous processor to, for each of the at least one particular pair of Type 1 and Type 2 devices, obtain asynchronously at least one respective series of channel information (CI time series) of the wireless multipath channel. The at least one respective CI time series associated with the particular pair of Type 1 and Type 2 devices is being extracted asynchronously from the respective asynchronous heterogeneous wireless (or radio or RF) signal received asynchronously by the wireless circuitry.

One of the following is performed: (a) the motion of the object in the venue is monitored individually and asynchronously, using a third processor, a third memory and a third set of instructions of a Type 3 device, based on CI time series associated with a pair of Type 1 and Type 2 devices comprising the particular Type 2 device; (b) the motion of the object is monitored jointly and asynchronously based on CI time series associated with any pairs of Type 1 and Type 2 devices comprising the particular Type 2 device; (c) the motion of the object is monitored jointly and asynchronously based on CI time series associated with any pairs of Type 1 and Type 2 devices comprising one of the at least one particular Type 1 device; and/or (d) the motion of the object is monitored globally and asynchronously based on CI time series associated with any pairs of Type 1 and Type 2 devices.

In another embodiment, a wireless (or radio or RF) monitoring system comprises at least one asynchronous heterogeneous Type 1 wireless (or radio or RF) device and at least one asynchronous heterogeneous Type 2 wireless (or radio or RF) device. The wireless (or radio) monitoring system comprises at least one pair of Type 1 and Type 2 devices, each pair comprising one of the at least one Type 1 device, and one of the at least one Type 2 device.

The particular asynchronous heterogeneous Type 1 device is in at least one particular pair of Type 1 and Type 2 devices of the wireless (or radio) monitoring system. The particular Type 1 device is associated with at least one particular Type 2 device through the at least one particular pair of Type 1 and Type 2 devices.

A particular asynchronous heterogeneous Type 1 device of a wireless (or radio) monitoring system comprises: a wireless circuitry, a first processor, a first memory and a first set of instructions. The first processor is communicatively coupled with the wireless circuitry. The first memory is communicative coupled with the first processor. The first set of instructions is stored in the first memory which, when executed, cause the first processor to transmit asynchronously using the wireless circuitry an asynchronous heterogeneous wireless (or radio or RF) signal from the particular Type 1 device to the at least one particular Type 2 device through a wireless multipath channel impacted by a motion of an object in a venue.

For each of the at least one particular Type 2 device, at least one series of channel information (CI time series) of the wireless multipath channel extracted from the asynchronous heterogeneous wireless (or radio or RF) signal transmitted by the wireless circuitry is obtained by the Type 2 device using a second processor, a second memory and a second set of instructions of the Type 2 device.

At least one of the following is performed: (a) the motion of the object in the venue is monitored individually and asynchronously, using a third processor, a third memory and a third set of instructions of a Type 3 device, based on CI time series associated with a pair of Type 1 and Type 2 devices comprising the particular Type 1 device, (b) monitoring the motion of the object jointly and asynchronously based on CI time series associated with any pairs of Type 1 and Type 2 devices comprising the particular Type 1 device, (c) monitoring the motion of the object jointly and asynchronously based on CI time series associated with any pairs of Type 1 and Type 2 devices comprising one of the at least one particular Type 2 device, and (d) monitoring the motion of the object globally and asynchronously based on CI time series associated with any pairs of Type 1 and Type 2 devices.

In another embodiment, a wireless (or radio or RF) monitoring system comprises at least one asynchronous heterogeneous Type 1 wireless (or radio or RF) device and at least one asynchronous heterogeneous Type 2 wireless (or radio or RF) device. The wireless (or radio) monitoring system comprises at least one pair of Type 1 and Type 2 devices, each pair comprising one of the at least one asynchronous heterogeneous Type 1 device, and one of the at least one asynchronous heterogeneous Type 2 device.

A Type 3 device of the wireless (or radio) monitoring system comprises a third processor, a third memory and a third set of instructions. The third processor is communicatively coupled with at least one of: at least one asynchronous heterogeneous Type 1 device, and at least one asynchronous heterogeneous Type 2 device. The third memory is communicative coupled with the third processor. The third set of instructions is stored in the third memory.

When executed, the third set of instructions causes the third processor to, for each Type 2 device, and for each of the at least one pair of Type 1 and Type 2 devices comprising the Type 2 device, receive asynchronously at least one respective time series of channel information (CI time series) of a wireless multipath channel impacted by a motion of an object in a venue.

Each CI time series is obtained asynchronously by the Type 2 device using a respective second processor, a respective second memory and a respective second set of instructions of the Type 2 device. The at least one respective CI time series associated with the respective pair of Type 1 and Type 2 devices is extracted asynchronously from a respective asynchronous heterogeneous wireless (or radio or RF) signal. The respective asynchronous heterogeneous wireless (or radio or RF) signal is transmitted from a respective Type 1 device of the respective pair using a respective first processor, a respective first memory and a respective first set of instructions of the respective Type 1 device to at least one asynchronous heterogeneous Type 2 device through the wireless multipath channel. When executed, the third set of instructions further causes the third processor to do at least one of the following: (a) monitor the motion of the object in the venue individually and asynchronously, based on CI time series associated with a particular pair of Type 1 and Type 2 devices comprising a particular Type 2 device and a particular Type 1 device, (b) monitor the motion of the object jointly and asynchronously based on CI time series associated with any of the at least one pair of Type 1 and Type 2 devices associated with the particular Type 2 device, (c) monitor the motion of the object jointly and asynchronously based on CI time series associated with any of the at least one pair of Type 1 and Type 2 devices associated with the particular Type 1 device, and/or (d) monitor the motion of the object globally and asynchronously based on CI time series associated with any of the at least one pair of Type 1 and Type 2 devices.

As an example to implement the above disclosed system and method, Stephen and his family want to install the disclosed wireless motion detection system to detect motion in their 2000 sqft two-story town house in Seattle, Wash. Because his house has two stories, Stephen decided to use one Type 2 device (named A) and two Type 1 devices (named B and C) in the ground floor. His ground floor has predominantly three rooms: kitchen, dining room and living room arranged in a straight line, with the dining room in the middle. The kitchen and the living rooms are on opposite end of the house. He put the Type 2 device (A) in the dining room, and put one Type 1 device (B) in the kitchen and the other Type 1 device (C) in the living room. With this placement of the devices, he is practically partitioning the ground floor into 3 zones (dining room, living room and kitchen) using the motion detection system. When motion is detected by the AB pair and the AC pair, the system would analyze the motion information and associate the motion with one of the 3 zones.

When Stephen and his family go out on weekends (e.g. to go for a camp during a long weekend), Stephen would use a mobile phone app (e.g. Android phone app or iPhone app) to turn on the motion detection system. When the system detects motion, a warning signal is sent to Stephen (e.g. an SMS text message, an email, a push message to the mobile phone app, etc). If Stephen pays a monthly fee (e.g. $10/ month), a service company (e.g. security company) will receive the warning signal through wired network (e.g. broadband) or wireless network (e.g. home WiFi, LTE, 3G, 2.5G, etc) and perform a security procedure for Stephen (e.g. call him to verify any problem, send someone to check on the house, contact the police on behalf of Stephen, etc).

Stephen loves his aging mother and cares about her well-being when she is alone in the house. When the mother is alone in the house while the rest of the family is out (e.g. go to work, or shopping, or go on vacation), Stephen would turn on the motion detection system using his mobile app to ensure the mother is ok. He then uses the mobile app to monitor his mother's movement in the house. When Stephen uses the mobile app to see that the mother is moving around the house among the 3 regions, according to her daily routine, Stephen knows that his mother is doing ok. Stephen is thankful that the motion detection system can help him monitor his mother's well-being while he is away from the house.

On a typical day, the mother would wake up at around 7 am. She would cook her breakfast in the kitchen for about 20 minutes. Then she would eat the breakfast in the dining room for about 30 minutes. Then she would do her daily exercise in the living room, before sitting down on the sofa in the living room to watch her favorite TV show. The motion detection system enables Stephen to see the timing of the movement in each of the 3 regions of the house. When the motion agrees with the daily routine, Stephen knows roughly that the mother should be doing fine. But when the motion pattern appears abnormal (e.g. there is no motion until 10 am, or she stayed in the kitchen for too long, or she remains motionless for too long, etc), Stephen suspects something is wrong and would call the mother to check on her. Stephen may even get someone (e.g. a family member, a neighbor, a paid personnel, a friend, a social worker, a service provider) to check on his mother.

At some time, Stephen feels like repositioning the Type 2 device. He simply unplugs the device from the original AC power plug and plug it into another AC power plug. He is happy that the wireless motion detection system is plug-and-play and the repositioning does not affect the operation of the system. Upon powering up, it works right away.

Sometime later, Stephen is convinced that our wireless motion detection system can really detect motion with very high accuracy and very low alarm, and he really can use the mobile app to monitor the motion in the ground floor. He decides to install a similar setup (i.e. one Type 2 device and two Type 1 devices) in the second floor to monitor the bedrooms in the second floor. Once again, he finds that the system set up is extremely easy as he simply needs to plug the Type 2 device and the Type 1 devices into the AC power plug in the second floor. No special installation is needed. And he can use the same mobile app to monitor motion in the ground floor and the second floor. Each Type 2 device in the ground floor/second floor can interact with all the Type 1 devices in both the ground floor and the second floor. Stephen is happy to see that, as he doubles his investment in the Type 1 and Type 2 devices, he has more than double the capability of the combined systems.

The features described above may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., C, Java), including compiled or interpreted languages, and it may be deployed in any form, including as a stand-alone program or as a module, component, subroutine, a browser-based web application, or other unit suitable for use in a computing environment.

Suitable processors for the execution of a program of instructions include, e.g., both general and special purpose microprocessors, digital signal processors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

While the present teaching contains many specific implementation details, these should not be construed as limitations on the scope of the present teaching or of what may be claimed, but rather as descriptions of features specific to particular embodiments of the present teaching. Certain features that are described in this specification in the context of separate embodiments may also be implemented in combination in a single embodiment. Conversely, various features that are described in the context of a single embodiment may also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Particular embodiments of the subject matter have been described. Any combination of the features and architectures described above is intended to be within the scope of the following claims. Other embodiments are also within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

We claim:

1. A system for detecting object motion in a venue, comprising:
   a transmitter configured for transmitting a wireless signal through a wireless multipath channel impacted by a motion of an object in the venue; and
   a receiver configured for:
      receiving the wireless signal through the wireless multipath channel impacted by the motion of the object in the venue, and
      obtaining a time series of channel information (CI) of the wireless multipath channel based on the wireless signal;
   a processor configured for computing motion information related to the motion of the object based on the time series of CI obtained by the receiver, wherein computing the motion information comprises:
      comparing a current window of the time series of CI with a past window of the time series of CI, and
      computing asynchronously a heterogeneous similarity score between the current window and the past window of the time series of CI; and
   a motion detector configured for detecting the motion of the object in the venue based on the motion information and the heterogeneous similarity score.

2. The system of claim 1, wherein:
   the processor is coupled to at least one of:
      the receiver, and
      the motion detector; and
   the motion detector is coupled to at least one of:
      the transmitter,
      the receiver,
      an additional transmitter,
      an additional receiver,
      a cloud server,
      a fog server,
      a local server, and
      an edge server.

3. The system of claim 1, wherein:
   the system further comprises at least one of: at least one additional transmitter, and at least one additional receiver;
   the transmitters and the receivers form a plurality of pairs of transmitters and receivers;
   for each pair of transmitter and receiver comprising a transmitter and a receiver:
      the respective transmitter is configured for transmitting a respective wireless signal through the wireless multipath channel impacted by the motion of the object in the venue,
      the respective receiver is configured for receiving the respective wireless signal through the wireless multipath channel and obtaining a respective time series of CI of the wireless multipath channel based on the respective wireless signal, and
      at least one of the motion detector and the respective receiver is configured for asynchronously computing respective heterogeneous motion information related to the motion of the object based on the respective time series of CI; and
   at least one of the motion detector and the receivers is configured for performing at least one of:

monitoring the motion of the object in the venue individually and asynchronously based on the asynchronously computed heterogeneous motion information associated with a pair of transmitter and receiver;

monitoring the motion of the object in the venue jointly and asynchronously based on the asynchronously computed heterogeneous motion information associated with any pair of transmitter and receiver comprising a particular receiver, monitoring the motion of the object in the venue jointly and asynchronously based on the asynchronously computed heterogeneous motion information associated with any pair of transmitter and receiver comprising a particular transmitter, and monitoring the motion of the object in the venue globally and asynchronously based on the asynchronously computed heterogeneous motion information associated with any pair of transmitter and receiver.

4. The system of claim 1, wherein
the heterogeneous similarity score is computed based on at least one of:
   a distance score, an absolute distance, a Euclidean distance, a norm, a metric, a statistical characteristic, a time reversal resonating strength (TRRS), a cross-correlation, an auto-correlation, a covariance, an auto-covariance, an inner product of two vectors,
   a preprocessing, a signal conditioning, a denoising, a phase correction, a timing correction, a timing compensation, a phase offset compensation, a transformation, a projection, a filtering,
   a feature extraction, a finite state machine, a history of past similarity score, another past window of the at least one CI time series, a component-wise operation, machine learning, a neural network, a deep learning, a training, a discrimination,
   a weighted averaging, and another operation,
   wherein the motion of the object in the venue is detected based on the computed heterogeneous similarity score.

5. The system of claim 1, wherein:
each CI of the time series of CI has at least one component;
for each of the at least one component, at least one of the motion detector and the receiver is further configured for:
   determining asynchronously a respective current component window of the component based on a current time window,
   determining asynchronously a respective past component window of the component based on a past time window,
   comparing component-wise the respective current component window with the respective past component window asynchronously to generate a comparison result,
   monitoring component-wise the motion of the object based on the comparison result, and
   detecting the motion of the object in the venue based on the asynchronous component-wise comparing.

6. The system of claim 5, wherein at least one of the motion detector and the receiver is further configured for:
for each of the at least one component, computing asynchronously a component similarity score associated with the respective current component window and the respective past component window, based on at least one of: a distance score, a norm, a metric, a statistical characteristic, a time reversal resonating strength (TRRS), a cross-correlation, an auto-correlation, a covariance, an auto-covariance, an inner product of two vectors, a preprocessing, a signal conditioning, a denoising, a phase correction, a timing correction, a timing compensation, a phase offset compensation, a transformation, a projection, a filtering, a feature extraction, a finite state machine, a history of past similarity score, another past window of the at least one time series of CI, a component-wise operation, machine learning, a neural network, a deep learning, a training, a discrimination, a weighted averaging, and another operation;

computing asynchronously a heterogeneous similarity score based on a heterogeneous function of the at least one component similarity score, wherein the heterogeneous function comprises at least one of: a representative value, a typical value, a weighted average, a percentile, a maximum, a minimum, a 40% quartile, a 50% quartile, a 60% quartile, a mean, a median, a mode, a sum, a product, a root, an arithmetic mean, a geometric mean, a harmonic mean, a generalized mean, an ordered statistics, a trimmed mean, a statistical function, an expected value, a variance, a selected one, and another function; and detecting the motion of the object in the venue when the heterogeneous similarity score is greater than or equal to a first threshold.

7. The system of claim 5, wherein at least one of the motion detector and the receiver is further configured for:
for each of the at least one component, computing asynchronously a component similarity score associated with the respective current component window and the respective past component window, based on at least one of: a distance score, a norm, a metric, a statistical characteristic, a time reversal resonating strength (TRRS), a cross-correlation, an auto-correlation, a covariance, an auto-covariance, an inner product of two vectors, a preprocessing, a signal conditioning, a denoising, a phase correction, a timing correction, a timing compensation, a phase offset compensation, a transformation, a projection, a filtering, a feature extraction, a finite state machine, a history of past similarity score, another past window of the at least one time series of CI, a component-wise operation, machine learning, a neural network, a deep learning, a training, a discrimination, a weighted averaging, and another operation;

for each of the at least one component, detecting component-wise the motion of the object asynchronously when the respective component similarity score is greater than or equal to a respective component threshold; and detecting the motion of the object in the venue when a percentage of component-wise motion detection in a selected group of components is greater than or equal to a second threshold.

8. The system of claim 1, further comprising:
a third wireless device configured for transmitting an additional heterogeneous wireless signal through an additional wireless multipath channel impacted by the motion of the object in the venue; and
a fourth wireless device that has a different type from that of the third wireless device and is configured for:

receiving the additional heterogeneous wireless signal through the additional wireless multipath channel impacted by the motion of the object in the venue, and obtaining a time series of additional channel information (CI) of the additional wireless multipath channel based on the additional heterogeneous wireless signal, wherein the additional CI of the additional wireless multipath channel is associated with a different protocol or configuration from that associated with the CI of the wireless multipath channel, wherein the motion detector is configured to detect the motion of the object in the venue based on both the motion information associated with the transmitter and the receiver and additional motion information associated with the third and fourth wireless devices computed by at least one of: an additional motion detector and the fourth wireless device based on the time series of additional CI.

9. The system of claim 1, further comprising a supervisory device configured for:

partitioning a map of the venue into a plurality of regions;

associating asynchronously the motion of the object with at least one of the plurality of regions of the map of the venue based on heterogeneous motion information received from the receivers.

10. The system of claim 9, wherein:

the system further comprises at least one of: at least one additional transmitter, and at least one additional receiver;

the transmitters and the receivers form a plurality of pairs of transmitters and receivers;

for each pair of transmitter and receiver comprising a transmitter and a receiver, the respective transmitter is configured for transmitting a respective wireless signal through the wireless multipath channel impacted by the motion of the object in the venue, and the respective receiver is configured for:

receiving the respective wireless signal through the wireless multipath channel, obtaining a respective time series of CI of the wireless multipath channel based on the respective wireless signal, and asynchronously computing respective heterogeneous motion information related to the motion of the object based on the respective time series of CI; and at least one of the motion detector and the receivers is configured for performing at least one of:

partitioning a respective feature space of each of the heterogeneous motion information into a plurality of respective feature segments;

constructing a respective mapping that associates each respective feature segment with at least one of the plurality of regions of the map of the venue;

associating asynchronously the motion of the object individually with at least one of the plurality of regions of the map of the venue based on the respective mapping;

partitioning a joint feature space of heterogeneous motion information associated with a plurality of pairs of transmitters and receivers into a plurality of joint feature segments;

constructing a joint mapping that associates each joint feature segment with at least one of the plurality of regions of the map of the venue; and associating asynchronously the motion of the object jointly with a particular one of the plurality of regions of the map of the venue based on the joint mapping.

11. The system of claim 10, wherein:

for each pair of transmitter and receiver comprising a transmitter and a receiver, the respective receiver is configured for computing asynchronously a respective heterogeneous similarity score between a respective current window and a respective past window of the respective time series of CI; and at least one of the motion detector and the receivers is configured for performing at least one of:

detecting the motion of the object in the venue individually and asynchronously when a first function of the respective heterogeneous similarity score associated with a pair of transmitter and receiver is greater than or equal to a respective individual threshold, detecting the motion of the object in the venue jointly and asynchronously when a second function of the heterogeneous similarity scores associated with any pair of transmitter and receiver comprising a particular receiver is greater than or equal to a respective joint threshold, detecting the motion of the object in the venue jointly and asynchronously when a third function of the heterogeneous similarity scores associated with any pair of transmitter and receiver comprising a particular transmitter is greater than or equal to another respective joint threshold, and detecting the motion of the object in the venue globally and asynchronously when a fourth function of the heterogeneous similarity scores associated with any pair of transmitter and receiver is greater than or equal to a respective global threshold.

12. The system of claim 10, further comprising:

a monitoring device configured for signaling asynchronously information associated with at least one of:

the map of the venue, the plurality of partitioned regions of the map, regions associated with any detected motion of the object, heterogeneous motion information associated with at least one pair of transmitter and receiver, the component-wise similarity score, the heterogeneous similarity score, past motion information, past similarity score, another past information, transmitters, and receivers.

13. A method of a wireless monitoring system, comprising:

wherein the wireless monitoring system comprises at least one asynchronous heterogeneous transmitter and at least one asynchronous heterogeneous receiver;

wherein the wireless monitoring system comprises at least one pair of transmitter and receiver, each pair comprising one of the at least one asynchronous heterogeneous transmitter, and one of the at least one asynchronous heterogeneous receiver;

wherein each of the at least one receiver is in at least one respective particular pair of transmitter and receiver;

wherein each receiver is associated with at least one respective particular transmitter through the at least one respective particular pair of transmitter and receiver;

for each receiver, and for each of the at least one respective particular pair of transmitter and receiver comprising the receiver:
 obtaining asynchronously at least one respective time series of channel information (CI) of a wireless multipath channel impacted by a motion of an object in a venue,
  wherein the at least one respective time series of CI (CI time series) associated with the particular pair of transmitter and receiver is extracted asynchronously from a respective asynchronous heterogeneous wireless signal,
  wherein the respective asynchronous heterogeneous wireless signal is transmitted asynchronously from a respective one of the at least one respective particular transmitter to at least one asynchronous heterogeneous receiver through the wireless multipath channel, and
 computing asynchronously at least one respective heterogeneous motion information associated with the motion of the object based on the at least one respective time series of CI associated with the respective particular pair of transmitter and receiver; and
at least one of:
 monitoring the motion of the object in the venue individually and asynchronously based on asynchronously computed heterogeneous motion information associated with a pair of transmitter and receiver comprising a particular receiver,
 monitoring the motion of the object jointly and asynchronously based on asynchronously computed heterogeneous motion information associated with any of the at least one pair of transmitter and receiver associated with the particular receiver,
 monitoring the motion of the object jointly and asynchronously based on asynchronously computed heterogeneous motion information associated with any of the at least one pair of transmitter and receiver associated with one of the at least one respective particular transmitter, and
 monitoring the motion of the object globally and asynchronously based on asynchronously computed heterogeneous motion information associated with any of the at least one pair of transmitter and receiver.

14. The method of the wireless monitoring system of claim 13, further comprising:
for each receiver, and for each of the at least one respective particular pair of transmitter and receiver comprising the receiver:
 computing asynchronously a respective heterogeneous similarity score between a respective current window and a respective past window of the at least one respective CI time series associated with the respective particular pair of wireless devices,
  wherein the respective heterogeneous similarity score is computed based on at least one of:
   a distance score, an absolute distance (e.g. 1_1 norm), a Euclidean distance, a norm, a metric, a statistical characteristic, a time reversal resonating strength (TRRS), a cross-correlation, an auto-correlation, a covariance, an auto-covariance, an inner product of two vectors,
   a preprocessing, a signal conditioning, a denoising, a phase correction, a timing correction, a timing compensation, a phase offset compensation, a transformation, a projection, a filtering, a feature extraction, a finite state machine, a history of past similarity score, another past window of the at least one CI time series, a component-wise operation, machine learning, a neural network, a deep learning, a training, a discrimination,
   a weighted averaging, and another operation; and
at least one of:
 monitoring the motion of the object in the venue individually and asynchronously based on asynchronously computed heterogeneous similarity score associated with the pair of transmitter and receiver comprising the particular receiver,
 monitoring the motion of the object jointly and asynchronously based on asynchronously computed heterogeneous similarity score associated with any of the at least one pair of transmitter and receiver associated with the particular receiver,
 monitoring the motion of the object jointly and asynchronously based on asynchronously computed heterogeneous similarity score associated with any of the at least one pair of transmitter and receiver associated with the respective particular transmitter, and
 monitoring the motion of the object globally and asynchronously based on asynchronously computed heterogeneous similarity score associated with any of the at least one pair of transmitter and receiver.

15. The method of the wireless monitoring system of claim 13, further comprising:
for each receiver, and for each of the at least one respective particular pair of transmitter and receiver comprising the receiver:
 wherein each CI of the at least one respective CI time series has at least one respective component,
 for each of the at least one respective component:
  determining asynchronously a respective current component window of the component of the at least one respective CI time series based on the respective current window,
  determining asynchronously a respective past component window of the component of the at least one respective CI time series based on the respective past window,
  comparing component-wise the respective current component window with the respective past component window asynchronously, and
  monitoring component-wise the motion of the object based on the component-wise comparing of the respective current component window and the respective past component window asynchronously; and
at least one of:
 monitoring the motion of the object in the venue individually and asynchronously based on asynchronous component-wise comparing associated with the pair of transmitter and receiver comprising the particular receiver,
 monitoring the motion of the object jointly and asynchronously based on asynchronous component-wise comparing associated with any of the at least one pair of transmitter and receiver associated with the particular receiver,
 monitoring the motion of the object jointly and asynchronously based on asynchronous component-wise comparing associated with any of the at least one pair of transmitter and receiver associated with the respective particular transmitter, and monitoring the motion of the object globally and asynchronously based on asynchronous component-wise comparing associated with any of the at least one pair of transmitter and receiver.

16. The method of the wireless monitoring system of claim 15, further comprising:

for each receiver, and for each of the at least one respective particular pair of transmitter and receiver comprising the receiver:

for each of the at least one component, computing asynchronously a component similarity score based on the respective current component window and the respective past component window, wherein each component similarity score is computed based on at least one of: a distance score, a norm, a metric, a statistical characteristics, a time reversal resonating strength (TRRS), a cross-correlation, an auto-correlation, a covariance, an auto-covariance, an inner product of two vectors, a preprocessing, a signal conditioning, a denoising, a phase correction, a timing correction, a timing compensation, a phase offset compensation, a transformation, a projection, a filtering, a feature extraction, a finite state machine, a history of past similarity score, another past window of the at least one CI time series, a component-wise operation, machine learning, a neural network, a deep learning, a training, a discrimination, a weighted averaging, and another operation, and computing asynchronously a respective heterogeneous similarity score as a heterogeneous function of the at least one component similarity score, wherein the heterogeneous function comprises at least one of: a representative value, a typical value, a weighted average, a percentile, a maximum, a minimum, a 40% quartile, a 50% quartile, a 60% quartile, a mean, a median, a mode, a sum, a product, a root, an arithmetic mean, a geometric mean, a harmonic mean, a generalized mean, an ordered statistics, a trimmed mean, a statistical function, an expected value, a variance, a selected one, and another function; and at least one of:

monitoring the motion of the object in the venue individually and asynchronously based on at least one of: heterogeneous similarity score, and at least one component similarity score, associated with the pair of transmitter and receiver comprising the particular receiver, monitoring the motion of the object jointly and asynchronously based on at least one of: heterogeneous similarity score, and at least one component similarity score, associated with any of the at least one pair of transmitter and receiver associated with the particular receiver, monitoring the motion of the object jointly and asynchronously based on at least one of: heterogeneous similarity score, and at least one component similarity score, associated with any of the at least one pair of transmitter and receiver associated with the respective particular transmitter, and monitoring the motion of the object globally and asynchronously based on at least one of: heterogeneous similarity score, and at least one component similarity score, associated with any of the at least one pair of transmitter and receiver.

17. The method of the wireless monitoring system of claim 15, further comprising:

for each receiver, and for each of the at least one respective particular pair of transmitter and receiver comprising the receiver:

for each of the at least one component, detecting component-wise the motion of the object asynchronously when the respective component similarity score is at least one of: greater than, and equal to, a respective component threshold;

at least one of:

detecting the motion of the object in the venue individually and asynchronously when at least one of:

a first function of heterogeneous similarity score associated with the pair of transmitter and receiver comprising the particular receiver is at least one of: greater than, and equal to, a respective first individual threshold, and a first percentage of component-wise motion detection in a first selected group of components associated with the pair of transmitter and receiver comprising the particular receiver is at least one of: greater than, and equal to, a respective second individual threshold, detecting the motion of the object jointly and asynchronously when at least one of:

a second function of heterogeneous similarity scores associated with any of the at least one pair of transmitter and receiver comprising the particular receiver is at least one of: greater than, and equal to, a respective first joint threshold, and a second percentage of component-wise motion detection in a second selected group of components associated with any of the at least one pair of transmitter and receiver comprising the particular receiver is at least one of: greater than, and equal to, a respective second joint threshold, detecting the motion of the object jointly and asynchronously when at least one of:

a third function of heterogeneous similarity scores associated with any of the at least one pair of transmitter and receiver associated with the respective particular transmitter is at least one of: greater than, and equal to, a respective third joint threshold, and a third percentage of component-wise motion detection in a third selected group of components associated with any of the at least one pair of transmitter and receiver associated with the respective particular transmitter is at least one of: greater than, and equal to, a respective fourth joint threshold, and detecting the motion of the object globally and asynchronously when at least one of:

a fourth function of heterogeneous similarity scores associated with any of the at least one pair of transmitter and receiver is at least one of: greater than, and equal to, a respective first global threshold, and a fourth percentage of component-wise motion detection in a fourth selected group of components associated with any of the at least one pair of transmitter and receiver is at least one of: greater than, and equal to, a respective second global threshold.

18. The method of the wireless monitoring system of claim 13, further comprising:
monitoring asynchronously the motion of the object in the venue further based on another CI time series of another wireless multipath channel impacted by the motion of the object in the venue,
wherein the another CI time series is extracted from another asynchronous heterogeneous wireless signal transmitted from an asynchronous heterogeneous transmitter to an asynchronous heterogeneous receiver through the another wireless multipath channel.

19. The method of the wireless monitoring system of claim 13, further comprising:
for each receiver, and for each of the at least one respective particular pair of transmitter and receiver comprising the receiver:
computing asynchronously at least one respective heterogeneous motion information associated with the motion of the object based on the at least one respective CI time series associated with the respective particular pair of transmitter and receiver,
comparing asynchronously a respective current window of the at least one respective CI time series associated with the respective particular pair of wireless devices with a respective past window of the at least one respective CI time series,
computing asynchronously a respective heterogeneous similarity score between the respective current window and the respective past window of the at least one respective CI time series; and
at least one of:
monitoring the motion of the object in the venue individually and asynchronously based on asynchronously computed heterogeneous motion information and heterogeneous similarity score associated with the pair of transmitter and receiver comprising the particular receiver,
monitoring the motion of the object jointly and asynchronously based on asynchronously computed heterogeneous motion information and heterogeneous similarity score associated with any of the at least one pair of transmitter and receiver associated with the particular receiver,
monitoring the motion of the object jointly and asynchronously based on asynchronously computed heterogeneous motion information and heterogeneous similarity score associated with any of the at least one pair of transmitter and receiver associated with the respective particular transmitter, and
monitoring the motion of the object globally and asynchronously based on asynchronously computed heterogeneous motion information and heterogeneous similarity score associated with any of the at least one pair of transmitter and receiver.

20. The method of the wireless monitoring system of claim 15, further comprising:
partitioning a map of the venue into more than one regions;
associating asynchronously the motion of the object with at least one of the more than one regions of the map of the venue based on at least one of:
asynchronously computed heterogeneous motion information associated with the pair of transmitter and receiver comprising the particular receiver,
asynchronously computed heterogeneous motion information associated with any of the at least one pair of transmitter and receiver associated with the particular receiver,
asynchronously computed heterogeneous motion information associated with any of the at least one pair of transmitter and receiver associated with the respective particular transmitter, and
asynchronously computed heterogeneous motion information associated with any of the at least one pair of transmitter and receiver.

21. The method of the wireless monitoring system of claim 20, further comprising:
for each respective pair of transmitter and receiver:
partitioning a respective feature space of the at least one respective heterogeneous motion information associated with the respective pair of transmitter and receiver into more than one respective feature segments,
constructing a respective mapping that associates each respective feature segment with at least one of the more than one regions of the map of the venue, and
associating asynchronously the motion of the object individually with at least one of the more than one regions of the map of the venue based on the respective mapping;
partitioning a joint feature space of heterogeneous motion information associated with more than one pairs of transmitters and receivers into more than one joint feature segments;
constructing a joint mapping that associates each joint feature segment with at least one of the more than one regions of the map of the venue; and
associating the motion of the object with the particular one of the more than one regions of the map of the venue based on the joint mapping.

22. The method of the wireless monitoring system of claim 21, further comprising:
for each respective pair of transmitter and receiver:
computing asynchronously a respective heterogeneous similarity score between a respective current window and a respective past window of the at least one respective CI time series associated with the respective pair of transmitter and receiver; and
at least one of:
detecting the motion of the object in the venue individually and asynchronously when
a first function of heterogeneous similarity score associated with the pair of transmitter and receiver comprising the particular receiver is at least one of: greater than, and equal to, a respective individual threshold,
detecting the motion of the object in the venue jointly and asynchronously when a second function of heterogeneous similarity scores associated with any of the at least one pair of transmitter and receiver comprising the particular receiver is at least one of: greater than, and equal to, a respective joint threshold,
detecting the motion of the object in the venue jointly and asynchronously when a third function of heterogeneous similarity scores associated with any of the at least one pair of transmitter and receiver associated with the respective particular transmitter is at least one of: greater than, and equal to, another respective joint threshold, and detecting the motion of the object in the venue globally and asynchronously when a fourth function of heterogeneous similarity scores associated with any of the at least one pair of transmitter and receiver is at least one of: greater than, and equal to, a respective global threshold.

23. The method of the wireless monitoring system of claim 20, further comprising:
signaling asynchronously by a monitoring device an information associated with at least one of:
the map of the venue, the more than one partitioned regions of the map,
regions associated with any detected motion of the object,
heterogeneous motion information associated with at least one pair of transmitter and receiver,
component similarity score, heterogeneous similarity score,
past motion information, past similarity score, another past information, transmitters, receivers.

24. A particular asynchronous heterogeneous receiver of a radio monitoring system, comprising:
wherein the radio monitoring system comprises at least one asynchronous heterogeneous transmitter and at least one asynchronous heterogeneous receiver;
wherein the radio monitoring system comprises at least one pairing of transmitter and receiver, each pairing comprising one of the at least one transmitter, and one of the at least one receiver;
wherein the particular asynchronous heterogeneous receiver is in at least one particular pairing of transmitter and receiver of the radio monitoring system;
wherein the particular receiver is grouped with at least one particular transmitter through the at least one particular pairing of transmitter and receiver;
a wireless circuitry to receive asynchronously at least one asynchronous heterogeneous radio signal,
wherein each asynchronous heterogeneous radio signal is transmitted asynchronously by one of the at least one particular transmitter using a respective first heterogeneous processor, a respective first heterogeneous memory and a respective first heterogeneous set of instructions of the to at least one asynchronous heterogeneous receiver through a wireless multipath channel influenced by a movement of a mass in a site;
a second heterogeneous processor communicatively coupled with the wireless circuitry;
a second heterogeneous memory communicative coupled with the second heterogeneous processor;
a second heterogeneous set of instructions stored in the second heterogeneous memory which, when executed, cause the second heterogeneous processor to, for each of the at least one particular pairing of transmitter and receiver, secure asynchronously at least one respective time series of channel information (time series of CI) of the wireless multipath channel and compute heterogeneous motion information associated with the movement of the mass based on the at least one respective time series of CI,
wherein the at least one respective time series of CI associated with the particular pairing of transmitter and receiver is being derived asynchronously from the respective asynchronous heterogeneous radio signal received asynchronously by the wireless circuitry;
wherein at least one of:
the movement of the mass in the site is monitored individually and asynchronously based on heterogeneous motion information associated with a pairing of transmitter and receiver comprising the particular receiver,
the movement of the mass is monitored jointly and asynchronously based on heterogeneous motion information associated with any pairings of transmitters and receivers comprising the particular receiver,
the movement of the mass is monitored jointly and asynchronously based on heterogeneous motion information associated with any pairings of transmitters and receivers comprising one of the at least one particular transmitter, and
the movement of the mass is monitored globally and asynchronously based on heterogeneous motion information associated with any pairings of transmitters and receivers.

25. The particular asynchronous heterogeneous receiver of the radio monitoring system of claim 24:
wherein, for each receiver, and for each of the at least one pairing of transmitter and receiver comprising the receiver,
a respective heterogeneous similarity score associated with the respective pairing of transmitter and receiver is computed asynchronously based on comparing a respective current window and a respective past window of at least one respective time series of CI associated with the pairing of transmitter and receiver; and
wherein at least one of:
the movement of the mass in the site is monitored individually and asynchronously based on asynchronously computed heterogeneous similarity score associated with the pairing of transmitter and receiver comprising the particular receiver,
the movement of the mass in the site is detected individually and asynchronously when a heterogeneous similarity score associated with the pair of transmitter and receiver comprising the particular receiver is at least one of: greater than, and equal to, an individual threshold,
the movement of the mass in the site is monitored jointly and asynchronously based on asynchronously computed heterogeneous similarity score associated with any pairing of transmitter and receiver comprising the particular receiver,
the movement of the mass in the site is detected jointly and asynchronously when a first joint score computed based on heterogeneous similarity score associated with any pairing of transmitter and receiver comprising the particular receiver is at least one of: greater than, and equal to, a first joint threshold,
the movement of the mass in the site is monitored jointly and asynchronously based on asynchronously computed heterogeneous similarity score associated with any pairing of transmitter and receiver associated with one of the at least one particular transmitter,
the movement of the mass in the site is detected jointly and asynchronously when a second joint score computed based on heterogeneous similarity score associated with any pairing of transmitter and receiver associated with one of the at least one particular transmitter is at least one of: greater than, and equal to, a second joint threshold, the movement of the mass in the site is monitored globally and asynchronously based on asynchronously computed heterogeneous similarity score associated with any pairing of transmitter and receiver, and the movement of the mass in the site is detected globally and asynchronously when a third joint score computed based on heterogeneous similarity score associated with any pairing of transmitter and receiver is at least one of: greater than, and equal to, a third joint threshold.

26. A particular asynchronous heterogeneous transmitter of a radio monitoring system, comprising:

wherein the radio monitoring system comprises at least one asynchronous heterogeneous transmitter and at least one asynchronous heterogeneous receiver;

wherein the radio monitoring system comprises at least one combination of transmitter and receiver, each combination comprising one of the at least one transmitter, and one of the at least one receiver;

wherein the particular asynchronous heterogeneous transmitter is in at least one particular combination of transmitter and receiver of the radio monitoring system;

wherein the particular transmitter is paired with at least one particular receiver through the at least one particular combination of transmitter and receiver;

a wireless circuitry;

a first processor communicatively coupled with the wireless circuitry;

a first memory communicative coupled with the first processor;

a first set of instructions stored in the first memory which, when executed, cause the first processor to:

transmit asynchronously using the wireless circuitry an asynchronous heterogeneous wireless signal from the particular transmitter to the at least one particular receiver through a wireless multipath channel impacted by a dynamics of a substance in a site, wherein, for each of the at least one particular receiver:

at least one time series of channel information (time series of CI) of the wireless multipath channel gleaned from the asynchronous heterogeneous wireless signal transmitted by the wireless circuitry is fetched and motion information associated with the dynamics of the substance is computed based on the at least one time series of CI by the receiver using a second processor, a second memory and a second set of instructions of the receiver; and wherein at least one of:

the dynamics of the substance in the site is tracked individually and asynchronously based on motion information associated with a combination of transmitter and receiver comprising the particular transmitter, the dynamics of the substance is tracked jointly and asynchronously based on motion information associated with any combinations of transmitters and receivers comprising the particular transmitter, the dynamics of the substance is tracked jointly and asynchronously based on motion information associated with any combinations of transmitters and receivers comprising one of the at least one particular receiver, and the dynamics of the substance is tracked globally and asynchronously based on motion information associated with any combinations of transmitters and receivers.

27. The particular heterogeneous transmitter of the radio monitoring system of claim 26:

wherein, for each transmitter, and for each of the at least one combination of transmitter and receiver comprising the transmitter, a respective heterogeneous similarity score associated with the respective combination of transmitter and receiver is computed asynchronously based on comparing a respective current window and a respective past window of at least one respective time series of CI associated with the respective combination of transmitter and receiver; and wherein at least one of:

the dynamics of the substance in the site is tracked individually and asynchronously based on asynchronously computed heterogeneous similarity score associated with the combination of transmitter and receiver comprising the particular transmitter, the dynamics of the substance in the site is detected individually and asynchronously when a heterogeneous similarity score associated with the combination of transmitter and receiver comprising the particular transmitter is at least one of: greater than, and equal to, an individual threshold, the dynamics of the substance in the site is tracked jointly and asynchronously based on asynchronously computed heterogeneous similarity score associated with any combination of transmitter and receiver comprising the particular transmitter, the dynamics of the substance in the site is detected jointly and asynchronously when a first joint score computed based on heterogeneous similarity score associated with any combination of transmitter and receiver comprising the particular transmitter is at least one of: greater than, and equal to, a first joint threshold, the dynamics of the substance in the site is tracked jointly and asynchronously based on asynchronously computed heterogeneous similarity score associated with any combination of transmitter and receiver associated with one of the at least one particular receiver, the dynamics of the substance in the site is detected jointly and asynchronously when a second joint score computed based on heterogeneous similarity score associated with any combination of transmitter and receiver associated with one of the at least one particular receiver is at least one of: greater than, and equal to, a second joint threshold, the dynamics of the substance in the site is tracked globally and asynchronously based on asynchronously computed heterogeneous similarity score associated with any combination of transmitter and receiver, and the dynamics of the substance in the site is detected globally and asynchronously when a third joint score computed based on heterogeneous similarity score associated with any combination of transmitter and receiver is at least one of: greater than, and equal to, a third joint threshold.

28. The particular heterogeneous transmitter of the radio monitoring system of claim 26, wherein the radio monitoring system comprises:

a third processor communicatively coupled with at least one of: at least one asynchronous heterogeneous transmitter, and at least one asynchronous heterogeneous receiver;

a third memory communicative coupled with the third processor;

a third set of instructions stored in the third memory which, when executed, cause the third processor to:

for each receiver, and for each of the at least one combination of transmitter and receiver comprising the receiver:

receive asynchronously at least one respective time series of channel information (time series of CI) of a wireless multipath channel influenced by a motion of an item in a place received asynchronously by the receiver using a respective second processor, a respective second memory and a respective second set of instructions of the receiver, wherein the at least one respective time series of CI associated with the respective combination of transmitter and receiver is obtained asynchronously from a respective asynchronous heterogeneous radio signal transmitted from a respective transmitter of the respective combination using a respective first processor, a respective first memory and a respective first set of instructions of the respective transmitter to at least one asynchronous heterogeneous receiver through the wireless multipath channel, and at least one of:

track the motion of the item in the place individually and asynchronously, based on time series of CI associated with a particular combination of transmitter and receiver comprising a particular receiver and a particular transmitter, track the motion of the item jointly and asynchronously based on time series of CI associated with any of the at least one combination of transmitter and receiver associated with the particular receiver, track the motion of the item jointly and asynchronously based on time series of CI associated with any of the at least one combination of transmitter and receiver associated with the particular transmitter, track the motion of the item globally and asynchronously based on time series of CI associated with any of the at least one combination of transmitter and receiver.

* * * * *